US012122401B1

(12) United States Patent
Millar et al.

(10) Patent No.: US 12,122,401 B1
(45) Date of Patent: Oct. 22, 2024

(54) SELF PROGRAMMABLE MICROCONTROLLER AND METHOD FOR A VEHICLE

(71) Applicant: Howell Ventures Ltd., Upper Kingsclear (CA)

(72) Inventors: Dane N. Millar, Keswick Ridge (CA); Yves Losier, Hanwell (CA); Adam Wilson, Hanwell (CA); Sara Megan Connor, Fredericton (CA)

(73) Assignee: HOWELL VENTURES LTD. (CA)

( * ) Notice: Subject to any disclaimer, the term of this patent is extended or adjusted under 35 U.S.C. 154(b) by 381 days.

(21) Appl. No.: 17/492,437

(22) Filed: Oct. 1, 2021

Related U.S. Application Data

(60) Provisional application No. 63/086,085, filed on Oct. 1, 2020.

(51) Int. Cl.

| | |
|---|---|
| ***G06F 9/445*** | (2018.01) |
| ***B60W 50/06*** | (2006.01) |
| ***G05B 19/042*** | (2006.01) |

(52) U.S. Cl.
CPC ......... *B60W 50/06* (2013.01); *G05B 19/0426* (2013.01); *G05B 2219/25257* (2013.01); *G05B 2219/2637* (2013.01)

(58) Field of Classification Search
CPC . G07C 2205/02; G02F 1/015; G05B 23/0254; G05B 2223/02; G05B 2223/06
USPC .................................................. 717/168–178
See application file for complete search history.

(56) References Cited

U.S. PATENT DOCUMENTS

| | | | |
|---|---|---|---|
| 5,486,817 | A | 1/1996 | Ina |
| 5,555,498 | A | 9/1996 | Berra et al. |
| 5,737,711 | A | 4/1998 | Abe |
| 5,832,244 | A | 11/1998 | Jolley et al. |
| 6,189,057 | B1 | 2/2001 | Schwanz et al. |
| 6,418,324 | B1 | 7/2002 | Doviak et al. |
| 6,484,082 | B1 | 11/2002 | Millsap et al. |
| 6,526,048 | B1 | 2/2003 | Francis et al. |
| 6,526,340 | B1 | 2/2003 | Reul et al. |

(Continued)

FOREIGN PATENT DOCUMENTS

| | | |
|---|---|---|
| EP | 1569417 | 8/2005 |
| WO | WO 2004/023318 | 3/2004 |
| WO | WO 2013/074981 | 5/2013 |

*Primary Examiner* — Chuck O Kendall
(74) *Attorney, Agent, or Firm* — Frijouf, Rust & Pyle, P.A.

(57) ABSTRACT

An apparatus and method are disclosed for a self programmable microcontroller for a vehicle. The self programmable microcontroller comprises an expansion data bus. A switch module is electrically coupled to the expansion data bus. A second input device is electrically coupled to the switch module. An expansion module is electrically coupled between the original equipment manufacturer control module and the expansion data bus. A source code stored in the switch module for operating the switch module and the expansion module based on an electrical signal from the second input device. A calibration source code stored in the expansion module for calibrating the expansion module relative to the original equipment manufacturer control module. The switch module receives an electrical signal from the second input device and communicates through the expansion module and through the original equipment manufacturer control module for activating the original equipment manufacturer output device.

25 Claims, 81 Drawing Sheets

CAN EXPANSION MODULE
Step 2: Install CAN Module

(56) References Cited

U.S. PATENT DOCUMENTS

| | | | |
|---|---|---|---|
| 6,772,248 B1 | 8/2004 | McClure et al. | |
| 7,895,342 B2 | 2/2011 | Sodergren | |
| 7,904,569 B1 * | 3/2011 | Gelvin | H04L 67/12<br>701/32.7 |
| 2003/0052801 A1 | 3/2003 | McClure et al. | |
| 2003/0167345 A1 | 9/2003 | Knight et al. | |
| 2004/0111188 A1 | 6/2004 | McClure et al. | |
| 2005/0267655 A1 | 12/2005 | Gessner | |
| 2007/0274328 A1 | 11/2007 | Sonoda et al. | |
| 2008/0215208 A1 | 9/2008 | Carlson | |
| 2010/0023199 A1 | 1/2010 | Weichenberger et al. | |
| 2011/0055292 A1 | 3/2011 | Madau et al. | |
| 2013/0151065 A1 | 6/2013 | Ricci | |
| 2015/0026372 A1 | 1/2015 | Laichinger | |
| 2016/0046265 A1 * | 2/2016 | Heise | G05B 15/02<br>701/70 |
| 2020/0070831 A1 * | 3/2020 | Bigelow | F02D 41/3076 |
| 2023/0054373 A1 * | 2/2023 | Brooks | B61L 25/025 |

* cited by examiner

CAN EXPANSION MODULE

Step 2: Install CAN Module

CAN EXPANSION MODULE

Step 3: Calculate Baud Rate

CAN EXPANSION MODULE

Step 4: Pass Data Through

CAN EXPANSION MODULE

Step 5: Record IDLE State

CAN EXPANSION MODULE

Step 6: Calibrate Functions

LIN EXPANSION MODULE

Step 2: Install LIN Expansion Module

LIN EXPANSION MODULE

Step 2: Install LIN Expansion Module

LIN EXPANSION MODULE

Step 3: Calculate Baud Rate

LIN EXPANSION MODULE

Step 4: Pass Through

LIN EXPANSION MODULE

Step 5: Record IDLE State

LIN EXPANSION MODULE

Step 6: Calibrate Functions

RELAY EXPANSION MODULE

CAN EXPANSION MODULE

CAN EXPANSION MODULE

Step 5: Record IDLE State

LIN EXPANSION MODULE

Step 2: Install LIN Expansion Module

LIN EXPANSION MODULE

Step 3: Calculate Baude Rate

LIN EXPANSION MODULE

Step 4: Calculate IDs

LIN EXPANSION MODULE

Step 4: Calculate IDs

LIN EXPANSION MODULE

Step 6: Calibrate Functions
"BUS CLOSED"

SELF PROGRAMMABLE MICROCONTROLLER AND METHOD FOR A VEHICLE

CROSS-REFERENCE TO RELATED APPLICATIONS

This application claims benefit of U.S. Patent Provisional Application No. 63/086,085 filed Oct. 1, 2020. All subject matter set forth in Provisional Application No. 63/086,085 is hereby incorporated by reference into the present application as if fully set forth herein.

BACKGROUND OF THE INVENTION

Field of the Invention

The present invention is related to the field of controllers and more particularly to a microcontroller for a vehicle. The present invention further is related to the field of programming and more particularly to programming a microcontroller for a vehicle.

Description of the Related Art

Many modern vehicles utilize hardware and software in order to operate many of the sensors, actuators and features of the vehicle. These features may include the accelerator, braking, power door locks, power windows, power seats, power windows, windshield wipers, beating and air-conditioning controls, interior lights, steering wheel controls, sunroof, trunk, turning signals, or other vehicle applications. For example, many vehicles may one or more serial data networks such as Controller Area Network (CAN) or Local Interconnect Network (LIN) for communicating with the sensors, actuators or features of the vehicle.

It may prove very problematic to install new or alternative input devices within the vehicle due to the one or more serial data networks within the vehicle. For example, a vehicle may wish to be altered due to an individual's handicap. Such altercations to a vehicle may include altered input devices for acceleration, braking, turn signals, or other vehicle applications. A device, method and programming are necessary for interfacing between a new or alternative input device with the existing one or more serial data networks.

There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 5,486,817 to Ina discloses a communication system for a vehicle conducts mutual communication between a central station and peripheral stations via a communication signal line. A communication signal from the central station is inputted via the communication signal line, which is outputted to an output circuit via a shift register and another register to drive and control lamps and the like. In addition, a continuity control circuit is controlled during a period from a time at which an electric power supply voltage is supplied to the peripheral station from a battery carried on the vehicle until the peripheral station receives a first communication signal from the central station to electrically separate the register and the output circuit. In such a case, the output circuit is connected to the other components to enable drive control in a desired initial state regardless of the above-mentioned communication signal. When the first communication signal from the central station is received, drive control of the above-mentioned control system is carried out in accordance with the communication signal.

U.S. Pat. No. 5,555,498 to Berra et al. discloses an adapter which permits the use of present diagnostic tools with newer ISO9141 equipped engine and transmission controllers. The adapter facilitates bi-directional communication while conditioning the signals entering and exiting the adapter and allow the diagnostic tools to operate transparent of the adapter's presence.

U.S. Pat. No. 5,737,711 to Abe discloses a diagnosis system conducts diagnosis with data read out of an electronic control unit with a communications protocol installed in a vehicle. The system has an integrated circuit to be an communications interface suitable for the protocol. The circuit can be made suitable for any communications protocol by reprogramming logical functions of the circuit with design information. Instead of such circuit, the system may have a main processor and a subprocessor. On one hand, the main processor conducts virtual data communication with the control unit for diagnosis. On the other hand, the subprocessor executes a communications processing program suitable for the protocol to have data communication with the control unit. The subprocessor receives data from the main processor and transfers the data to the control unit and vice versa for the virtual data communication.

U.S. Pat. No. 5,832,244 to Jolley et al. discloses a multiple interface input/output port allows communication between an interface bus of a peripheral device and any one of a plurality of different types of interface buses that may be provided in a host computer. An interface bus detection circuit detects which type of interface bus the peripheral device is connected to on the host computer, and communications are then routed through an appropriate interface adapter that enables communication between the interface buses of the peripheral device and host computer. The interface bus detection circuit compares signal levels on selected ones of the lines of the interface bus of the host computer to a reference potential to determine which of the selected lines are grounded. The circuit then identifies the type of interface bus to which it is connected based on the determination of which of the selected lines of the interface bus are grounded.

U.S. Pat. No. 6,189,057 to Schwanz et al. discloses a module for interfacing with a serial data bus of an on-board computer system of a motor vehicle to provide a means by which an external device such as a lap top computer, electronic compass, etc., can exchange useful data therefrom. The module includes a controller having a vehicle data bus interface circuit which interfaces the module with the serial data bus. An accessory device interface circuit interfaces the module with the external device. The module provides a power connection terminal to provide power from the vehicle's electrical system to the external device. The module forms a low cost means by which various external devices can be interfaced with the on-board computer of the vehicle to exchange useful information and to enhance operation of the vehicle or the external device.

U.S. Pat. No. 6,418,324 to Doviak et al. discloses an apparatus and method is provided for transparent communication between a remote or mobile device and a fixed communication host network. The apparatus and method may include a remote network controller that logically resides between the host network and the existing infrastructure(s) that are used to provide communications network contact with one or more remote devices. The remote network controller is connected to the host communication network as a protocol-appropriate communications controller so that remote devices are indistinguishable to the host network from the locally-attached devices. Each remote device may be provided with an asynchronous serial data interface to communicate with a mobile data controller. The mobile data controller, in combination with the remote network controller, provides end-to-end data communication such that incompatible protocols are transparent to the remote device and host communication network. A router may be provided which selects a communications network in accordance with user configured parameters. The router communicates over a plurality of incompatible networks and is capable of using a variety of different protocols. Switching between the plurality of incompatible networks is transparent to the remote device and host communication network.

U.S. Pat. No. 6,484,082 to Millsap et al. discloses a network management approach for use in a vehicle to control activation of electronic control units (ECUs) networked together throughout the vehicle. The ECUs are grouped together by function into virtual networks, with each virtual network including those ECUs used in carrying out a particular control task, such as controlling power windows or automatic headlights. The virtual networks are activated using a messaging protocol that specifies which virtual network is being activated. Periodic messages specifying the virtual network are also used to maintain it active. This permits the ECUs to be maintained in a low power quiescent state when the control functions are not needed, while allowing only those needed for a particular control task to be awakened and maintained in an activated state to carry out their associated control task. An ECU can activate one of the virtual networks by transmitting a wake-up signal followed by a message identifying the virtual network. Each of the ECUs receive this message and, if it is a member of the virtual network being initialized, maintains itself in an active state to carry out the control task associated with the virtual network. The other ECUs return to the quiescent state. Using this approach, an ECU is able to activate only the necessary ECUs for a particular control task without having to know which or how many ECUs are involved in performing the task.

U.S. Pat. No. 6,526,048 to Francis et al. discloses a multi-interface point-to-point switching system includes a plurality of I/O devices coupled to a plurality of respective devices, a switching device for selectively delivering each of a plurality of different signals from a selected one of the I/O devices coupled to a sending one of the devices to another selected one of the V/O devices coupled to a receiving one of the devices, to thereby establish respective connections between the sending and receiving devices, wherein the switching device provides a fixed, low latency signal path for each connection between a sending and receiving device for the duration of that connection, whereby the latency of that connection is deterministic and predictable, and a data content of the signal delivered via that connection is not analyzed by the switching device, whereby the switching device operates in a content independent manner, and controller device that determines the fixed, low latency signal path for each connection and commands the switching device to establish the determined signal path for each connection. According to the present invention, at least one of the different signals is a parallel interface format signal and at least one of the different signals is a serial interface format signal.

U.S. Pat. No. 6,526,340 to Reul et al. discloses a diagnostic tool communicates with a plurality of motor vehicle control units and implements at least two different communication protocols within a single motor vehicle. The diagnostic tool includes a processor and a field programmable gate array. The processor executes diagnostic routines and thereby provides messages to one of the plurality of motor vehicle control units. The field programmable gate array provides a selectable multiple protocol interface that is coupled between the plurality of motor vehicle control units and the processor. The selectable multiple protocol interface converts processor messages into a format that is readable by the selected motor vehicle control unit and converts received control unit information into a format that is readable by the processor.

U.S. Pat. No. 6,772,248 to McClure et al. discloses an apparatus for in-vehicle electronic control module (ECM) development in which network protocol control parameters are varied. The apparatus includes an adapter, which consists of a microprocessor subassembly and an interface subassembly, and computer based (client) software with two parts: the host communication level and the API (DLL). The apparatus provides a "pass-through" interface such that various compliant applications from various developers can use a common adapter. The apparatus provides a "pass-through" interface such that all compliant adapters from various developers can use any of the unique developer applications. This makes all compliant software applications and hardware interface adapters interchangeable. The improved protocol adapter is designed to perform the following functions: ECM emulation, analysis of network message loading, simulation of message traffic loading of an in-vehicle network, inventory management, ECM code testing, a gateway between networks, and to provide vehicle maintenance status checks.

U.S. Pat. No. 7,895,342 to Sodergren discloses an adapter device for providing the user a remote access point for supporting interaction between the device and one or more target devices supporting one or more of several communication protocols for automotive and industrial automation applications employing user-selectable protocols, such as multiplexed communication networks.

U.S. Patent Application 2003/0052801 to McClure et al. discloses an ASCII gateway to in-vehicle system provides bi-directional translation between multiplexed motor vehicle networks and industrial control and monitoring devices. Integrated hardware and software components provide data communications between motor vehicle electronic control module networks and RS-232 serial ASCII-text capable device, for industrial control and/or industrial automation application in manufacturing or assembly operations. Communications networks (CAN, SAE or ISO protocols) implemented inside motor vehicles pass data between electronic control modules that control operation of important vehicle components like engine, transmission and brake systems, have their messages converted to RS-232 serial ASCII-text; and from RS-232 serial ASCII-text converted to motor vehicle communications network by the system. Messages to monitor and/or control vehicle networks are generated by a serial ASCII-test capable device. Multiple vehicle protocols are supported by the system. The system translates between RS-232 serial ASCII-text message generated or received by a device and the vehicle network.

U.S. Patent Application 2003/0167345 to Knight et al. discloses a communications bridge between a communications network carried by a motor vehicle and configured for communications according to a first protocol and a remote system configured for communications according to a second protocol, includes a first interface configured for coupling to the communications network, a second interface configured for coupling to the remote system, and a digital signal processor (DSP) configured to process multiple operations per instruction cycle The DSP receives information from the communications network via the first interface, converts this information to the second protocol and transmits the information converted to the second protocol to the remote system via the second interface. The DSP further receives information from the remote system via the second interface, converts this information to the first protocol and transmits the information converted to the first protocol to the communications network via the first interface.

U.S. Patent Application 2004/0111188 to McClure et al. discloses a protocol selection matrix adapter that interfaces a host computer to multiple in-vehicle networks. The protocol selection matrix adapter is microprocessor controlled and provides a physical interface to the in-vehicle networks. Further, the control of the protocol selection matrix adapter automatically selects the in-vehicle networks, and the initiation of communications on the detected networks. The protocol selection matrix adapter also is able to reprogram an electronic control unit (ECU) that makes up the in-vehicle network.

U.S. Patent Application 2005/0267655 to Gessner discloses allowing vehicle information tools to be used with vehicle information systems even if lacking a common protocol for communication. The present invention operates by intercepting requests from vehicle information tools, translating the communications into a protocol understood by a vehicle information system and providing the translated communications to the vehicle information system. In response to the request, the vehicle information system generates responses, which are translated into a protocol understood by the vehicle information tool, and then provided to the vehicle information tool.

U.S. Patent Application 2007/0274328 to Sonoda et al. discloses a relay connection unit that relay message and make sufficient number of branches to be able to connect a plurality of ECUs. The relay connection unit includes: reception connectors to which a plurality of insertion connectors of communication lines can respectively be connected; a branch connection unit that divides the reception connectors into a plurality of groups, the branch connection unit branch-connecting the communication lines through the reception connectors belonging to the respective groups; a plurality of vehicle-mounted LAN communication units respectively connecting to each of the groups of the reception connectors via the branch connection unit, which are configured to perform transmission/reception of messages; and a relay processing unit that relays an incoming message received via one of the vehicle-mounted LAN communication units to another of the vehicle-mounted LAN communication units of another relay connection unit in accordance with a relaying destination.

U.S. Patent Application 2008/0215208 to Carlson discloses a system adapted for, among others, interfacing with a control network of a vehicle, said system comprising a program for monitoring data available in said control network and adapted to send selected data to a data link of said vehicle; a processor for receiving said selected data from said data link and decoding said selected data into decoded data available for subsequent use.

U.S. Patent Application 2010/0023199 to Weichenberger et al. discloses a controller having an integration of different functions with which a respective microcontroller is associated. In accordance with the invention, at least one monitoring unit is provided which is implemented for a plurality of functions, with only the defective function being able to be switched off in the case of a defect recognition. The invention further relates to a method for the integrative control of different functions.

U.S. Patent Application 2011/0055292 to Madau et al. discloses a gateway system includes a vehicle network having a network data, a processor for extracting the network data from the vehicle network and converting the network data into a standardized data having an open source format, and a broadcaster in communication with the processor to receive the standardized data and transmit the standardized data to a user device, wherein the user device for use thereby.

U.S. Patent Application 2013/0151065 to Ricci discloses methods and systems for communicating vehicle conditions based on vehicle component diagnostics and indications are provided. Specifically, various components of a vehicle may provide diagnostic information that can be collected and interpreted by a diagnostics module. The diagnostics module may determine to present the diagnostic information to a third party and/or vehicle occupant according to predetermined settings. Such diagnostic information may be presented in a conversational manner. Moreover, diagnostic information may be automatically evaluated in determining to provide course of action advice and other communications via the diagnostic module.

U.S. Patent Application 2015/0026372 to Laichinger discloses a control unit for controlling or regulating a component, including a processing arrangement for controlling or regulating the component for connecting the control unit to a bus for communicating with a further control unit; an application tool port for connecting the control unit to an application tool for communicating with the control unit; and a connecting arrangement for connecting the application tool port and the bus port so that the application tool is able to communicate via the bus port, and a bus, a motor vehicle, a method, an application tool, and computer program products.

European Patent EP 1569417 to Swindells discloses diagnostic testing of computers and computer networks in transportation vehicles, and, more particularly, to an improved device and method for communicating with an automobile's internal computer networks.

WO Patent WO 2004/023318 to Sabnis discloses an integrated circuit (3) of a data processing system contains software for (5) performing a conversion between multiple command protocols, whereby the integrated circuit (3) can receive commands in one of the multiple formats, convert them to a single predefined protocol, and implement them. The data processing system also includes memories (9, 11, 13, 15) which receive commands in the respective protocols. The memories (9, 11, 13, 15) store the (10) commands, together with any associated data. The generate an interrupt signal, and transmit it to the integrated circuit (3), which subsequently reads the command, and any associated data, converts it to the predefined protocol, and then implements it.

WO Patent WO 2013,074981 to Ricci discloses a vehicle implementing one or more processing modules. These modules are configured to connect and interface with the various buses in the vehicle, where the various buses are connected with the various components of the vehicle to facilitate information transfer among the vehicle components. Each processing module is further modularized with the ability to add and replace other functional modules now or in the future. These functional modules can themselves act as distinct vehicle components. Each processing modules may hand-off processing to other modules depending on its health, processing load, or by third-party control. Thus, the plurality of processing modules helps to implement a middleware point of control to the vehicle with redundancy in processing and safety and security awareness in their applications.

Although the aforementioned prior art have contributed to the development of the art of a device and method for interfacing between a new or alternative input device with existing one or more serial data networks, none of these prior art patents have solved the needs of this art.

Therefore, it is an object of the present invention to provide an improved microcontroller for interfacing between a new or alternative input device with the existing one or more serial data networks.

Another object of this invention is to provide a method for self programming a microcontroller for a vehicle input device.

Another object of this invention is to provide an improved microcontroller that is self programmable.

Another object of this invention is to provide an improved microcontroller that is modular for the type of vehicle.

Another object of this invention is to provide an improved microcontroller is capable of expansion.

Another object of this invention is to provide an improved microcontroller that is self calibrating.

Another object of this invention is to provide an improved microcontroller that is conveniently electrically coupled to the one or more serial data networks.

Another object of this invention is to provide an improved microcontroller that is user-friendly.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly, other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. To summarize, the invention relates to an apparatus and a method for a self programmable microcontroller for a vehicle. The vehicle has an original equipment manufacturer control module electrically coupled between an original equipment manufacturer user input device and an original equipment manufacturer output device. An original equipment manufacturer source code is within the original equipment manufacturer control module for communicating between the original equipment manufacturer user input device and the original equipment manufacturer output device. The self programmable microcontroller comprises an expansion data bus. A switch module is electrically coupled to the expansion data bus. A second input device is coupled to the vehicle. A transmitting device couples the second input device to the switch module. A programmer module is electrically coupled to the expansion data bus. An expansion module is electrically coupled between the original equipment manufacturer control module and the expansion data bus. A source code is stored in the programmer module for programming the switch module for operating the second input device based on the original equipment manufacturer source code. A calibration source code is stored in the expansion module for calibrating the expansion module relative to the original equipment manufacturer control module. The switch module receives an electrical signal from the second input device and communicates through the expansion module and through the original equipment manufacturer control module for activating the original equipment manufacturer output device.

In a more specific embodiment of the invention, the second input device may include a push button, toggle switch, rocker switch or joystick.

In another embodiment of the invention, the expansion module may include a Controller Area Network (CAN) expansion module. The switch module receives an electrical signal from the second input device and communicates through the CAN expansion module and through the original equipment manufacturer control module for activating the original equipment manufacturer output device.

In another embodiment of the invention, the expansion module may include a Local Interconnect Network (LIN) expansion module. The switch module receives an electrical signal from the second input device and communicates through the Local Interconnect Network (LIN) expansion module and through the original equipment manufacturer control module for activating the original equipment manufacturer output device.

In another embodiment of the invention, the self programmable microcontroller alternatively comprises an expansion data bus. An external switch module is electrically coupled to the expansion data bus. A second input device is electrically coupled to the external switch module. An external programmer module is electrically coupled to the expansion data bus. An external expansion module is electrically coupled between the original equipment manufacturer control module and the expansion data bus. A source code is stored in the external programmer module for programming the external switch module for operating the second input device based on the original equipment manufacturer source code. A calibration source code is stored in the external expansion module for calibrating the external expansion module relative to the original equipment manufacturer control module. The external switch module receives an electrical signal from the second input device and communicates through the external expansion module and through the original equipment manufacturer control module for activating the original equipment manufacturer output device.

The invention is also incorporated into a method for programming a microcontroller for operating a vehicle. The vehicle has an original equipment manufacturer control module electrically coupled between an original equipment manufacturer user input device and an original equipment manufacturer output device. An original equipment manufacturer source code is within the original equipment manufacturer control module for communicating between the original equipment manufacturer user input device and the original equipment manufacturer output device. The steps comprise installing an expansion data bus into the vehicle. A switch module is installed into the vehicle and is electrically coupled to the expansion data bus. A second input device is installed into the vehicle and communicates with the external switch module. A programmer module is installed into the vehicle and is electrically coupled to the expansion data bus. An expansion module is installed into the vehicle and is electrically coupled between the original equipment manufacturer control module and the expansion data bus. A source code stored in the programmer module is executed for programming the switch module for operating the second input device based on the original equipment manufacturer source code. A calibration source code is executed for calibrating the expansion module relative to the original equipment manufacturer control module. The second input device is activated for transmitting an electrical sign to the switch module and through the expansion module and through the original equipment manufacturer control module for activating the original equipment manufacturer output device.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a full understanding of the nature and objects of the invention, reference should be made to the following detailed description taken in connection with the accompanying drawings in which:

FIG. 16 is an electrical diagram similar to FIG. 15 illustrating the fourth step for installing the Controller Area Network (CAN) expansion module by pass data through;

FIG. 24 is an electrical diagram similar to FIG. 23 illustrating the fourth step for installing the Local Interconnect Network (LIN) expansion module by pass data through;

DETAILED DISCUSSION

Figure 1:
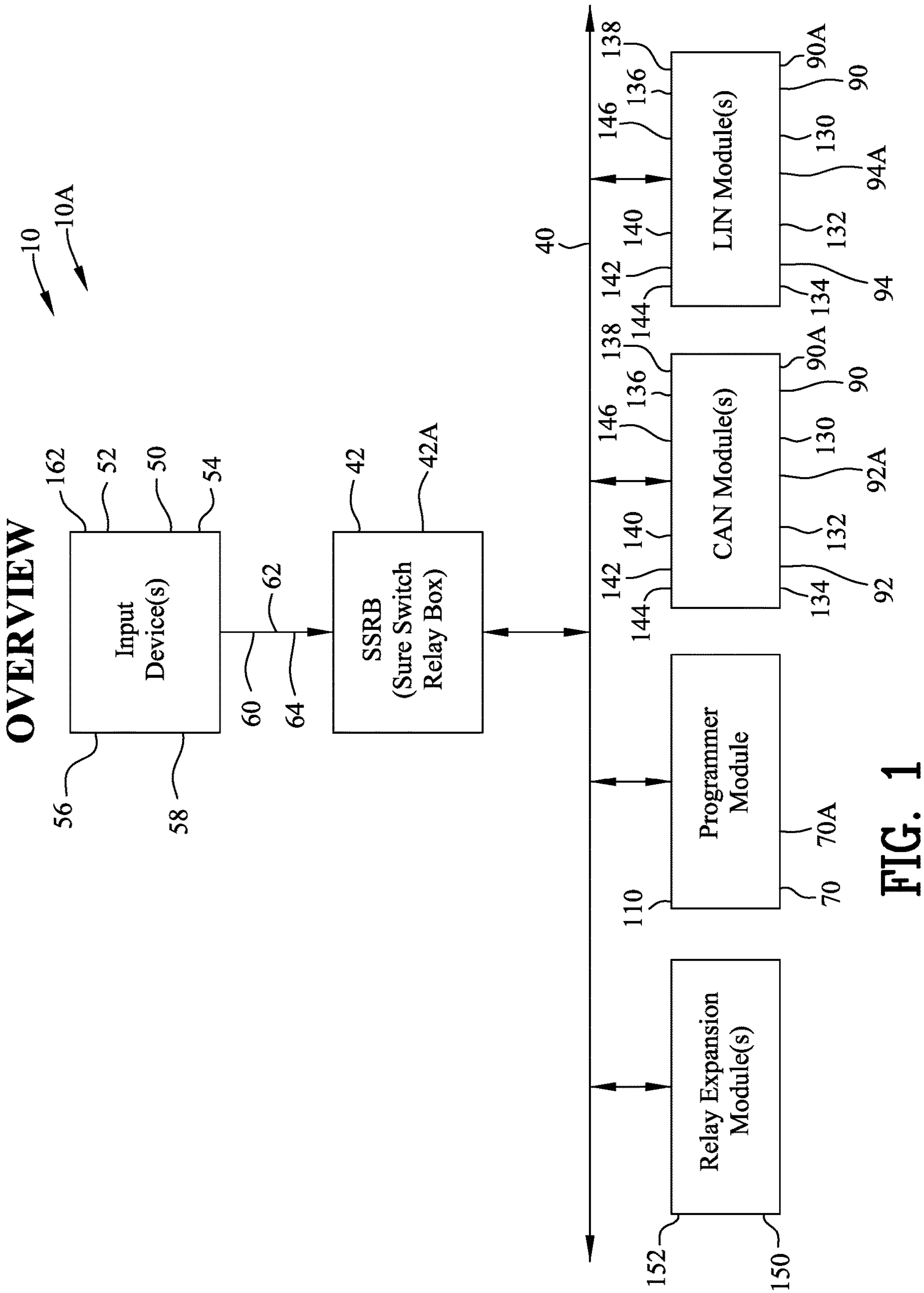
FIG. 1 is a first overall view of the self programmable microcontroller incorporating the present invention.
Figure 81:
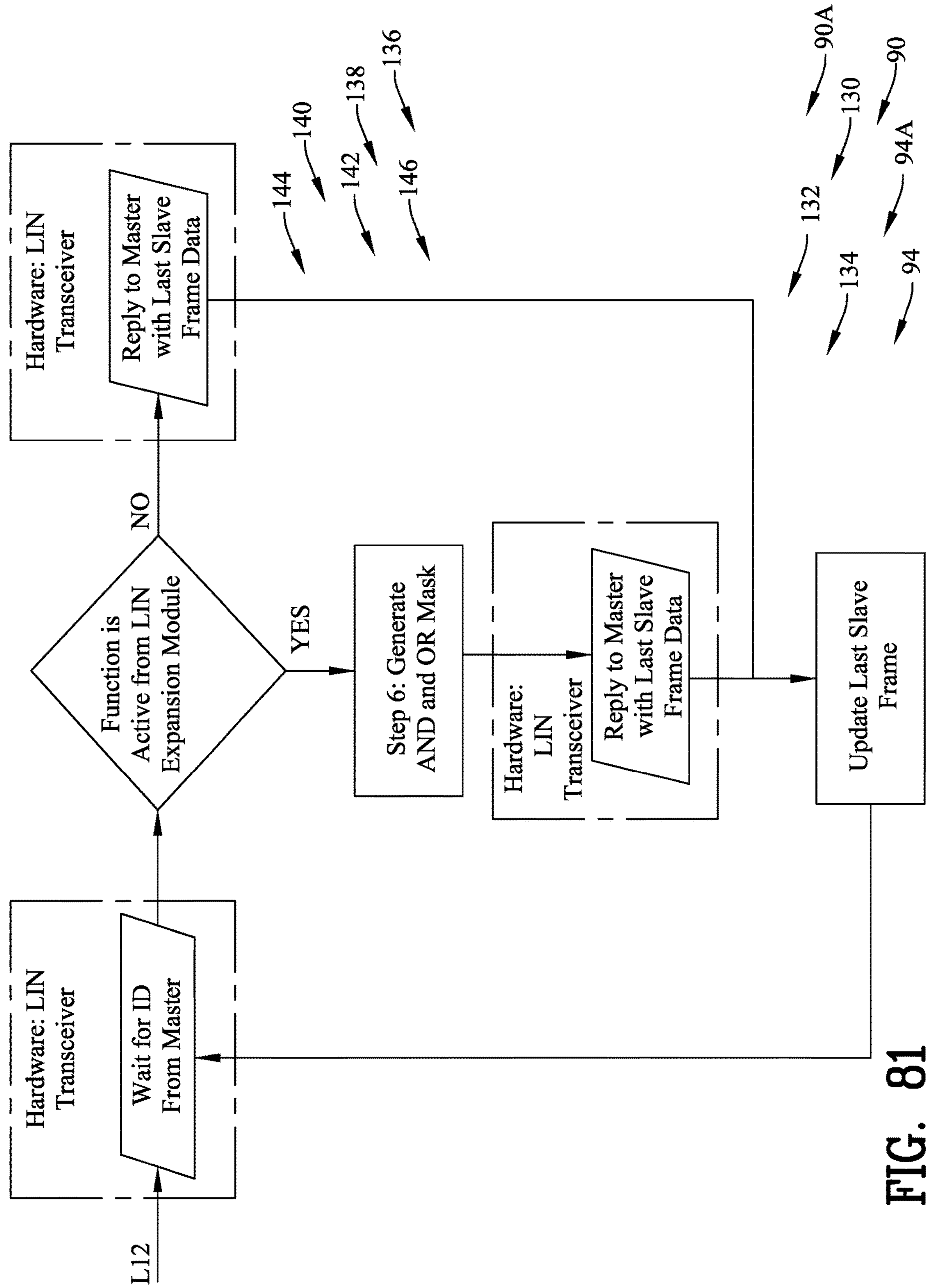
FIG. 81 is a seventh flow diagram of the self programmable microcontroller using a Local Interconnect Network (LIN) expansion module within the vehicle.

FIGS. 1-81 illustrate an apparatus and method for a self programmable microcontroller 10 for a vehicle 20. The vehicle 20 has an original equipment manufacturer control module 22 electrically coupled between an original equipment manufacturer user input device 24 and an original equipment manufacturer output device 26. An original equipment manufacturer source code 28 is within the original equipment manufacturer control module 22 for communicating between the original equipment manufacturer user input device 24 and the original equipment manufacturer output device 26.

For example, the original equipment manufacturer user input device 24 may include an accelerator actuator, a braking actuator, a power door lock actuator, a power window actuator, a windshield wiper actuator, a steering wheel control actuator, or turning signal actuator. The original equipment manufacturer output device 26 may include an accelerator mechanism, a braking mechanism, a power door lock mechanism, a power window mechanism, a windshield wiper mechanism, a steering wheel control mechanism, or turning signal mechanism.

The self programmable microcontroller 10 comprises an expansion data bus 40. A switch module 42 is electrically coupled to the expansion data bus 40. A second input device 50 is coupled to the vehicle 20. A transmitting device 60 couples the second input device 50 to the switch module 42. A programmer module 70 is electrically coupled to the expansion data bus 40. An expansion module 90 is electrically coupled between the original equipment manufacturer control module 22 and the expansion data bus 40. A source code 110 is stored in the programmer module 70 for programming the switch module 42 for operating the second input device 50 based on the original equipment manufacturer source code 28. A calibration source code 130 is stored in the expansion module 90 for calibrating the expansion module 90 relative to the original equipment manufacturer control module 22. The switch module 42 receives an electrical signal from the second input device 50 and communicates through the expansion module 90 and through the original equipment manufacturer control module 22 for activating the original equipment manufacturer output device 26.

The second input device 50 may include a push button 52, toggle switch 54, rocker switch 56 or a joystick 58. The transmitting device 60 may include an electrical conduit 62 such as an electrical wire. Alternatively, the transmitting device 60 may include a wireless communication device 64 such as a wireless electromagnetic signal.

The expansion module 90 may include a Controller Area Network (CAN) expansion module 92. The switch module 42 receives an electrical signal from the second input device 50 and communicates through the CAN expansion module 92 and through the original equipment manufacturer control module 22 for activating the original equipment manufacturer output device 26.

The expansion module 90 may include a Local Interconnect Network (LIN) expansion module 94. The switch module 42 receives an electrical signal from the second input device 50 and communicates through the Local Interconnect Network (LIN) expansion module 94 and through the original equipment manufacturer control module 22 for activating the original equipment manufacturer output device 26.

The expansion module 90 may include a Controller Area Network (CAN) expansion module 92 and a Local Interconnect Network (LIN) expansion module 94. The switch module 42 receives an electrical signal from the second input device 50 and communicates through the Controller Area Network CAN expansion module 92 and through the original equipment manufacturer control module 22 for activating the original equipment manufacturer output device 26. The switch module 42 receives an electrical signal from the second input device 50 and communicates through the Local Interconnect Network (LIN) expansion module 94 and through the original equipment manufacturer control module 22 for activating the original equipment manufacturer output device 26.

A relay expansion module 150 may be electrically coupled to the expansion data bus 40. The relay expansion module 150 includes a high current relay 152 for operating high current original equipment manufacturers output device 26 within the vehicle 20.

An auxiliary expansion module 160 may be electrically coupled to the expansion data bus 40. A third input device 162 is electrically coupled to the switch module 42. A second calibration source code 164 is stored in the auxiliary expansion module 160 for calibrating the auxiliary expansion module 160 relative to the original equipment manufacturer control module 22. The switch module 42 receives an electrical signal from the third input device 162 and communicates through the auxiliary expansion module 160 and through the original equipment manufacturer control module 22 for activating the original equipment manufacturer output device 26.

The calibration source code 130 may include a baud rate calibration source code 132. The calibration source code 130 may further include a message identifier (ID) calibration source code 134. The calibration source code 130 may further include an idle state calibration source code 136. The calibration source code 130 may further include activating the original equipment manufacturer user input device 24 for defining a function calibration 140.

The function calibration 140 may include a cyclical function 142 and the calibration source code 130 includes a frame look up table 144. The function calibration 140 may include a non-cyclical function 146 and the calibration source code 140 includes a mask 148.

In a second embodiment of the present invention, the self programmable microcontroller 10 may include a modular self programmable microcontroller 10A. More specifically, the switch module 42, programmer module 70, and expansion module 90 may include an external switch module 42A, an external programmer module 70A and an external expansion module 90A respectively.

The modular self programmable microcontroller 10A comprises an expansion data bus 40. An external switch module 42A is electrically coupled to the expansion data bus 40. A second input device 50 is electrically coupled to the external switch module 42A. An external programmer module 70A is electrically coupled to the expansion data bus 40. An external expansion module 90A is electrically coupled between the original equipment manufacturer control module 22 and the expansion data bus 40. A source code 110 is stored in the external programmer module 70A for programming the external switch module 42A for operating the second input device 50 based on the original equipment manufacturer source code 28. A calibration source code 130 is stored in the external expansion module 90A for calibrating the external expansion module 90A relative to the original equipment manufacturer control module 22. The external switch module 42A receives an electrical signal from the second input device 50 and communicates through the external expansion module 90A and through the original equipment manufacturer control module 22 for activating the original equipment manufacturer output device 26.

The combination of the external switch module 42A, the external programmable module 70A, the external expansion module 90A, the external Controller Area Network (CAN) expansion module 92A and the external Local Interconnect Network (LIN) expansion module 94A provides a self programmable microcontroller 10 that includes interchangeable components and defines a modular self programmable microcontroller 10A. The modular self programmable microcontroller 10A can be customized for the specific make, year, model and accessories for various vehicles.

The present invention incorporates a method for programming a microcontroller 10 for operating a vehicle 20. The vehicle 20 has an original equipment manufacturer control module 22 electrically coupled between an original equipment manufacturer user input device 24 and an original equipment manufacturer output device 26. An original equipment manufacturer source code 28 is within the original equipment manufacturer control module 22 for communicating between the original equipment manufacturer user input device 24 and the original equipment manufacturer output device 26. The steps comprise installing an expansion data bus 40 into the vehicle 20. A switch module 42 is installed into the vehicle 20 and is electrically coupled to the expansion data bus 40. A second input device 50 is installed into the vehicle 20 and communicates with the switch module 42. A programmer module 70 is installed into the vehicle 20 and is electrically coupled to the expansion data bus 40. An expansion module 90 is installed into the vehicle 20 and is electrically coupled between the original equipment manufacturer control module 22 and the expansion data bus 40. A source code 110 stored in the programmer module 70 is executed for programming the switch module 42 for operating the second input device 50 based on the original equipment manufacturer source code 28. A calibration source code 130 is executed for calibrating the expansion module 90 relative to the original equipment manufacturer control module 22. The second input device 50 is activated for transmitting an electrical sign to the switch module 42 and through the expansion module 90 and through the original equipment manufacturer control module 22 for activating the original equipment manufacturer output device 26.

The step of executing a calibration source code 130 may include the step of executing a baud rate calibration 132. The step of executing a calibration source code 130 may further include the step of executing a message identifier (ID) calibration 134. The step of executing a calibration source code 130 may further include the step of executing an idle state calibration 136.

The step of executing a calibration source code 130 may further include the step of activating the original equipment manufacturer user input device 24 for defining a function calibration 140. The step of executing a calibration source code 130 may further include the step of determining if the function calibration 140 includes a cyclical function 142. A frame look up table 144 is produced from the calibration source code 130 if the function calibration 140 includes the cyclical function 142.

The step of executing a calibration source code 130 may further include the step of determining if the function calibration 140 includes a non-cyclical function 146. A mask 138 is produced from the calibration source code 130 if the function calibration 140 includes the non-cyclical function 146.

The method may alternatively include the steps comprises installing an expansion data bus 40 into the vehicle 20. A switch module 42 is installed into the vehicle 20 and is electrically coupled to the expansion data bus 40. A second input device 50 is installed into the vehicle 20 and communicates with the switch module 42. A programmer module 70 is installed into the vehicle 20 and is electrically coupled to the expansion data bus 40. An expansion module 90 is installed into the vehicle 20 and is electrically coupled between the original equipment manufacturer control module 22 and the expansion data bus 40. A source code 110 stored in the programmer module 70 is executed for programming the switch module 42 for operating the second input device 50 based on the original equipment manufacturer source code 28. A message identifier (ID) calibration source code 134 is executed for calibrating the expansion module 90 relative to the original equipment manufacturer control module 22. An idle state calibration source code 136 is executed for calibrating the expansion module 90 relative to the original equipment manufacturer control module 22. An idle state calibration source code 136 is executed for calibrating the expansion module 90 relative to the original equipment manufacturer control module 22. The original equipment manufacturer user input device 24 is activated for defining a function calibration 140 relative to the original equipment manufacturer output device 26. The second input device 50 is activated for transmitting an electrical sign to the switch module 42 and through the expansion module 90 and through the original equipment manufacturer control module 22 for activating the original equipment manufacturer output device 26.

The Switch system 10 is designed to control functions within a vehicle 20 from an alternative interface to the Original Equipment Manufacturer (OEM) controls 24. Functions include but are not limited to turn signals, horn, headlight high beams, windshield wiper and windshield washer 24.

Many aftermarket systems exist to relocate vehicle controls. The Switch system 20 provides scalability. The programmer 70, relay expansion units 150, LIN expansion units 94, and CAN expansion units 92 may be modular and can be included or excluded, depending on the vehicle and user requirements. This system is also scalable for the addition of future modules 160.

Since vehicles and user requirements can be different, the ability to quickly and easily generate a system with only the required modules allows for a more cost-effective solution and a smaller footprint within the vehicle.

All systems require an input device 50, as well as a Switch Master Module (SMM) 42. The rest of the units are scalable systems, and each system is outlined in detail within this document.

The Switch system 10 always maintains OEM activation as well as relocated activation. The relocated controls can be used to control a vehicle function, or the OEM controls can be used to control a vehicle function, but both cannot be used for the same function simultaneously. For example: If the right turn signal is activated through the relocated controls, it cannot be deactivated through the OEM controls.

Input Device(s)

The input devices 50 can consist of one or more user interfaces to communicate with the SMM 42. The SMM 42 has two connectors that allow for up to 14 physical switches to be connected. The SMM 42 also contains a radiofrequency (RF) receiver 64 that allows for 24 external switches to be transmitted to the SMM module 42. The physically connected input devices are Single Pole Single Throw (SPST) normally open switches with one side connected to the microcontroller through supporting circuitry and the other side connected to vehicle chassis ground. The wireless devices 64 are battery-powered and transmit a paired ID along with a byte signaling which switch is pressed. The wireless devices 64 transmit which switch 50 is pressed for as long as the switch 50 is held and will stop transmission when the switch 50 is released.

The ID for wireless devices is semi-unique. When the device is built for a specific vehicle, the wireless device generates a random 2-byte ID between 0-65,535. The SMM is paired to the wireless device through firmware.

The interfaces can be one or more switches connected directly to the SMM, wireless devices paired with the SMM or a combination of the two.

The communication between the input devices 50 and the SMM 42 only updates the SMM 42 of which switch 50 is pressed and does not control any logic for how the SMM handles the push button presses.

SMM

The SMM 42 controls vehicle function activation based on preprogrammed parameters. Functionality is customizable and is specific to the vehicle it is installed in. The SMM 42 contains 8 physical Single Pole Double Throw (SPDT) relays that can be installed into a vehicle through the SMM main wire harness. All normally connected and common relay contacts are accessible through the SMM main wire harness. 3 of the normally connected relay contacts are accessible through the SMM main wire harness. The SMM 42 contains a data port that connects the SMM to the peripheral devices (relay expansion, programmer, CAN and LIN modules).

The SMM 42 is a master on the SMM Data Bus 40, which is a modified LIN2.0 bus. This data bus is shared only by the SMM and expansion devices. Based on input device(s) status, as well as the programming of the SMM, the SMM controls which internal relays are energized, requests from expansion modules or requests from the programmer module.

The program for the SMM is located on non-volatile EEPROM memory and is programmed for specific applications and device support. The SMM utilizes a buzzer for operational and installation feedback. The SMM contains a connector to the main SMM harness. The main SMM harness is a 22-pin harness that installs directly into the vehicle, installation is specific to the vehicle and functions required. The 8 onboard relays, power in and brake sense in are accessible through the main SMM harness.

The SMM 42 has brake sense circuitry that connects to a 12v active brake signal within the vehicle 20. This circuitry allows the SMM 42 to detect when the brake pedal is pressed and modify operation accordingly. For example: If the user activates the right turn signal through one of the Switch input devices, the SMM will deactivate the turn signal after a certain time, based on the SMM programming. The timer will only count down if the brake pedal is not pressed, allowing for the turn signals to stay on indefinitely while the user has the brake pedal depressed.

The SMM bus connectors have 4 wires: power, ground, LIN data and programmer switch. The 4 wires allow for additional modules to be connected to the data bus.

The SMM and peripheral devices are powered through the vehicle ignition. The device(s) only turn on when the vehicle ignition is on. This stops the device from drawing power when the vehicle ignition is off. When the vehicle ignition is off, the SMM and peripheral devices are in a normally connected state, allowing for OEM operation if the device(s) are not powered.

Relay Expansion Module

The relay expansion module (REM) 150 utilizes 4 additional SPDT relays for systems that require more relays than the 8 built-in on the SMM. The REM 150 can also accommodate for applications that require a higher current than the SMM is rated for. The relay activation on the REM is controlled by the SMM through the data bus.

The REM contains a pair of dual in-line package (dip) switches to modify the REM ID on the SMM data Bus 40. The 2 dip switches change the addressing from 0-3, allowing for up to 4 different relay expansion modules connected to a single SMM.

To energize a relay on the REM, the SMM sends the ID followed by a byte to denote which relay to energize. The REM replies with which relay is energized. If the SMM does not receive a reply, more requests to energize the relay are made by the SMM. The SMM will try to send its request until it does not receive a reply 5 consecutive times. After the 5th request without a reply, the SMM will sound an error buzzer, signaling that there is a communication error between the SMM and the REM.

The REM contains 2 data connectors. One is used to connect to the SMM data bus and the second is used for additional expansion modules if required.

Activate Expansion Function
SMM
Break(0b0000000)
Sync (0h55)
Address(0xXX)
Function (OxXX)
Expansion Module
Function (OxXX)
Checksum (OxXX)

Programmer Module

The programmer module 70 allows for the program located on the SMM 42 to be changed. The full SMM program can be downloaded from the programmer module 70 or specific operational code can be changed. The SMM program controls 110 how the system reacts to user input. The programmer module 70 contains an SD card to allow programmer files 110 to be uploaded to the programmer module 70. The programmer module 70 contains an LCD screen for menu display, as well as 4 directional push buttons to navigate the menu.

The programmer module 70 connects to the SMM 42 through the SMM data bus connector 40, utilizing the same data bus as the expansion modules 90. The programmer has a single wire to the SMM that initiates a program request. When the program request is initiated, the SMM sends a status request to the programmer module. The programmer module replies by requesting data, sending data, do a command or idle.

The data frame structure is shown below:

Send program Dump from SSRB to Programmer
SMM
Break(0b000000000000000)
Sync (0h55)
Address(0xXX)
Control Byte(0x01)
Programmer
controle Byte (0x02)
Checksum (0xXX)

Sending Byte from SMM to Programmer
SMM
Break(0)
Sync (0h55)
Address(0xXX)
Control Byte (0x02)
Address L(0xXX)
Address H(0xXX)|
Data (0xXX)
Programmer
CheckSum(0xXX)

Sending Byte from Programmer to SMM
SMM Programmer
Break(0b0000000)
Sync (0h55)
Address(0xXX)
Control Byte (0x01)
Programmer
Control Byte (0x01)
Address L(0xXX)
Address H (0xXX)

Data (0xXX)
Checksum (0xXX)
Programmer is Idle
SMM Programmer
Break(0b000000000000000)
Sync (0hSS)
Address(0xXX)
Control Byte (0x01)
Programmer
controle Byte (0x03)
Checksum (0xXX)
Do command on SMM
SMM
Break(0b000000000000000)
sync(0h55)
Address(0xXX)
Control Byte (0x01)
Programmer
Control Byte (0x04)
Macro (0xXX)
Checksum(0xXX)

All features of the SMM 42 can be changed through the programmer 70. This includes all aspects for each button press. Trigger 1 (button 1) is used as an example but is similar for buttons 1-24. This can be found in Memory MapV1. Memory MapV1 holds all memory variables of the SMM and is directly programmed from the programmer.

CAN Expansion Module

CAN Expansion Modules (CEM) 92 are calibrated at the time of installation and are for use in vehicles where integration into the CAN bus is required to control functions. The activation Input Device(s) of functions through the CEM is initiated from the SMM data bus 40.

LIN Expansion Module

UN Expansion modules (LEM) 94 are calibrated at the time of installation and are for use in vehicles that require integration into the vehicle LIN bus to control the required functions. The activation of functions through the LEM is initiated from the SMM data bus.

Additional Modules

Additional Modules 160 can be implemented in the future utilizing the same SMM Data Bus 40.

Example Vehicle 1

Example vehicle 1 requires the following function relocations on a wireless device: turns, horn, headlight high beams, front wiper, front windshield washer 26.

Example vehicle 1 has the following OEM interface:

Horn—Momentary switch press with access to the horn activation wire. When the activation wire is connected to ground, the horn is on.

Turn signals—latching switch directly coupled to a control module. The control module C 22 is connected to the body CAN bus. Only have access to the body CAN bus wires.

Headlight high beams—latching switch directly coupled to a control module 22. The control module C 22 is connected to the body CAN bus. Only have access to the body CAN bus wires.

Front Wiper—The front wiper switch is a latching radial switch with different connections depending on wiper speeds. The wiper switch is directly coupled to control module A 22. Control module A 22 is connected to control module B 22 through a LIN bus. Control module B 22 directly controls the wiper motor.

Front windshield washer—The windshield washer switch is a momentary switch. The windshield washer switch is directly coupled to control module A 22. Control module A 22 is connected to control module B 22 through a LIN bus. Control module B 22 directly controls the front windshield washer pump.

The headlight high beam switch and turn signal switches are directly coupled to the same control module that transmits the corresponding switch position on the CAN bus.

This system will require a wireless input device 64, an SMM 42, a CEM 92 and a LEM 94.

For turn signals and headlight high beams control module C 22 is removed from the body CAN module 22. A CEM 92 is installed between control module C 22 and the body CAN bus. The CEM 92 is calibrated for 3 functions: right turn signal, left turn signal and headlight high beams.

For the front wiper and front windshield washer, control module A 22 is removed from OEM LI N bus. A LIN expansion module 94 is installed between control module A 22 and the OEM LIN bus. A LIN expansion module 94 is calibrated for 3 functions: front wiper high, front wiper low, front windshield washer.

An SMM relay is connected directly to the horn switch.

The SMM 42 is programmed through the SMM programmer. The SMM programmer may be removed from the system once the programming is completed. The SMM is programmed so that:

When a specific button is pressed on the wireless device, the SMM 42 detects the button pressed through the RF data received. If the button press is programmed to activate the left turn signal on the SMM 42, the SMM communicates with the CEM 92 to activate the left turn signal 26. The left turn signal has been calibrated on the CEM 92. The CEM 92 applies the left turn signal mask 138 to the ID(s) calibrated 134 to be left turn signal on the body CAN bus. The CEM will continue to apply the mask 138 to all calibrated ID data 134 transmitted to the body CAN bus, telling the vehicle 20 that the turn signal switch is in the left position. The left turn signal mask 138 will be applied to the relevant IDs data until the SMM 42 receives the button associated with the left turn signal from the wireless device, until the predetermined delay has passed with no brake presses or until the button programmed for the right turn signal is received by the SMM from the wireless device. At that time, the SMM 42 will communicate with the CEM 92 through the SMM data bus 40 to deactivate the left turn signal 26.

When a specific button is pressed on the wireless device, the SMM detects the button pressed through the RF data received. If the button press is programmed to be the right turn signal on the SMM, the SMM communicates with the CEM to activate the right turn signal. The right turn signal has been calibrated on the CEM. The CEM applies the right turn signal mask to the ID(s) calibrated to be the right turn signal on the body CAN bus. The CEM will continue to apply the mask to all calibrated ID(s) data transmitted to the body CAN bus, telling the vehicle 20 that the turn signal switch is in the right position. The right turn signal mask 138 will be applied to the relevant IDs data until the SMM receives the button associated with the left turn signal from the wireless device, until the predetermined delay has passed with no brake presses or until the button programmed for the right turn signal is received by the SMM from the wireless device. At that time, the SMM will communicate with the CEM through the SMM data bus to deactivate the right turn signal.

When a specific button is pressed on the wireless device, the SMM 42 detects the button pressed through the RF data received. If the button press is programmed to be headlight high beam on the SMM, the SMM communicates with the CEM to activate the headlight high beam. The headlight high beam has been calibrated on the CEM. The CEM applies the headlight high beam mask to the ID(s) calibrated to be headlight high beam on the body CAN bus. The CEM will continue to apply the mask to all calibrated ID(s) data transmitted to the body CAN bus, telling the vehicle that the headlight high beam switch is active. The headlight high beam mask will be applied to the relevant IDs data until the SMM receives the button associated with the headlight high beam from the wireless. At that time, the SMM will communicate with the CEM through the SMM data bus to deactivate the headlight high beam.

When a specific button is pressed on the wireless device, the SMM 42 detects the button pressed through the RF data received. If the button press is programmed to be Wiper on the SMM 42, the SMM 42 communicates with the LEM 94 to activate wiper 26. The wiper 26 has been calibrated on the LEM 94. The LEM 94 applies the wiper mask 138 to the ID(s) calibrated 134 to be wiper that are transmitted to Control Module B 22. The LEM will continue to apply the mask to all calibrated ID data transmitted to Control Module B, telling the vehicle that the wiper switch is in the wiper low position. The wiper mask will be applied to the relevant IDs data until the SMM receives the button associated with the wiper from the wireless device. At that time, the SMM will communicate with the LEM through the SMM data bus to deactivate the wiper.

When a specific button is pressed on the wireless device, the SMM detects the button pressed through the RF data received. If the button press is programmed to be horn 26 on the SMM, the SMM energizes the on-board relay connected to the horn switch, closing the relay. The horn switch is activated, simulating a horn press. The SMM relay is energized until the SMM stops receiving the button press programmed to be horn. At that time, the SMM stops energizing the relay, opening the relay, which stops simulating the horn switch is activated.

Example Vehicle 2

Example vehicle 2 requires the following function relocations on a wireless device: turns.

Example vehicle 2 has the following OEM interface:

Turn signals—latching switch coupled to the body control module through wires. The left turn signal 26 is activated when two contacts are connected at the turn signal switch. The right turn signal 26 is activated when two contacts are connected at the left turn signal switch.

This system will require a wireless input device 64, and an SMM 42.

For turn signals 26, an on-board SMM relay is connected the right turn signal wire and a different SMM relay is connected to the left turn signal wire.

The SMM 42 is programmed through the SMM programmer 70. The SMM programmer may be removed from the system once the programming is completed. The SMM is programmed so that:

When a specific button is pressed on the wireless device, the SMM 42 detects the button 50 pressed through the RF data received. If the button press 50 is programmed to be left turn signal on the SMM 42, the SMM 42 energizes the on-board relay connected to the left turn signal switch, closing the relay. The left turn signal switch is activated, simulating a left turn signal press. The relay is energized until the preprogrammed delay has passed with no brake press, the SMM received the button press associated with the left turn signal from the wireless device or until the button preprogrammed for the right turn signal is received by the SMM from the wireless device. At that time, the SMM stops energizing the relay, opening the relay, which stops simulating the left turn signal is activated.

When a specific button is pressed on the wireless device, the SMM detects the button pressed through the RF data received. If the button press is programmed to be right turn signal on the SMM, the SMM energizes the on-board relay connected to the right turn signal switch, closing the relay. The right turn signal switch is activated, simulating a right turn signal press. The relay is energized until the preprogrammed delay has passed with no brake press, the SMM received the button press associated with the right turn signal from the wireless device or until the button preprogrammed for the left turn signal is received by the SMM from the wireless device. At that time, the SMM stops energizing the relay, opening the relay, which stops simulating the right turn signal is activated.

Example Vehicle 3

Example vehicle 3 requires the following function relocations on a wireless device: turns, headlight high beams, front wiper, front windshield washer, power windows 26.

Example vehicle 3 has the following OEM interface:

Turn signals—latching switch directly coupled to a control module. The control module A is connected to an OEM LIN bus. Only have access to the LIN bus.

Headlight high beams—latching switch directly coupled to a control module. The control module A is connected to an OEM LIN bus. Only have access to the LIN bus.

Front Wiper—latching switch directly coupled to a control module. The control module A is connected to an OEM LIN bus. Only have access to the LEN bus.

Front windshield washer—Momentary switch directly coupled to a control module. The control module A is connected to an OEM LIN bus. Only have access to the LIN bus.

Power windows—The power window switch is coupled to the power window motor through wires. The power window switches act as an H-Bridge, directly powering the window motor based on switch position. The power window motor takes more current than the SMM can safely handle.

This system will require a wireless input device, an SMM, a LIN expansion module and a Relay Expansion module.

For turn signals, headlight high beam and wiper low control module A is removed from the LIN bus. ALEM is installed between control module A and the OEM LIN bus. The LEM is calibrated for 4 functions: right turn signal, left turn signal headlight high beams, front wiper low and front windshield washer.

For the power window a REM is installed between the window motor and the power window switch. 4 relays are required. When no relays are energized, relays are in the normally connected position, bridging the OEM switch connections to the power window motor. If two of the relays are energized, it breaks the OEM switch from the circuit and powers the power window motor in the up direction. If all 4 relays are energized, it breaks the power window switch connection from the power window motor and powers the power window motor in the down direction.

The SMM is programmed through the SMM programmer. The SMM programmer may be removed from the system once the programming is completed. The SMM is programmed so that:

When a specific button 50 is pressed on the wireless device, the SMM 42 detects the button pressed through the RF data received. If the button press is programmed to be left turn signal on the SMM, the SMM communicates with the LIN expansion module to activate the left turn signal. The left turn signal has been calibrated on the LEM. The LEM applies the left turn signal mask to the ID(s) calibrated to be left turn signal on the body LIN bus. The LEM will continue to apply the mask to all calibrated ID data transmitted to the LIN bus, telling the vehicle that the turn signal switch is in the left position. The left turn signal mask will be applied to the relevant IDs data until the SMM receives the button associated with the left turn signal from the wireless device, until the predetermined delay has passed with no brake presses or until the button programmed for the right turn signal is received by the SMM from the wireless device. At that time, the SMM will communicate with the LEM through the SMM data bus to deactivate the left turn signal.

When a specific button 50 is pressed on the wireless device, the SMM 42 detects the button pressed through the RF data received. If the button press is programmed to be right turn signal on the SMM, the SMM communicates with the LEM 94 to activate the right turn signal. The right turn signal has been calibrated on the LEM 94. The LEM 94 applies the right turn signal mask to the ID(s) calibrated to be right turn signal on the LIN bus. The LEM 94 will continue to apply the mask 138 to all calibrated ID(s) data 134 transmitted to the LIN bus, telling the vehicle that the turn signal switch is in the right position. The right turn signal mask will be applied to the relevant IDs data until the SMM receives the button associated with the right turn signal from the wireless device, until the predetermined delay has passed with no brake presses or until the button programmed for the left turn signal is received by the SMM from the wireless device. At that time, the SMM will communicate with the LEM through the SMM data bus to deactivate the right turn signal.

When a specific button 50 is pressed on the wireless device, the SMM 42 detects the button pressed through the RF data received. If the button press is programmed to be headlight high beam on the SMM, the SMM communicates with the LEM 94 to activate the headlight high beam. The headlight high beam has been calibrated on the LEM 94. The LEM 94 applies the headlight high beam mask 138 to the ID(s) calibrated to be headlight high beam on the LIN bus. The LEM will continue to apply the mask to all calibrated ID(s) data transmitted to the LIN bus, telling the vehicle that the headlight high beam switch is active. The headlight high beam mask will be applied to the relevant IDs data until the SMM receives the button associated with the headlight high beam from the wireless. At that time, the SMM will communicate with the LEM through the SMM data bus to deactivate the headlight high beam.

When a specific button is pressed on the wireless device, the SMM detects the button pressed through the RF data received. If the button press is programmed to be Wiper on the SMM, the SMM communicates with the LEM to activate wiper. The wiper has been calibrated on the LEM. The LEM applies the wiper mask to the ID(s) calibrated to be wiper that are transmitted the LIN bus. The LEM will continue to apply the mask to all calibrated ID data transmitted to LIN bus, telling the vehicle that the wiper switch is in the wiper low position. The wiper mask will be applied to the relevant IDs data until the SMM receives the button associated with the wiper from the wireless device. At that time, the SMM will communicate with the LIN module through the SMM data bus to deactivate the wiper.

When a specific button is pressed on the wireless device, the SMM detects the button pressed through the RF data received. If the button press is programmed to be Wiper on the SMM, the SMM communicates with the LEM to activate wiper. The wiper has been calibrated on the LEM. The LEM applies the wiper mask to the ID(s) calibrated to be wiper that are transmitted the LIN bus. The LEM will continue to apply the mask to all calibrated ID data transmitted to the LIN bus, telling the vehicle that the wiper switch is in the wiper low position. The wiper mask will be applied to the relevant IDs data until the SMM receives the button associated with the wiper from the wireless device. At that time, the SMM will communicate with the LEM through the SMM data bus to deactivate the wiper.

When a specific button is pressed on the wireless device, the SMM detects the button pressed through the RF data received. If the button press is programmed to be Wiper on the SMM, the SMM communicates with the LEM to activate wiper. The wiper has been calibrated on the LEM. The LEM applies the wiper mask to the ID(s) calibrated to be wiper that are transmitted the LIN bus. The LEM will continue to apply the mask to all calibrated ID data transmitted to the LIN bus, telling the vehicle that the wiper switch is in the wiper low position. The wiper mask will be applied to the relevant IDs data until the SMM receives the button associated with the wiper from the wireless device. At that time, the SMM will communicate with the LEM through the SMM data bus to deactivate the wiper.

When a specific button is pressed on the wireless device, the SMM detects the button pressed through the RF data received. If the button press is programmed to be front windshield washer on the SMM, the SMM communicates with the LEM to activate front windshield washer. The front windshield washer has been calibrated on the LEM. The LEM applies the front windshield washer mask to the ID(s) calibrated to be front windshield washer that are transmitted to the LIN bus. The LEM will continue to apply the mask to all calibrated ID data transmitted to the LIN bus, telling the vehicle that the front windshield washer switch is active. The front windshield washer mask will be applied to the relevant IDs data until the SMM stops receiving the button associated with the front windshield washer from the wireless device. At that time, the SMM will communicate with the LEM through the SMM data bus to deactivate the front windshield washer.

When a specific button is pressed on the wireless device, the SMM detects the button pressed through the RF data received. If the button press is programmed to be power window up on the SMM, the SMM communicates with the REM to energize the two relays preprogrammed in the SMM to be power window up. The REM replies to the SMM request with the two relays activated. The SMM communicates with the REM to de-energize the two relays preprogrammed for power window up when the SMM stops receiving the button press from the wireless device programmed for power window up.

When a specific button is pressed on the wireless device, the SMM detects the button pressed through the RF data received. If the button press is programmed to be power window down on the SMM, the SMM communicates with the REM to energize the four relays preprogrammed in the SMM to be power window down. The REM replies to the SMM request with the four relays activated. The SMM communicates with the REM to de-energize the four relays preprogrammed for power window down when the SMM stops receiving the button press from the wireless device programmed for power window down.

CAN Expansion Module (CEM)

The CEM 92 calibrates to one or more functions of a specific node on a specific vehicle CAN Bus. The calibration is explained as follows:

Step 1: Cut Node

For example, we use Node 4 as the node that controls the desired functions.

Break the connection at desired node. Break connection at the desired node. The desired node is the control module responsible for controlling the desired functions. For example: The wiper switch is directly coupled to the Steering Column Control Module (SCCM) in a 2020 Chrysler Pacifica. The SCCM is directly coupled to the C-CAN bus. The SCCM CAN High and CAN Low wires are cut near the connector, keeping the remaining nodes and main bus intact. This only removes the SCCM from the C-CAN bus.

The battery should be disconnected from the vehicle to ensure that removing the SCCM does not cause any CAN faults. For the steps listed, Node 4 will be used as an example. These steps will apply to any nodes located on a specific CAN bus and can apply to any CAN buses located in the vehicle.

Step 2: Install CAN Module

Install CAN Expansion Module 92 between main CAN bus and Node 4.

Install the CEM between the main CAN bus and Node 4. The installation requires the following connections are made: CAN Hi Sw from the CEM is connected to the CAN Hi cut wire on Node 4, CAN Hi Car from the CEM is connected to the CAN Hi cut wire at the CAN main bus, CAN Lo Sw from the CEM is connected to the CAN Lo cut wire at Node 4 and CAN Lo Car from the CEM is connected to the CAN Lo cut wire at the CAN main bus.

All functions associated with the isolated node, in the example Node 4, are in the idle or resting position. For example: A 2020 Chrysler Pacifica SCCM controls the activation of the turn signals, headlight high beams, front wiper, rear wiper and cruise control. The user must ensure that all function activation mechanisms are in the off position. For example: Ensure that the turn signal lever is in the natural position so that neither the left turn signal nor right turn signal are active.

The CEM relay ensures that Node 4 is still electrically coupled to the main bus through the CAN High and CAN Low wires. At this stage, the CEM is unpowered.

Step 3: Calculate Baud Rate

The device is powered on.

Using the relays connecting Node 4 to the main bus, the CEM will cycle through various baud rates 132 and check the data received against the CAN frame Cyclic Redundancy Check (CRC) field until no frame errors are noticed for multiple frames. At this stage transmission is disabled for both Transceiver 1 and Transceiver 2, the CEM can only receive data so that the module does not interfere with the transmissions between the main CAN bus and Node 4.

Once the correct baud rate is determined, the system stores the baud rate into memory. This is the baud rate that the system will use for the rest of the calibration procedure.

Step 4: Calculate IDs

Once the baud rate 132 is determined and stored, the system energizes the relay, disconnecting the CAN HI and CAN LO wires, effectively removing Node 4 from the main CAN bus. Transceiver 1 is directly coupled to the main bus and transceiver 2 is directly coupled to Node 4. The data received by Transceiver 1 is transmitted by Transceiver 2 and the data received from Transceiver 2 is transmitted by Transceiver 1. This happens in a frame-by-frame method, meaning that once a full frame is received by Transceiver 1, the full frame is then transmitted by Transceiver 2. Once a full frame is received by Transceiver 2, the frame is then transmitted by Transceiver 1. At this stage Transceiver 1 and 2 are enabled to transmit.

When each frame is received from Node 4, the ID 134 is stored. This is done for a set amount of time or until a certain number of IDs or frames are received to ensure all unique IDs transmitted by Node 4 are recorded.

Standard CAN arbitration applies for bus conflicts.

The relay is de energized upon completion of Calculate IDs, 134 reconnecting Node 4 to the main CAN bus.

Step 5: Record IDLE State

At this stage, the system records all data frames Node 4 transmits. This includes data and ID information. The system also records any repeating bytes 136.

For example: The 2020 Chrysler Pacifica cruise control frame 2nd byte is cyclical and repeats in the pattern-0x00, 0x10, 0x20, 0x30, 0x40, 0x50, 0x60, 0x70, 0x80, 0x90, 0xA0, 0xB0, 0xC0, 0xD0, 0xE0, 0xF0, restarting at 0x00 on the 17 iteration. The system records that byte 2 for the corresponding ID repeats on a 16-iteration cycle.

The system also records all unique frames associated with the repeating function. At the end of this stage the system will have recorded all unique frames that Node 4 has transmitted and if the frames have cyclical bytes, as well as all data associated with each cycle of a cyclical byte.

For example: The 2020 Chrysler Pacifica cruise control ID would have 16 frames saved for the idle state.

Step 6: Calibrate Functions

A user physically actuates each function that the system is required to control.

For example: If the user intends to control the right turn signal and that is associated with Node 4, the user will actuate the right turn signal stock. Once the function is physically actuated, the user will prompt the system to calibrate to that function 140. This is done through a push button located on the CEM and initiates the function calibration.

During the function calibration 140 the system:

a) Records the messages replied to by Node 4, including all unique frames for cyclical functions outlined in step 5.

b) Compares the new messages to the idle message 136 recorded in step 5.

c) Records any IDs that changes when the function is activated compared to the idle state.

d) If the ID data is cyclical 142, all unique frames are recorded into a look up table 144 for this function. If the ID data is not cyclical 146 a mask 138 is generated for the data bytes on IDs that changed in step 6c. based on the difference in bytes at idle compared to bytes when the function is active. The calculated mask 138, when applied to the idle data 136, will reproduce the functional data 140.

e) If there are multiple IDs 134 that changed when the function 140 was activated, the system signals to the user to turn the function off within 5 seconds. After 5 seconds the system records, rechecks the IDs against the idle values and throws away any IDs that did not go back to the idle state. If multiple IDs are still associated with the function, the calibration for that function must be reperformed.

Step 6 is repeated for all functions required at the isolated node, in this example Node 4.

Two mask bytes are generated for each mask 138. One mask byte is for bits that go from 0 to 1 and another mask byte is generated for bits that go from 1 to 0.

An OR mask is used to change bits from 0 to 1 and an AND mask is used to change bits from 1 to 0. For example: If the idle data of a byte is 0b00000000 and the function activation of the right turn signal is 0b01000000.

The mask generated would be:

0Ob01000000 for the OR byte.

0b11111111 for the AND byte.

Applying both masks would yield the right turn signal data from the idle data as shown:

0b00000000 OR 0b01000000=0bl0000000

0b0l000000 AND 0b11111111=0b0l000000

Step 7: Validation

The user prompts the system to complete calibration by switching the mode from 'calibrate' to 'operate' by using a switch on the PCB. Before entering operation mode, the system first verifies the calibration data. If there are multiple functions found to have the same ID with a cyclical frame, the system must use an algorithm to generate the check byte, based on a combination of cycle, active function and check byte.

The system goes through stored algorithms until an algorithm that fits the vehicle is found. Once the algorithm is found, that is stored with each function. To generate modified data, in this case, a mask function mask is applied to the data only, the cycle is passed through, and the check byte is generated, based on the stored algorithm. If no stored algorithm is found to fit the data, the system will not complete the calibration.

A stored algorithm is only used if the functions calibrated are cyclical and share the same ID. Once validated the system enters operation mode.

Step 8: Operation

In operation mode, the messages received by Transceiver 1 are transmitted by Transceiver. The messages received by Transceiver 2 are transmitted by Transceiver 1. If the user prompts a function to be activated by a push-button or other means, the data transmitted by Transceiver 1 is modified based on the calibration data. If the ID is cyclical and does not require an algorithm found in step 7, the function lookup table is used and the frame corresponding with the proper cycle is transmitted. If the ID is not cyclical, the appropriate mask is applied, and the modified data is transmitted. If the ID requires an algorithm, the appropriate mask is applied to the data bytes, the cycle is passed through, and an algorithm is used to generate the check byte.

For example: If Node 4 is transmitting the state of the turn signals and the user prompts the right turn signal to activate by holding the corresponding push button located on the CEM, the system will apply the corresponding right turn signal mask to all messages from the controlling ID transmitted by Node 4 and transmit that data through Transceiver 2 to the main CAN bus. The main CAN bus will receive the data corresponding to the right turn signal being enabled, even though Node 4 is transmitting that the right turn signal is at idle.

Only IDs that are associated with the function are modified. All other data is passed though without modification.

LIN Expansion Module (LEM)

The LEM 94 calibrates to one or more functions 140 of a specific node on a specific vehicle LIN Bus. The calibration is explained as follows:

Step 1: Cut Node

Break connection at desired node. For example, we use Node 4.

Break connection at the desired node. The desired node is the module responsible for controlling the desired functions. For example: The multifunction switch is directly coupled to the Steering Control Module (SCM) in a 2018 Dodge Grand Caravan. The SCM is directly coupled to the instrument cluster through a LIN bus. The SCM LIN connection is cut close to the SCM. This only removes the SCM from this LIN bus.

The battery should be disconnected from the vehicle to ensure that removing the SCM does not cause an implausible or undesirable signal. For the steps listed Node 4 will be used as an example. These steps will apply to any nodes located on a specific LIN bus and can apply to any LIN buses located in the vehicle.

Step 2: Install LIN Expansion Module

Install LEM between main LIN bus and Node 4.

Install the LEM 94 between the main LIN bus and Node 4. The installation requires the following connections are made: LIN Sw from the LEM is connected to the LIN cut wire on Node 4, LIN Car from the LEM is connected to the LIN cut wire at the LIN main bus.

All functions associated with the isolated node, in the example Node 4, are in the idle or resting position. For example: A 2018 Dodge Grand Caravan SCM controls the activation of the turn signals, headlight high beams, front wiper and rear wiper. The user must ensure that all function activations are in the off position. For example: Ensure that the turn signal lever is in the natural position so that neither the left turn signal nor the right turn signal are active.

The LEM relay ensures that Node 4 is still electrically coupled to the main bus through the LIN wires. At this stage, the LEM is unpowered.

Step 3: Calculate Baud Rate

At this step the device is powered on.

Using the relay connecting Node 4 to the main bus, the module will calculate the time between bits several times to calculate the baud rate 132 used. The local minimum time between bits is saved so long as it corresponds to a maximum baud rate that is less than the maximum transmission speed of LIN 2.0 (20 kbit/s).

Baud Rate=1/Bit Time

The Baud rate is then used to verify proper frame transmission for the next 5 frames received. If the check byte is correct for the next 5 frames, the baud rate is stored into non-volatile memory and used for the rest of the calibration procedure.

Step 4: Calculate IDs 4.1: With the baud rate calculated, the system opens the relay, disconnecting Node 4 from the main LIN bus. All IDs received from the main bus (LIN Transceiver 1) are transmitted to Node 4 (LIN Transceiver 2). Each ID transmitted by LIN Transceiver 2 is checked for a response from Node 4 in an acceptable response time for the LIN frame, based on the previously calculated baud rate. If a response is noticed, the ID is recorded and flagged as non-sporadic. If there are no responses noticed from Node 4 within 500 mS, the LEM proceeds to step 4.2. If responses are found from Node 4, Node 4 is a slave node on the main LIN bus.

4.2: The LEM checks for traffic on Node 4 in a similar fashion to 4.1. All IDs received from Node 4 are checked for a response from Node 4. This is to verify the presence of sporadic frames. If Node 4 is transmitting an ID and replying to the ID in an acceptable response time for the LIN frame, based on the previously calculated baud rate, the ID is recorded and flagged as sporadic. If no traffic is seen from Node 4 within 500 mS, the system goes back to step 4.1, waiting for traffic from the main LIN bus. If the ID is flagged as sporadic, Node 4 is the master on the main LIN bus.

Once at least 1 ID 134 is gathered the system gathers all IDs over 500 mS. The LIN bypass relay closes to allow passing LIN data to and from Node 4 to the main LIN bus. Transmission is then disabled for LIN Transceiver 1 and LIN Transceiver 2.

Step: Record Idle State

The system records 16 consecutive frames for each ID recorded in Step 4. Each received frame is verified for integrity by checking a proper PID and check byte. The frame length and data bytes are stored in a table. Once 16 consecutive frames for each ID are collected, the frames are checked to see if they are cyclic. Acyclic frame consists of a byte that counts up or down each subsequent frame.

For example: On a 2020 Chrysler Pacifica the cruise control switch LN slave response 2nd data byte is cyclical and repeats in the pattern-0x00, 0x10, 0x20, 0x30, 0x40, 0x50, 0x60, 0x70, 0x80, 0x90, 0xA0, 0xB0, 0xC0, 0xD0, 0xE0, 0xF0, restarting at 0x00 on the 17 iteration. The system records that byte 2 is cyclical and records all slave responses for each unique cycle, in this case all 16 unique frames.

At the end of this stage, the system will have recorded all unique frames for IDs found in Step 4 and if the frames have cyclical bytes. The system will also record all data associated with each unique cycle of a cyclical ID or will only record a single frame if the ID is not cyclical. If a frame is not cyclical, a cycle of 1 is recorded.

Step 6: Calibrate Functions

The user physically actuates each function that the system is required to control. For example: If the user intends to control the right turn signal and that is associated with Node 4, the user will actuate the right turn signal lever.

Once the function is physically actuated, the user will prompt the system to calibrate 140 to that function. This is done through a push button located on the LEM and initiates the function calibration 140. Each function is calibrated to a specific push button. For example: If the right turn signal is calibrated to calibration button 1, the left turn signal activation data is linked to calibration button 1.

During the function calibration the system:

a) Record the messages replied to by Node 4, including all unique frames for cyclical functions 142 outlined in step 5.
b) If the ID is not cyclical 146: Compare the new frame to the idle frame recorded in step 5. The frames compared are the data bytes in the responses to the same ID at idle and with the function active.
c) Record any data that changes when the function is activated compared to the idle state.
d) Generate a mask 138 for the data bytes on IDs that changed in step 6c based on the difference in bytes at idle compared to bytes when the function is active. The calculated mask, when applied to the idle data, will reproduce the data frame when the function is active.

Step 6 is repeated for all functions required at the isolated node, in this example Node 4.

For non-cyclical 146 functions two mask bytes are generated for each mask 138. One mask byte is for bits that go from 0 to 1 and another mask byte is generated for bits that go from 1 to 0.

An OR mask is used to change bits from 0 to 1 and an AND mask is used to change bits from 1 to 0. For example: If the idle data of a byte is 0b00000000 and the function activation of the right turn signal is 0bl000000.

The mask 138 generated would be:

0b01000000 for the OR byte.

0b11111111 for the AND byte.

Applying both masks to the idle byte would yield the right turn signal data from the idle data as shown:

0b00000000 OR 0b01000000=0b01000000

0b01000000 AND 0b11111111=0b01000000

Step 7: Operation

The user prompts the system when the calibration is completed by moving a switch from the 'calibrate' side to the 'operate' side. This puts the system into operation mode.

When the system enters operation mode, the system waits for 1 more Frame from the Node 4 IDs generated in step 4. The full frames are recorded for use on the first request from the main LIN bus. Immediately after the frames are recorded, the LEM relay is energized, breaking Node 4 from the main LIN bus.

The system records the last reply to each identifier Node 4 replies to. Operation depends on the calibration of the system as outlined:

If sporadic frames were detected: Node 4 is the master for the main LIN bus. The system receives IDs and data from LIN transceiver 2. The modified or unmodified data is sent to the main LIN bus and the previous frame is updated with data received from Node 4.

If no sporadic frames were detected: Node 4 is the slave for the main LIN bus. The system receives IDs and data from LIN transceiver 1, replies to LIN transceiver 1 with the modified or unmodified data and updates the previous frame from Node 4.

If the ID is cyclical: The modified data for function activation is pulled from the next cycle on a look up table, based on the data collected in step 6. The system looks at the cycle of the last slave frame and uses the function data found in step 6 that correlates to the same cycle.

If the ID is not cyclical: The modified data for function activation is generated by applying an AND and OR mask to the current data.

The system can activate functions in one of two ways: Holding the calibration push buttons located on the L LEM while the system is in operation mode or through activation requests from the SMM bus while the system is in operation mode.

Installation of Self Programmable Microcontroller

The Switch system is a vehicle accessory controller, used for controlling secondary vehicle functions. With up to 8 relays on the Switch Master Module (SMM) and the ability to add 16 more, the Switch system is the perfect fit for any secondary function requirements. The Switch system comes pre-programmed specifically for your vehicle's make/model/year and the requested functions. These functions can be modified once the system is received.

The Switch system can be activated with both wireless and wired interfaces. The wireless devices can operate with a single button activation and/or combination button activations. Each button can be configured as a single click, momentary click, button hold, or a cycle of up to three functions.

The Switch system allows for both Original Equipment Manufacturer (OEM) activation and Switch activation. It should be noted that both the OEM and secondary controls cannot be used simultaneously (e.g. if you are using the Switch system to control your wipers, you cannot turn your wipers on with the Switch system and turn them off with the OEM wiper switch.) It should also be noted that the OEM controls should be in the off position before activating the function with the Switch system.

Figure 2:
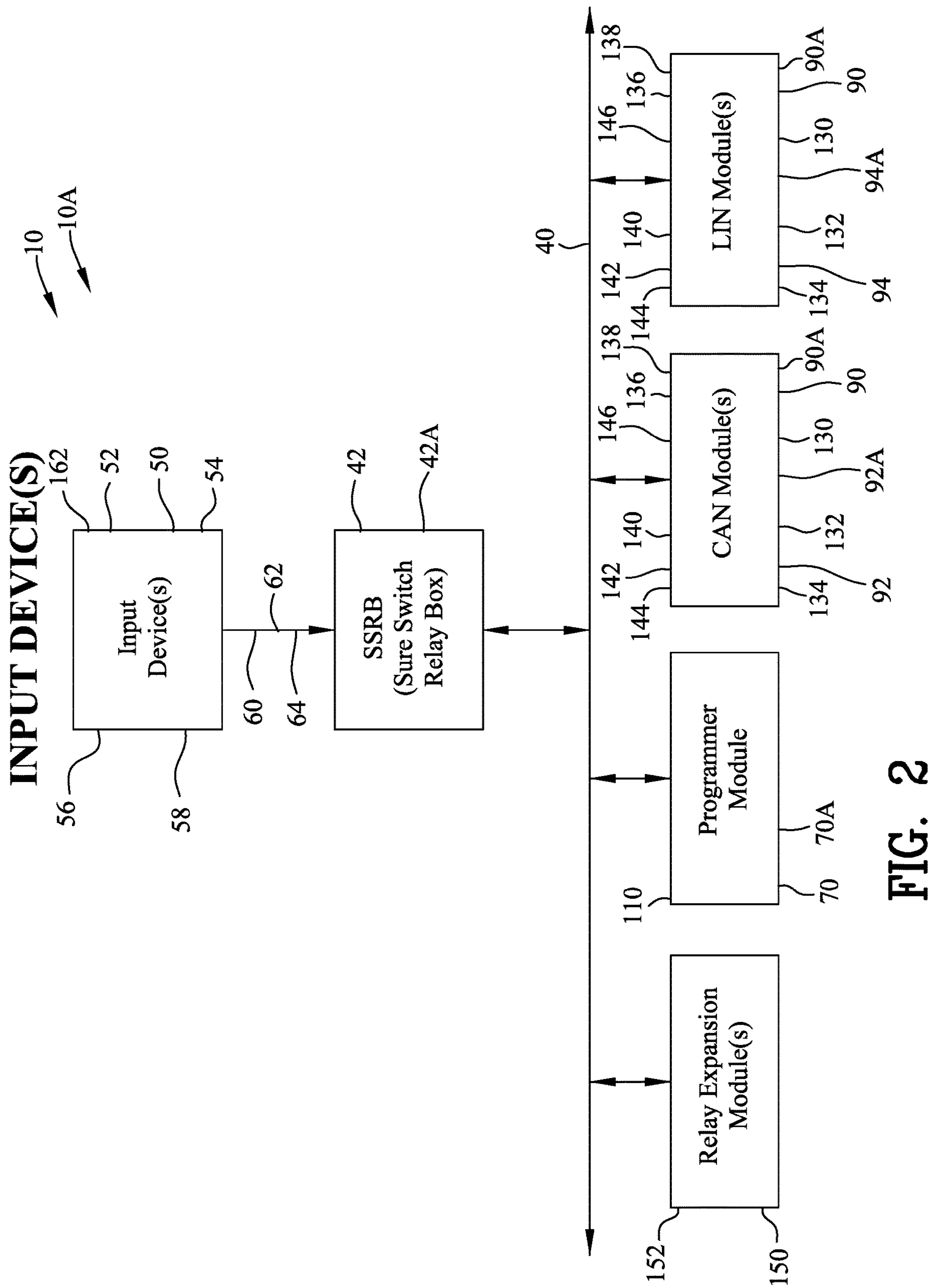
FIG. 2 is a view similar to FIG. 1 illustrating input device(s)

Step 1: Locate the 12-V ignition (hot on ignition) source, and an acceptable chassis ground. Attach the red wire from the Switch harness, shown in FIG. 2, to the switched ignition source. Attach the black wire from the Switch harness to a chassis ground location. A recommended ignition source is listed on the Switch wire map that is included with the order.

Step 2: If the system has turn signals, attach the tan wire to the Switch harness to an active high brake sense wire. An active high brake signal wire will have 12V when the brake is depressed and 0V when the brake is not depressed. A recommended brake sense wire is listed on the Switch wire map.

Step 3: If your system came with a modified vehicle combination switch, remove the OEM vehicle switch and replace it with the modified one. Depending on the modified switch operation it may be required to have the Switch system connected for the switch to work OEM.

Step 4: Using wire diagrams, connector views and the provided vehicle specific Switch wire map, locate the appropriate wires for each function and attach them to the corresponding Switch harness. Any connection made to the vehicle should be soldered and covered with heat shrink or another acceptable seal. The Switch harness is standardized, so there may be unused wires. It is not recommended to cut any extra wires as they may be required for reinstallations or adding additional functions in the future. Unused wires should be insulated and tied up. It is recommended to test switch operation in between installing each function. This ensures that installation errors do not propagate through the entire installation.

Step 5: Install the activation device in the vehicle.

For wireless spinner knobs:

Install the steering wheel clamp at a location that is best accessible by the customer or recommended by the evaluator. Some clamps used for secondary spinner devices have a rubber bushing to increase the rotational friction and ensure that the spinner knob does not rotate when the user hand is removed.

Figure 4:
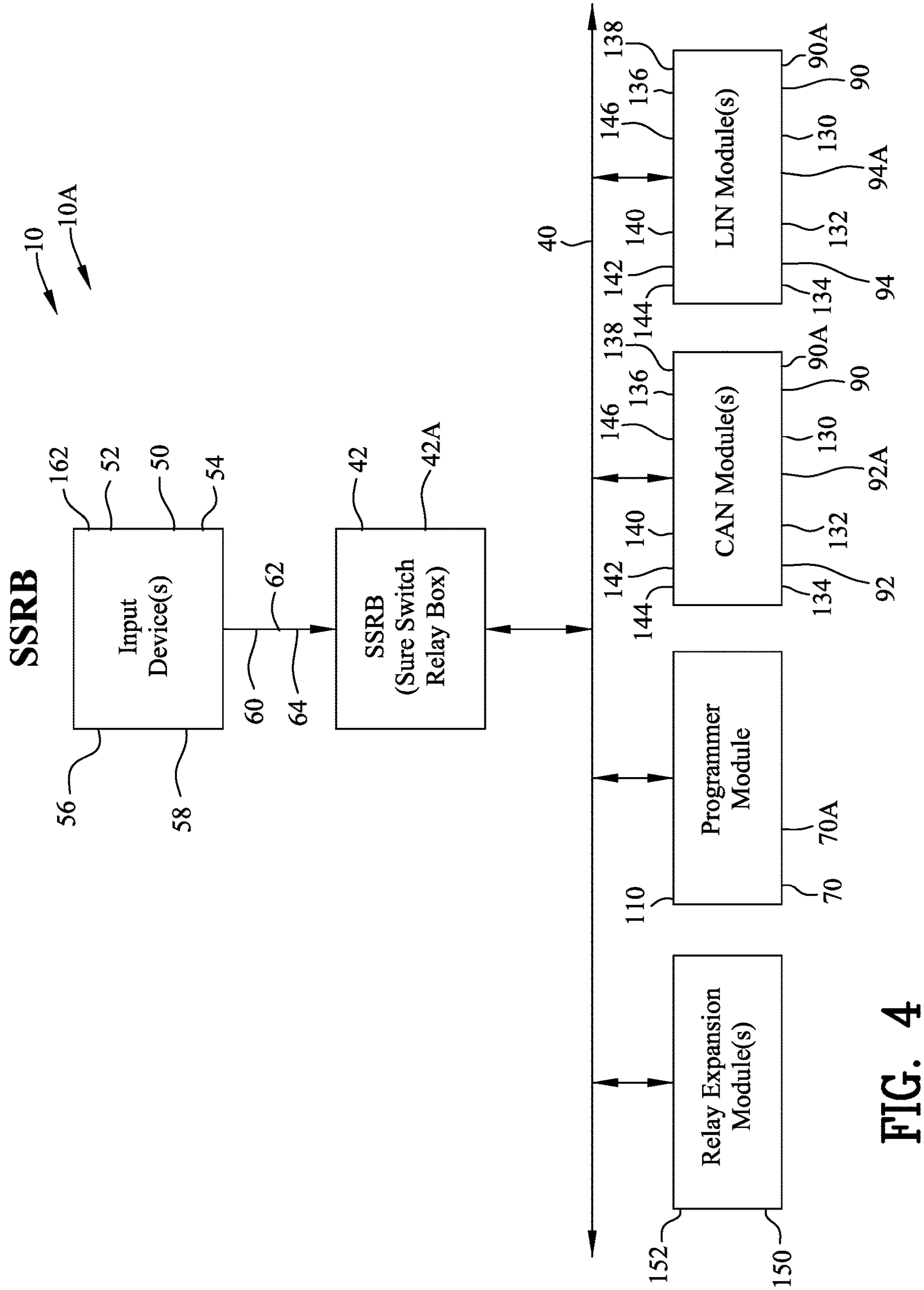
FIG. 4 is a view similar to FIG. 2 illustrating a switch module.

Sure Switch (4-Way):

Choose a location for the Sure Switch that will best suit the clients' needs or is recommended by an evaluator. Clamp the switch onto the hand control with the Sure Switch wires routing towards the dash. Tighten the two bolts at the base of the switch until the switch is stable and does not rotate. Plug the RJ11 connector into RJ45 port labeled Switch Port 1 on the Switch Master Module (SMM) shown in FIG. 4. There are two RJ45 ports, the correct port will be identified on the layout sheet. If no port is identified plug into Port 1.

Step 6: Start the vehicle and confirm OEM and secondary switch operations. Be sure to thoroughly test all functions that were installed. Function location can be identified by the included Layout Sheet.

Step 7: Mount the SMM in a secure location free from areas of the vehicle that may get wet. There are two flanges on the SMM enclosure that can be used for mounting with screws or other permanent means. It is possible for the SMM to become warm to the touch when several relays are active at once.

Step 8: Tie up all the wires using zip ties or another similar permanent means. Wires should never be secured to moving parts or in areas where they will be rubbed or damaged. If fastening wires to metal within the vehicle, loom should be used to increase the longevity of the Switch system.

Installing Additional Expansion Units

Depending on what you order, the system may come with expansion modules.

Figure 5:
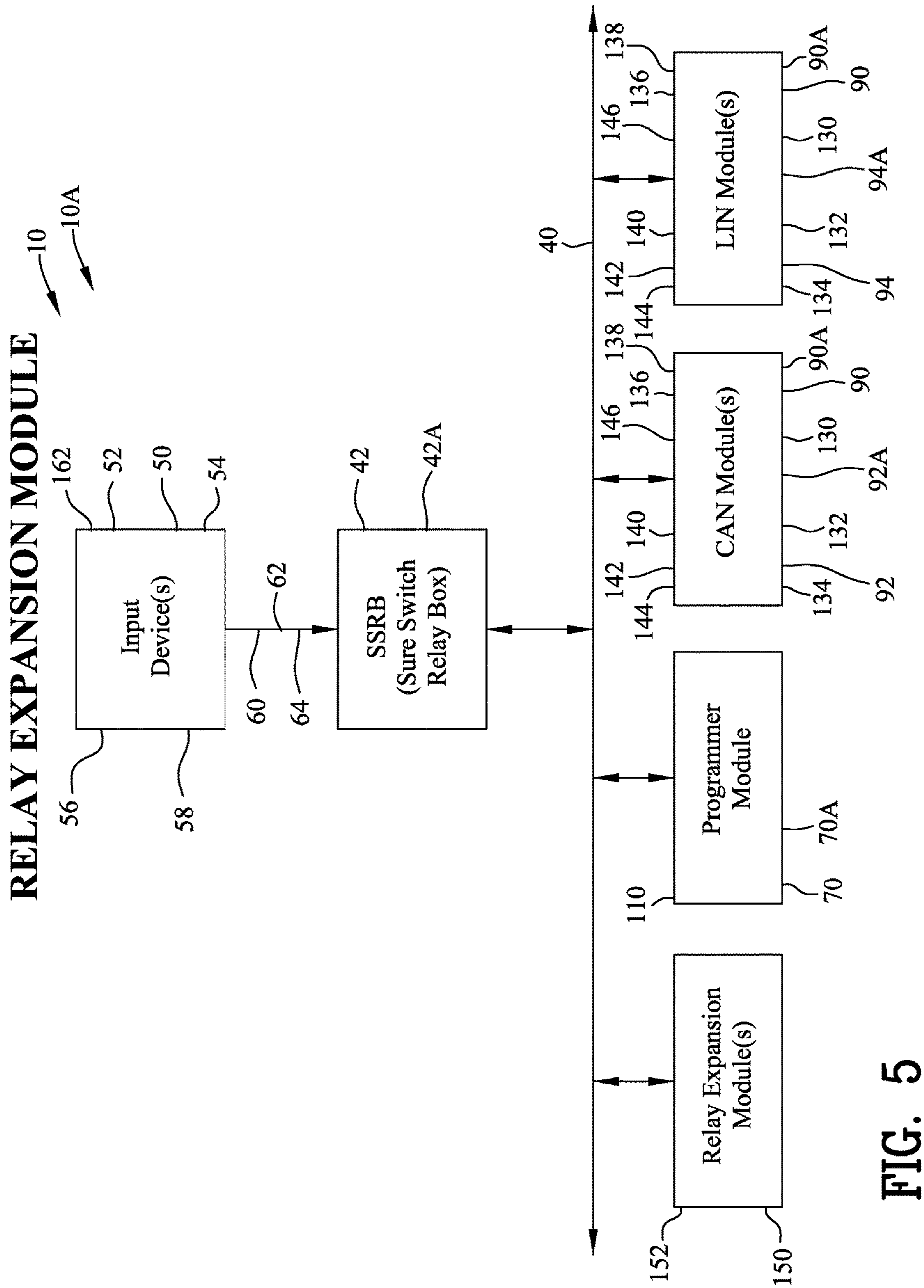
FIG. 5 is a view similar to FIG. 2 illustrating a relay expansion module.
Figure 6:
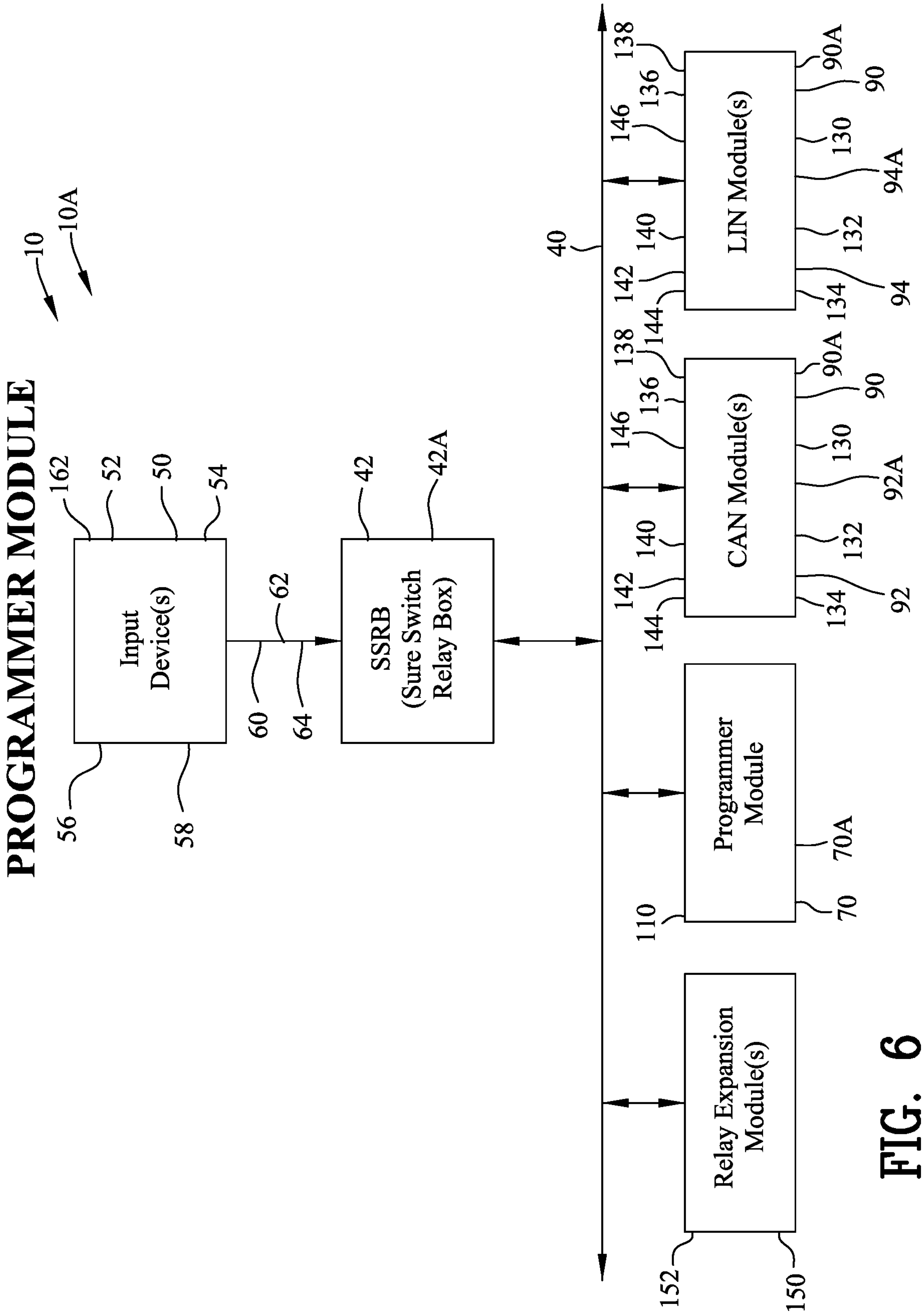
FIG. 6 is a view similar to FIG. 2 illustrating a programmer module.
Figure 7:
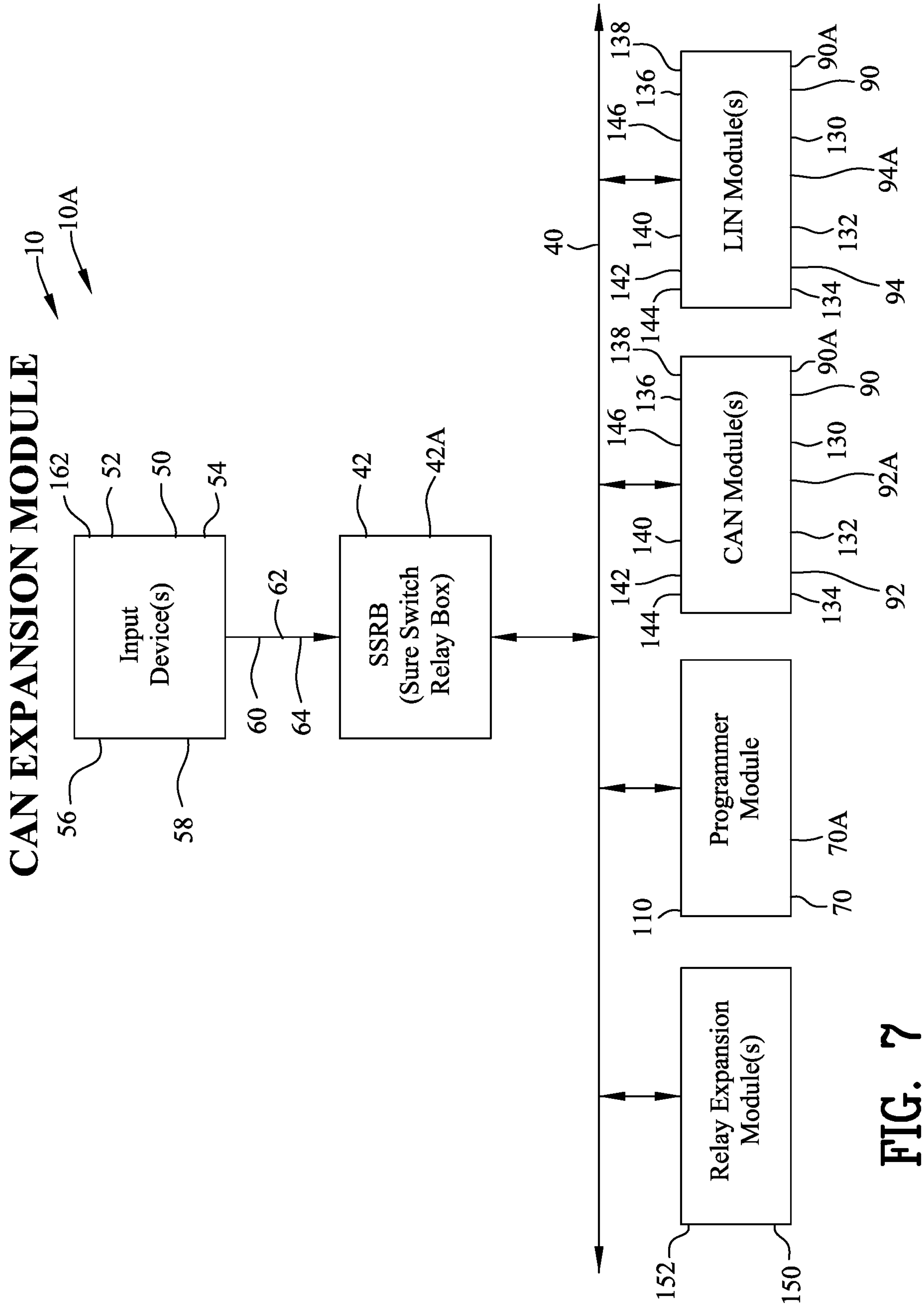
FIG. 7 is a view similar to FIG. 2 illustrating a Controller Area Network (CAN) expansion module.
Figure 8:
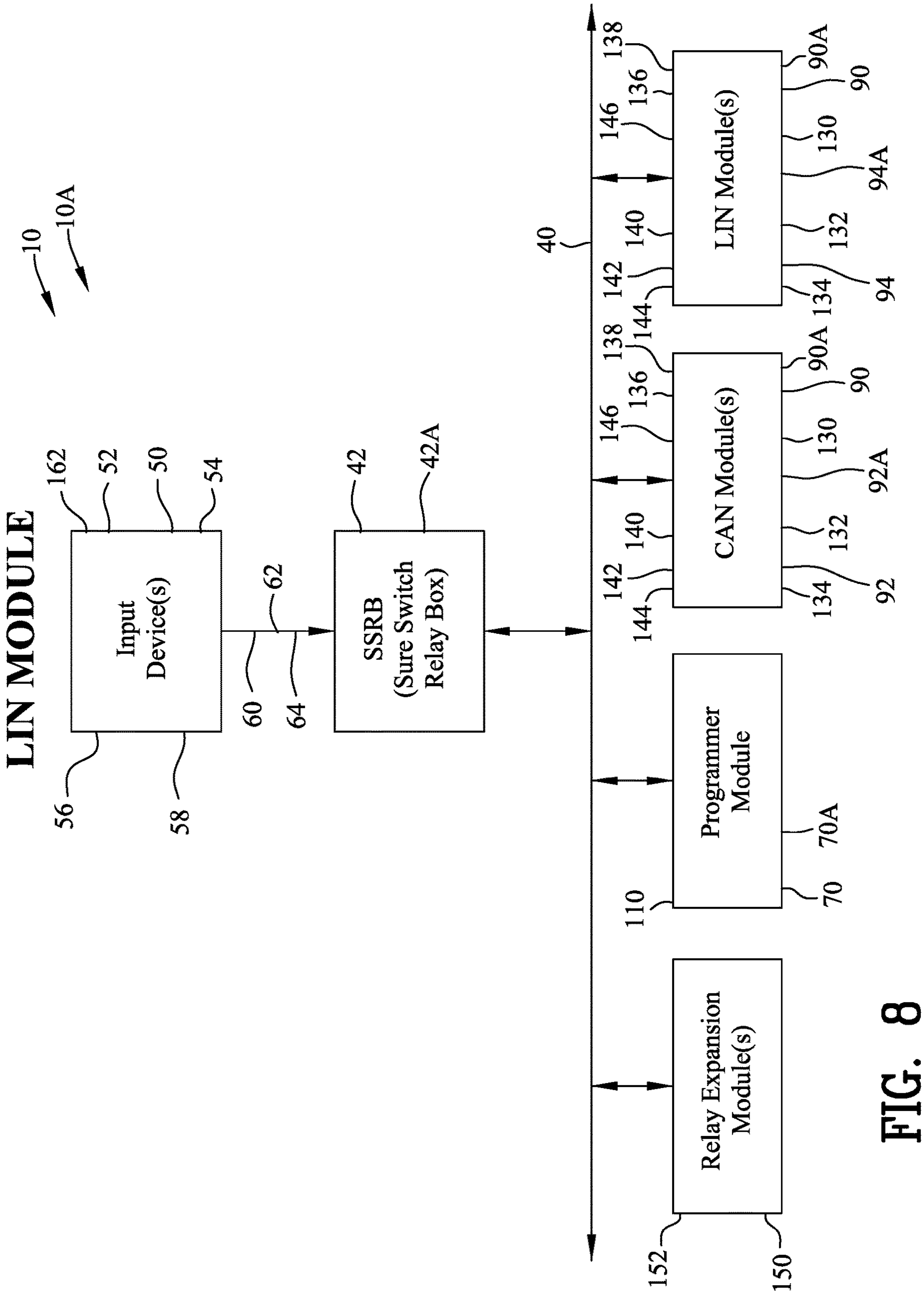
FIG. 8 is a view similar to FIG. 2 illustrating a Local Interconnect Network (LIN) expansion module.
Figure 9:
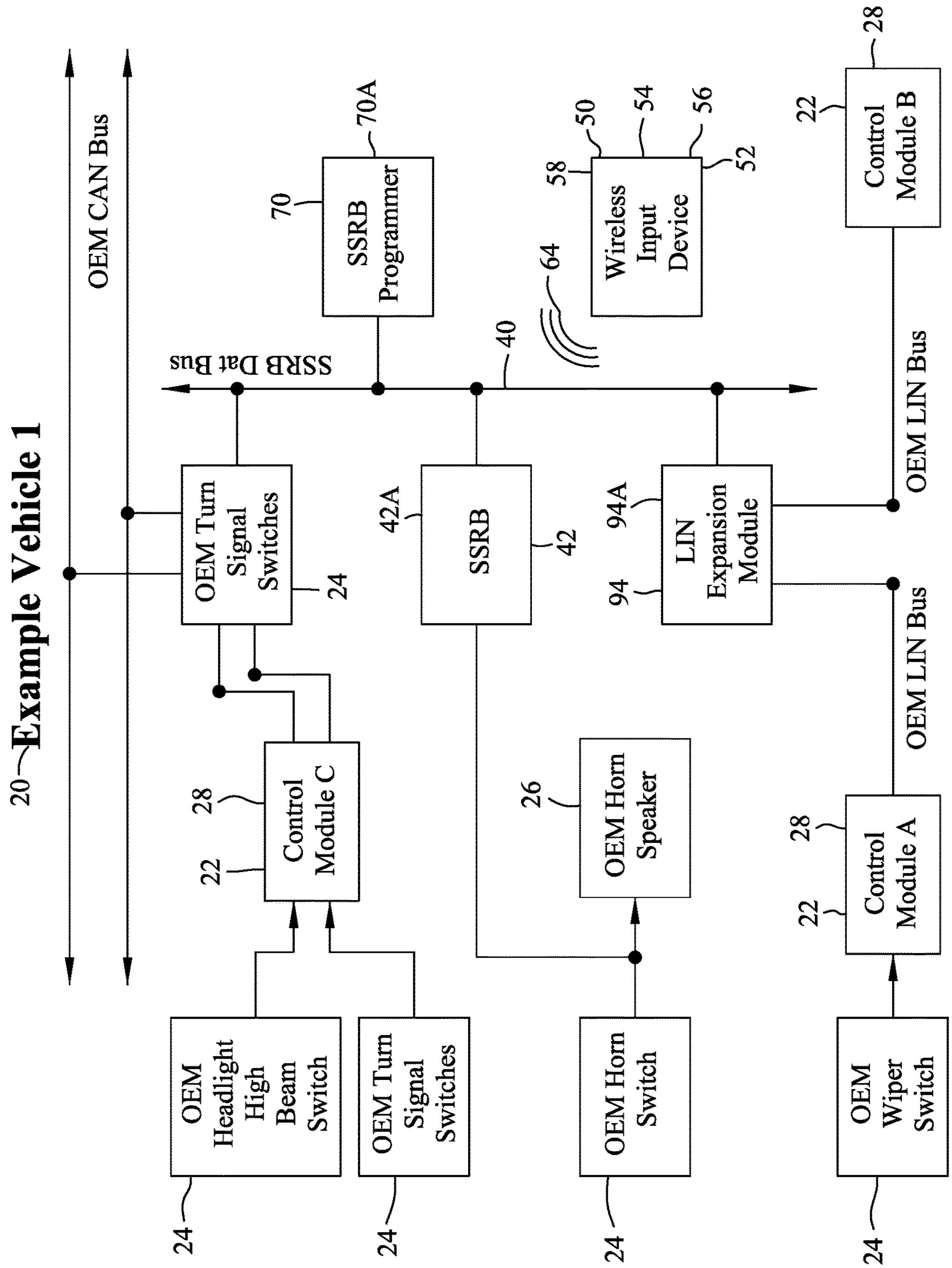
FIG. 9 is an electrical diagram of the self programmable microcontroller incorporating into a first vehicle.
Figure 10:
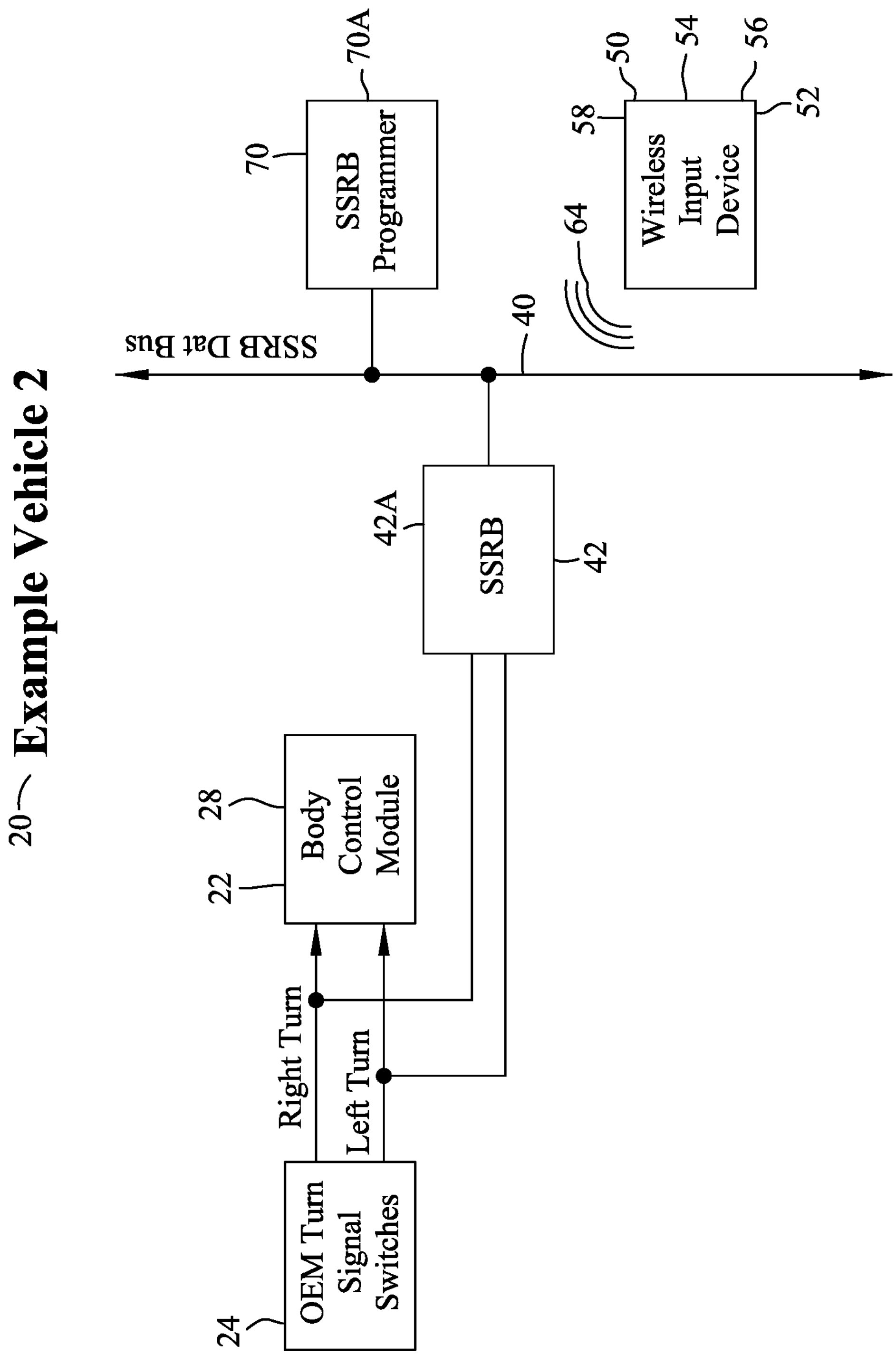
FIG. 10 is an electrical diagram of the self programmable microcontroller incorporating into a second vehicle.
Figure 11:
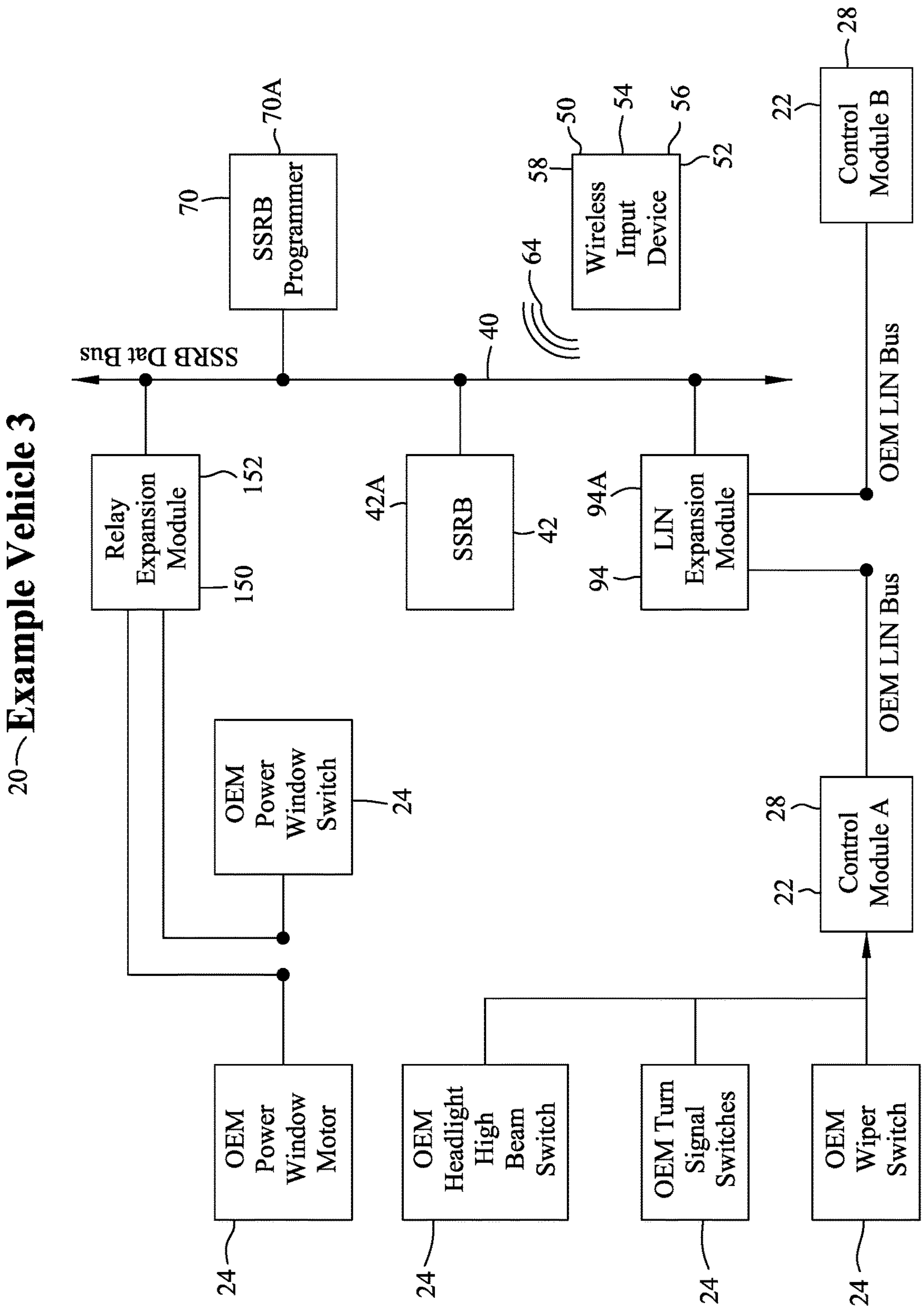
FIG. 11 is an electrical diagram of the self programmable microcontroller incorporating into a third vehicle.
Figure 12:
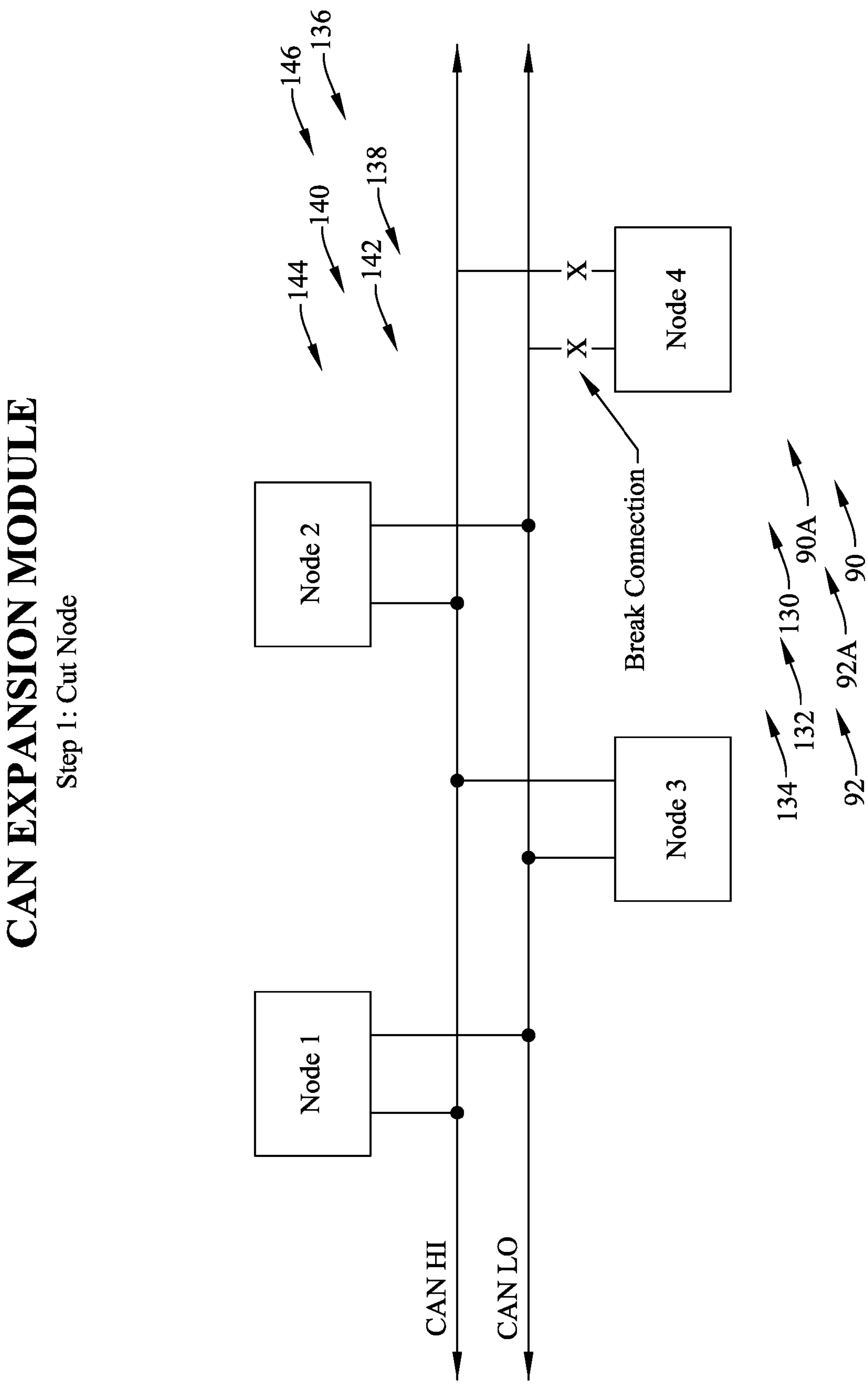
FIG. 12 is a first electrical diagram illustrating a first step for installing the Controller Area Network (CAN) expansion module by cutting node.
Figure 13:
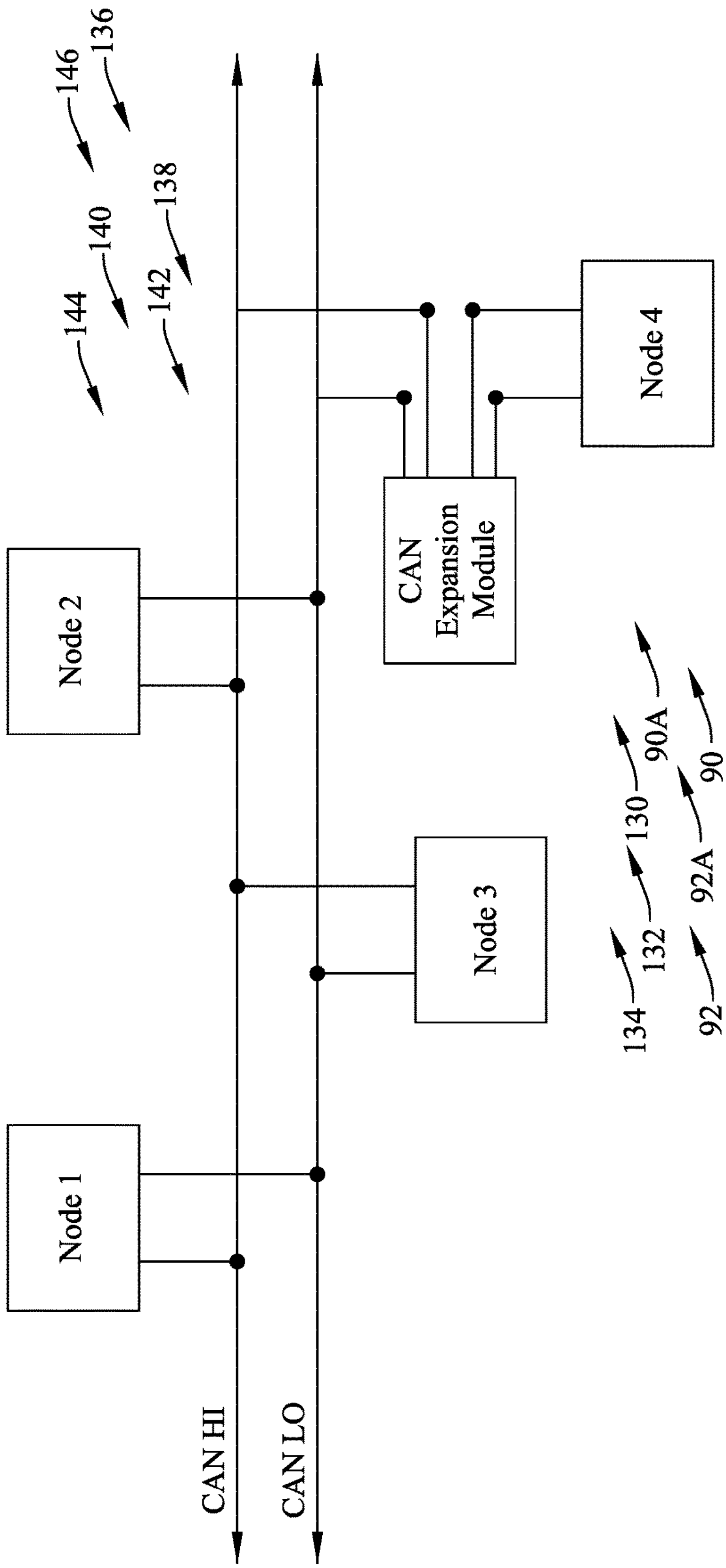
FIG. 13 is a view similar to FIG. 12 illustrating a second step for installing the Controller Area Network (CAN) expansion module by installing the Controller Area Network (CAN) expansion module.
Figure 14:
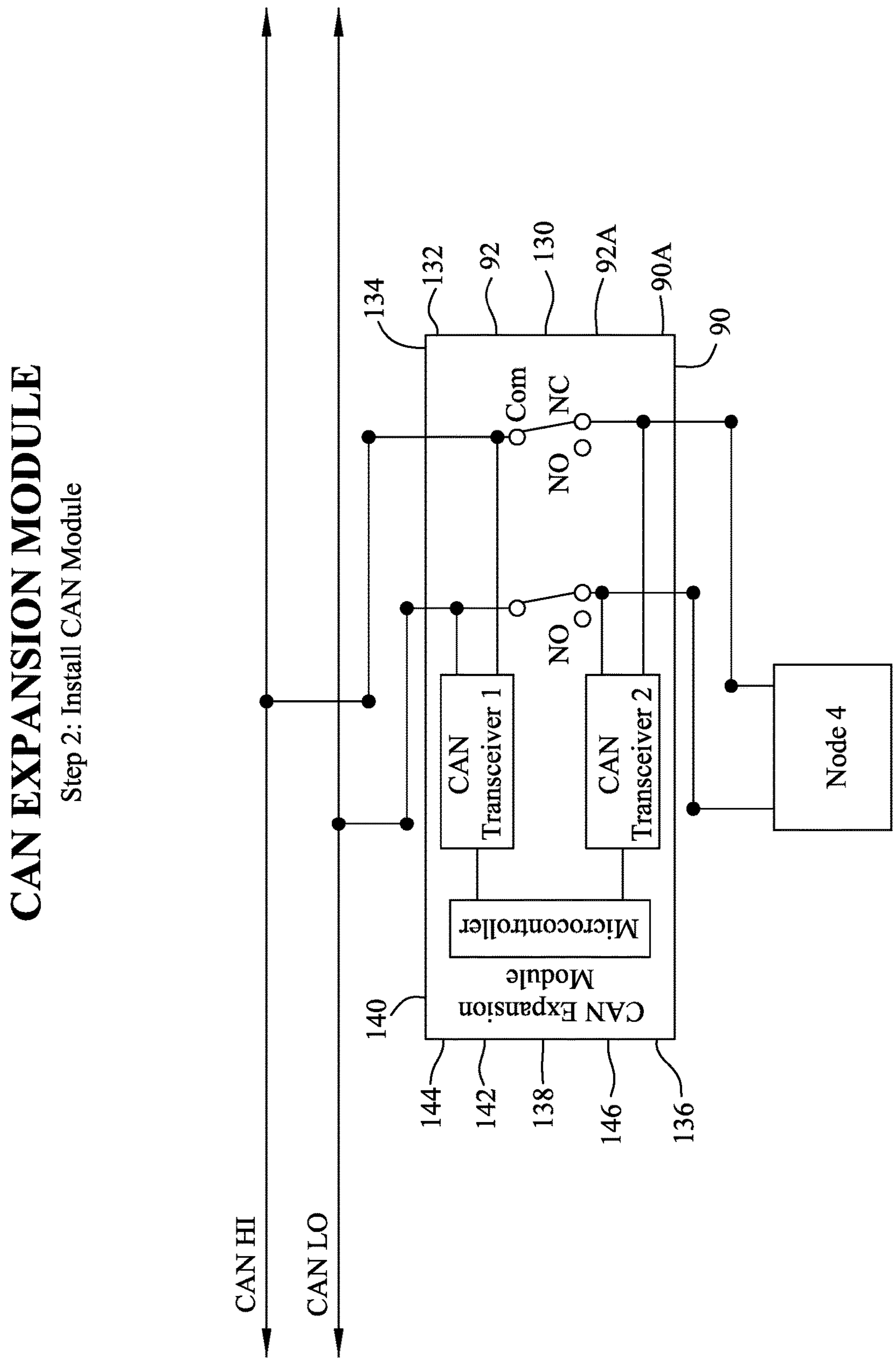
FIG. 14 is an electrical diagram of the Controller Area Network (CAN) expansion module in FIG. 13.
Figure 15:
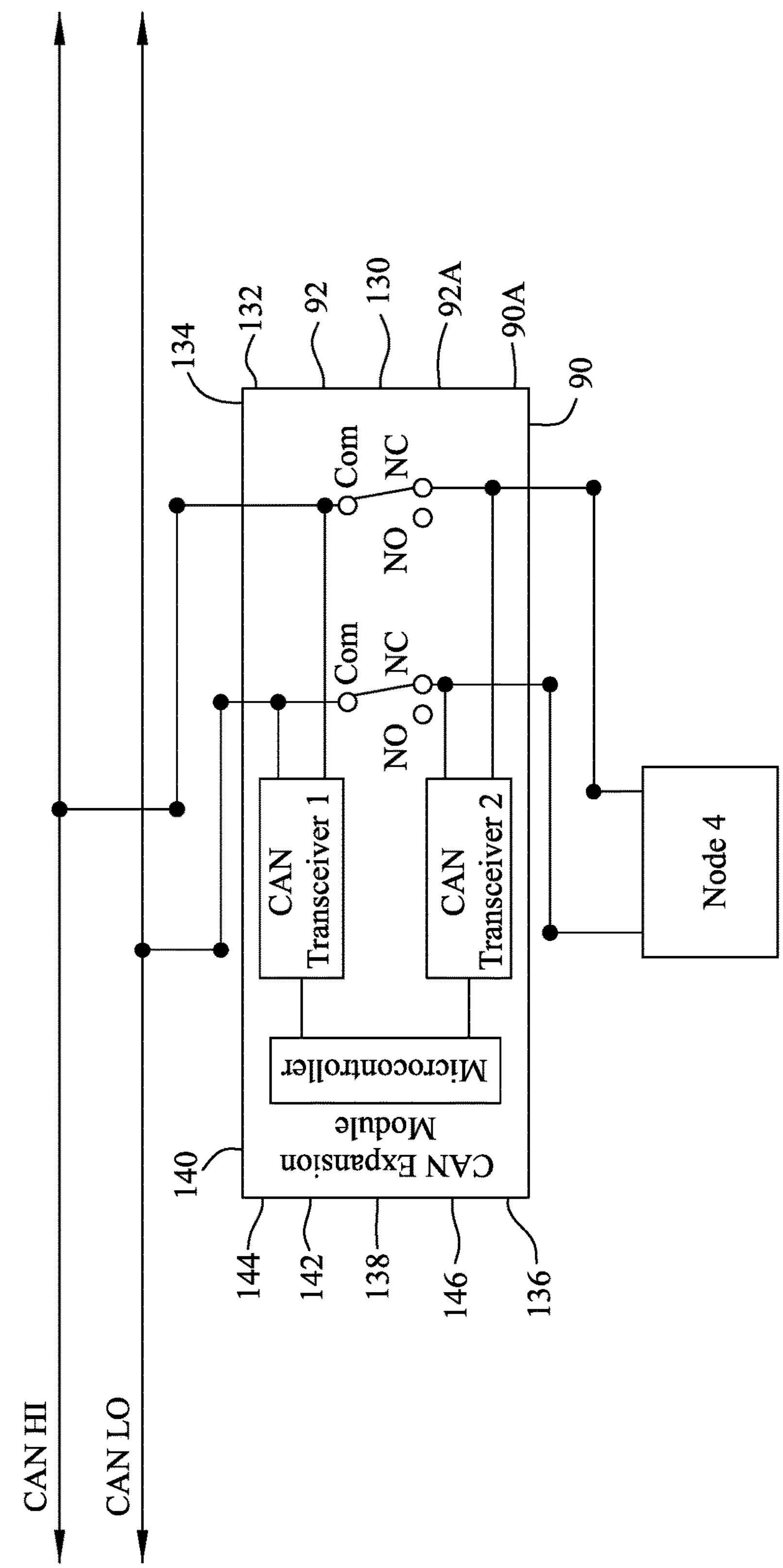
FIG. 15 is an electrical diagram similar to FIG. 14 illustrating the third step for installing the Controller Area Network (CAN) expansion module by calculating baud rate.
Figure 16:
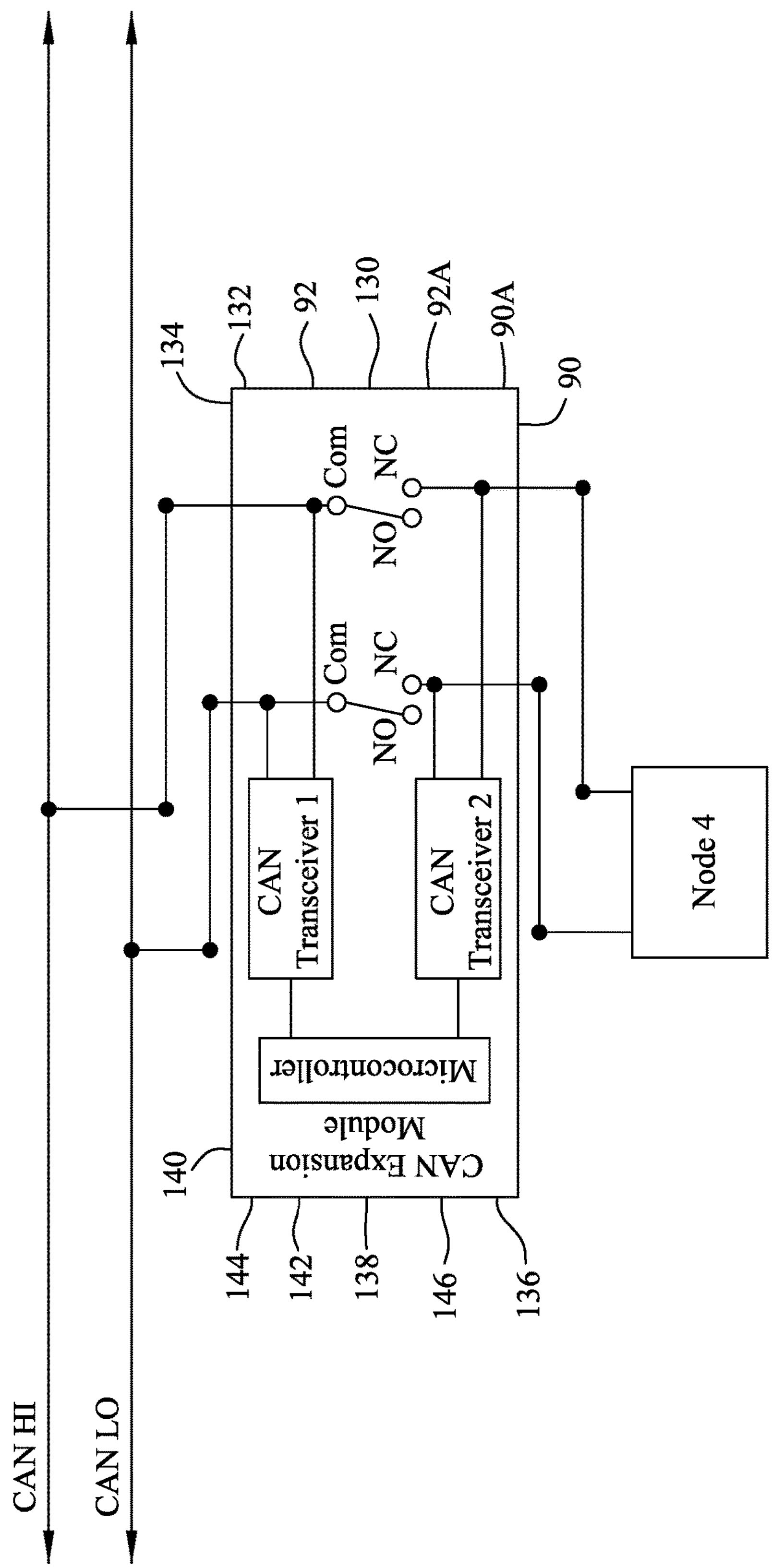
Figure 17:
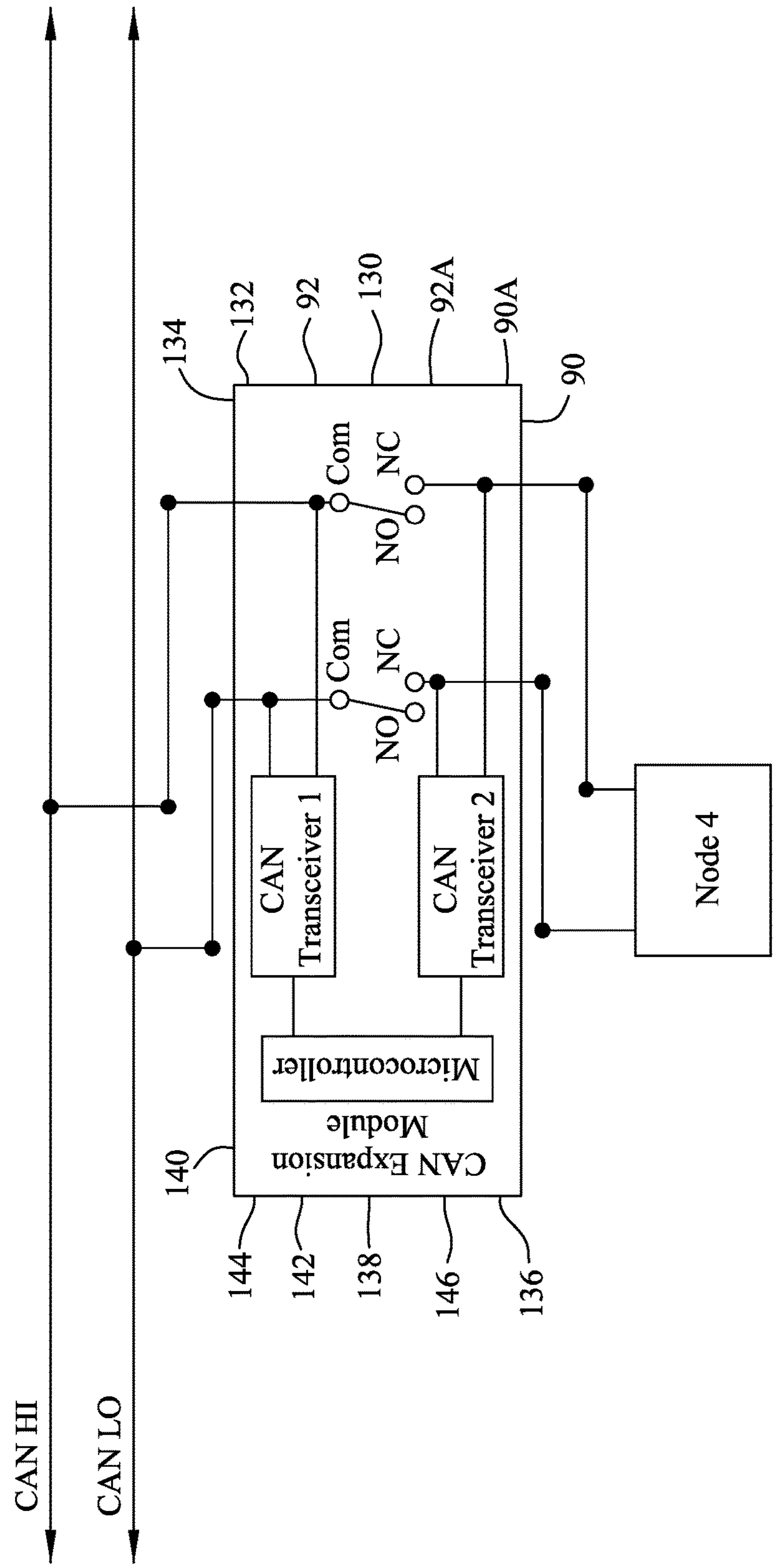
FIG. 17 is an electrical diagram similar to FIG. 16 illustrating the fifth step for installing the Controller Area Network (CAN) expansion module by recording IDLE State.
Figure 18:
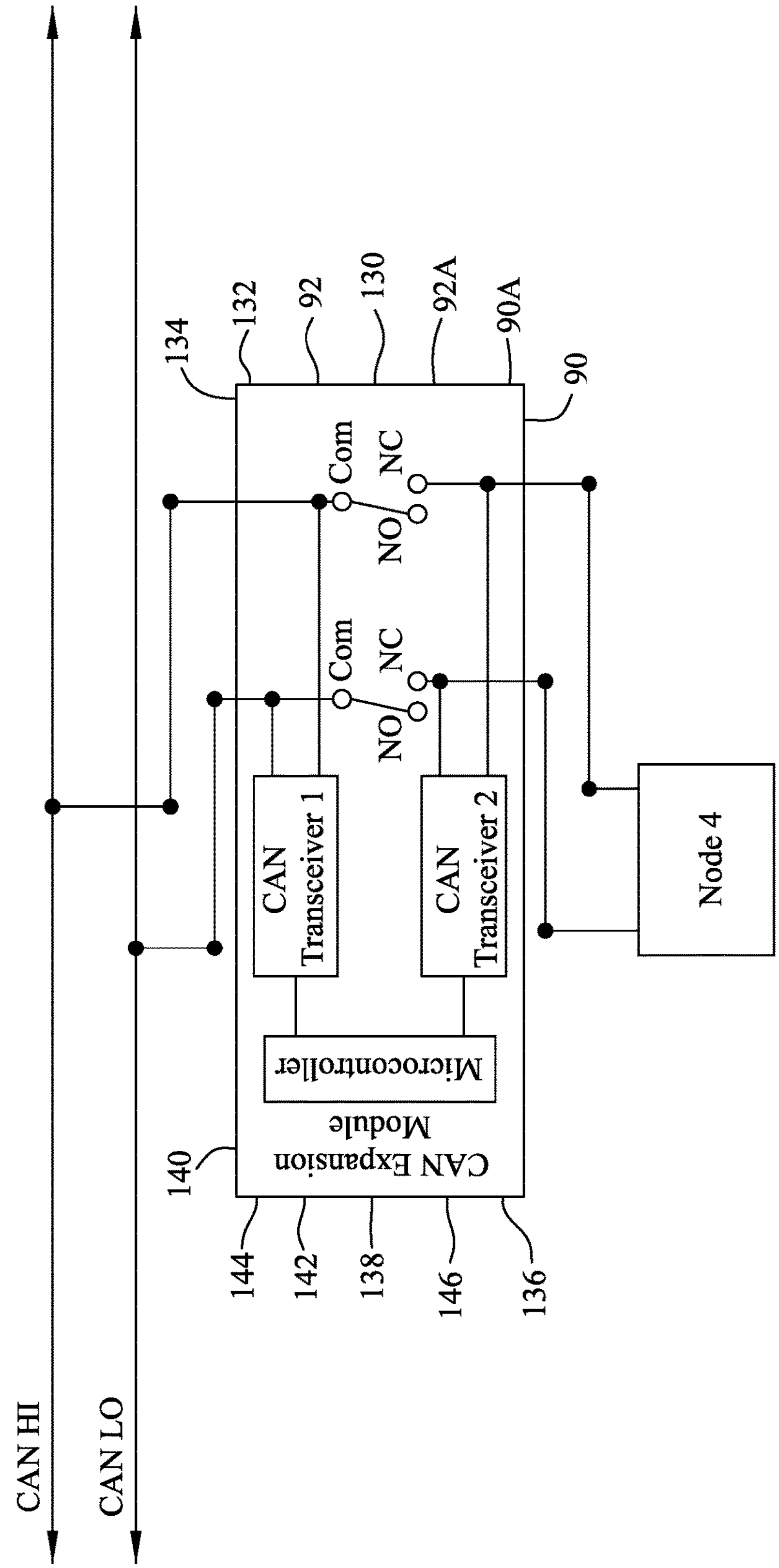
FIG. 18 is an electrical diagram similar to FIG. 17 illustrating the sixth step for installing the Controller Area Network (CAN) expansion module by calibrating functions.
Figure 19:
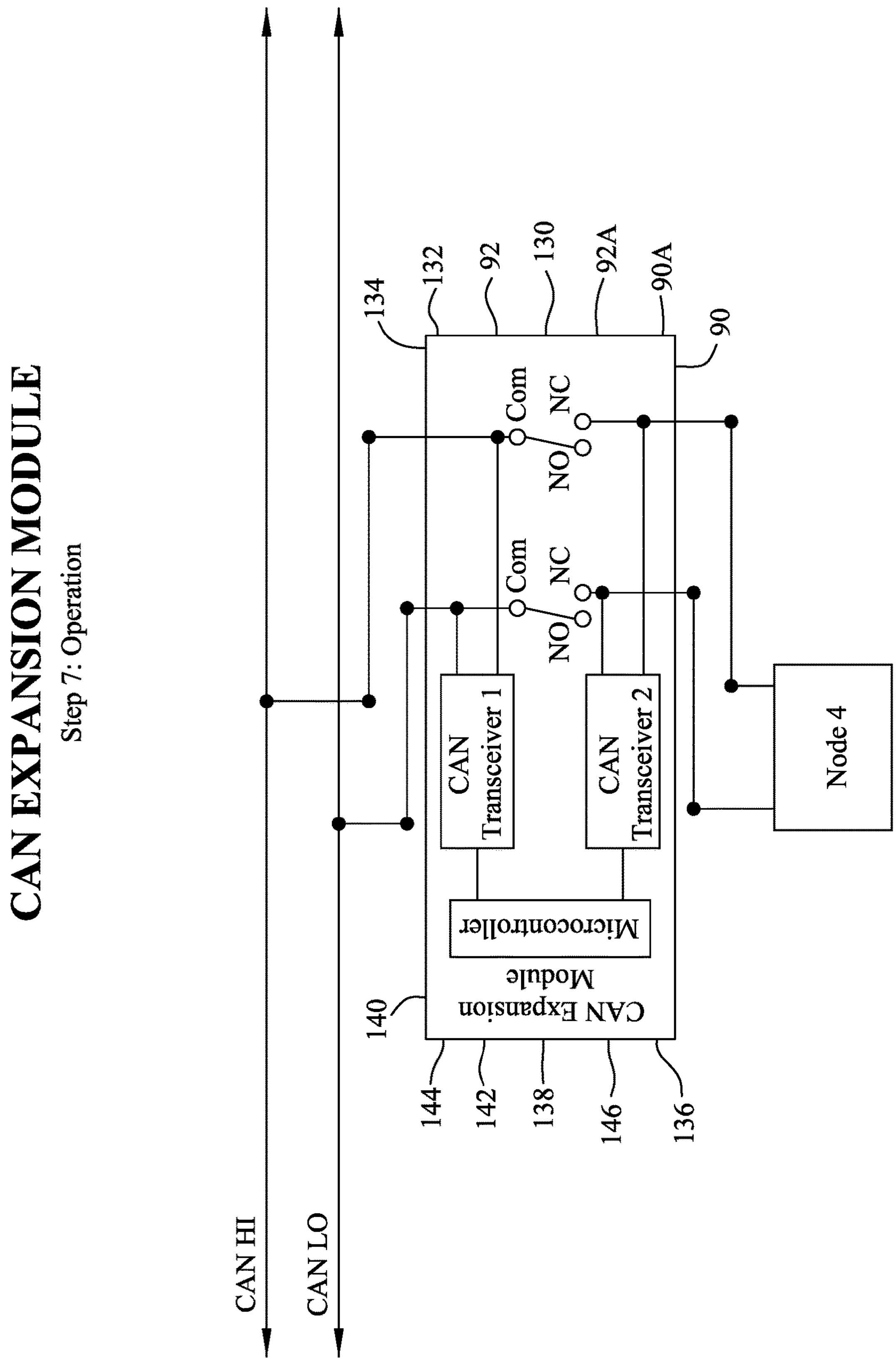
FIG. 19 is an electrical diagram similar to FIG. 18 illustrating the seventh step for installing the Controller Area Network (CAN) expansion module by operation.
Figure 20:
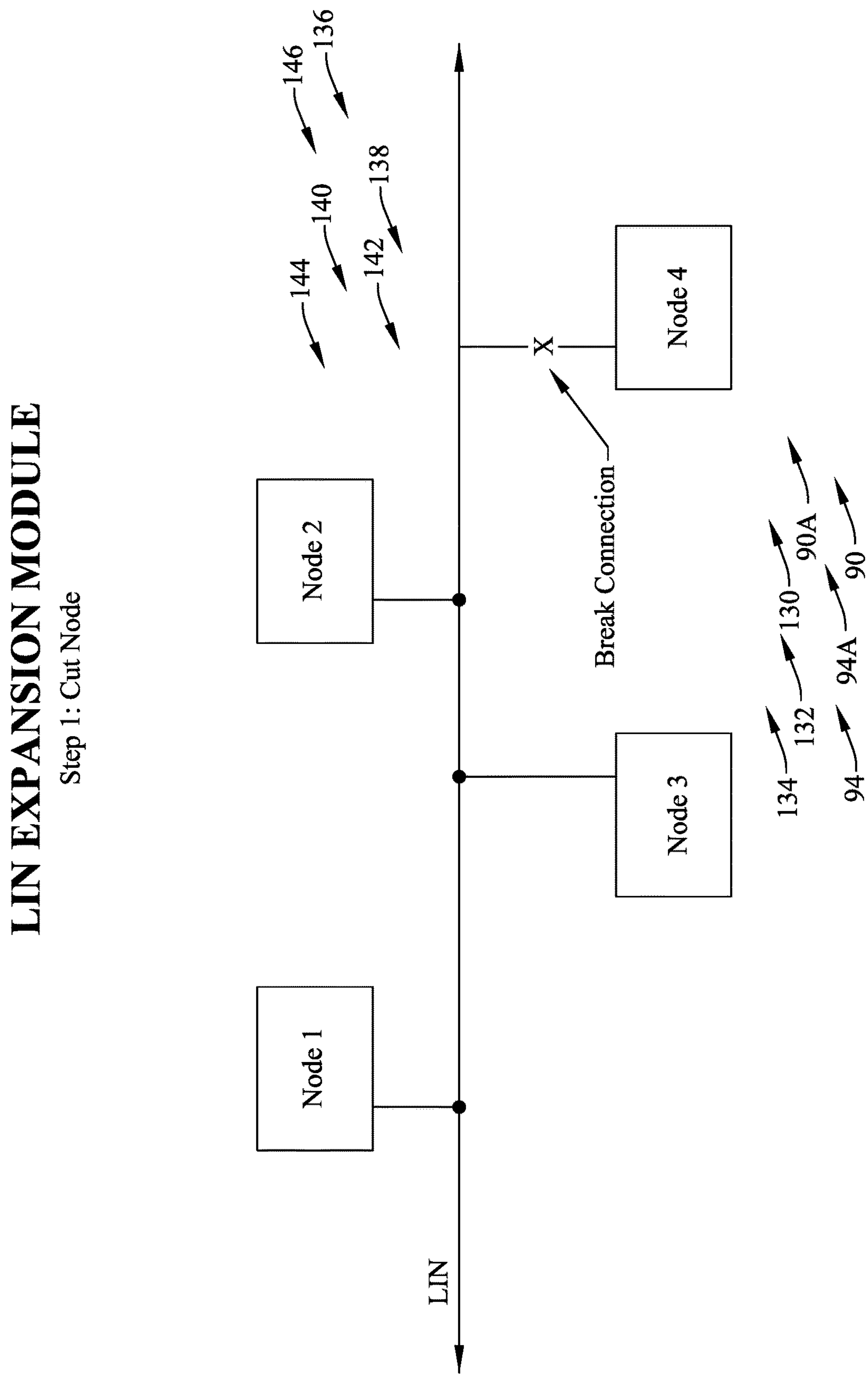
FIG. 20 is a first electrical diagram illustrating a first step for installing the Local Interconnect Network (LIN) expansion module by cutting node.
Figure 21:
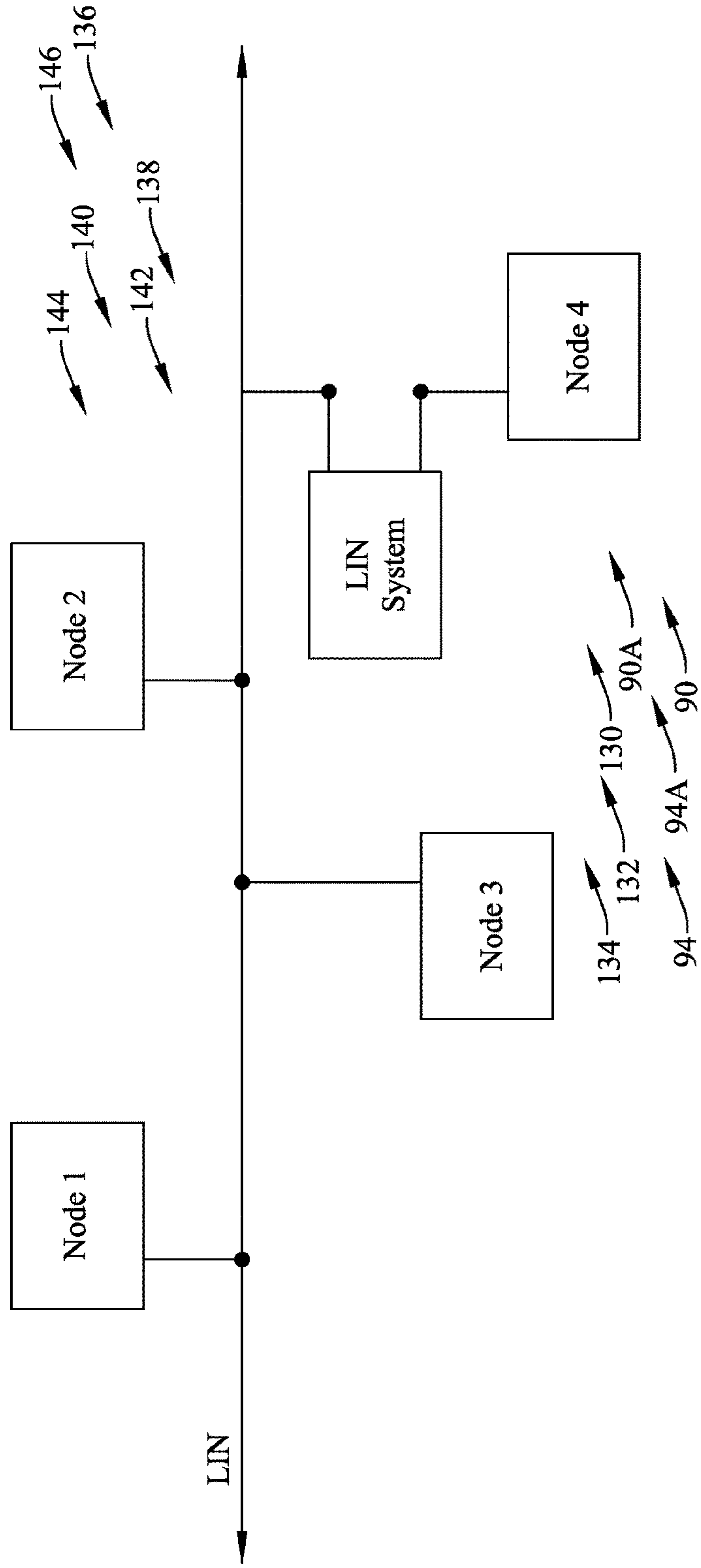
FIG. 21 is a view similar to FIG. 20 illustrating a second step for installing the Local Interconnect Network (LIN) expansion module by installing the Local Interconnect Network (LIN) expansion module.
Figure 22:
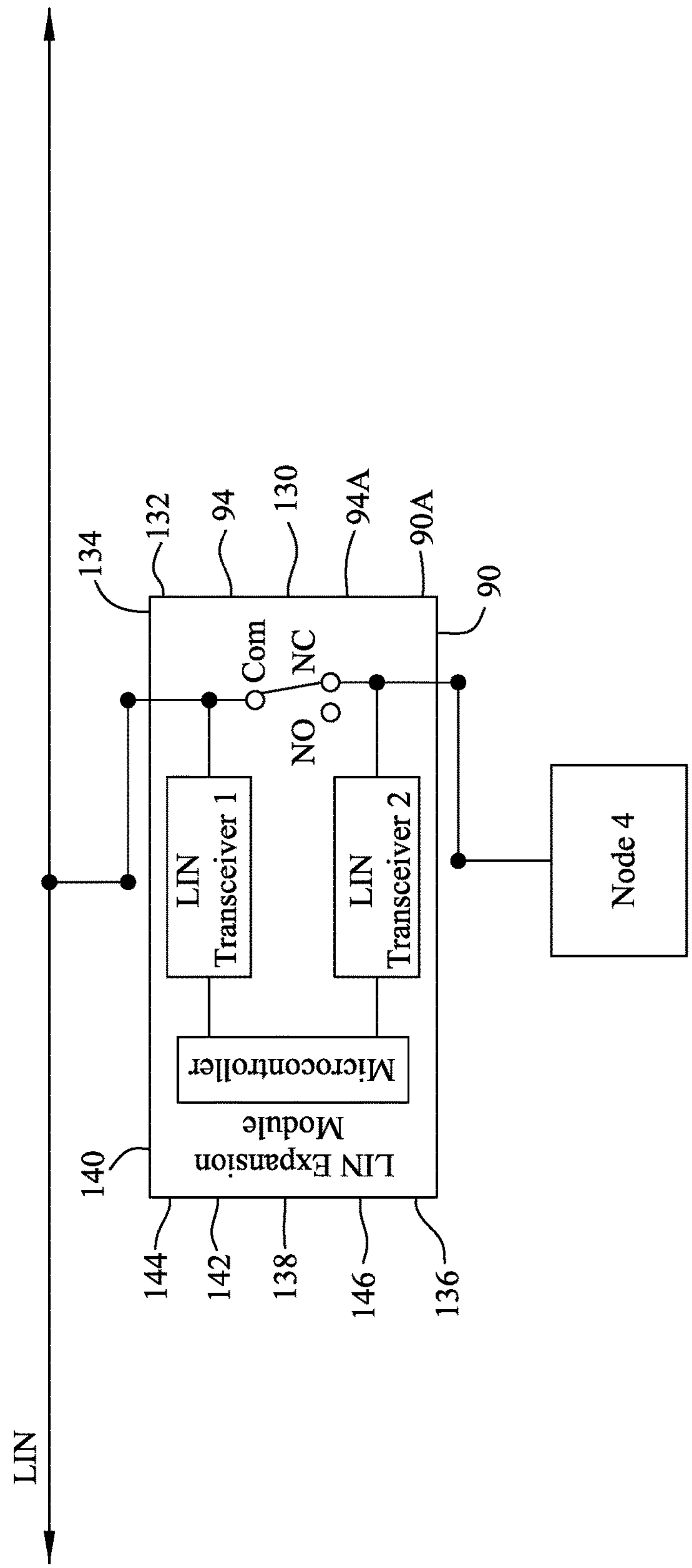
FIG. 22 is an electrical diagram of the Local Interconnect Network (LIN) expansion module in FIG. 21.
Figure 23:
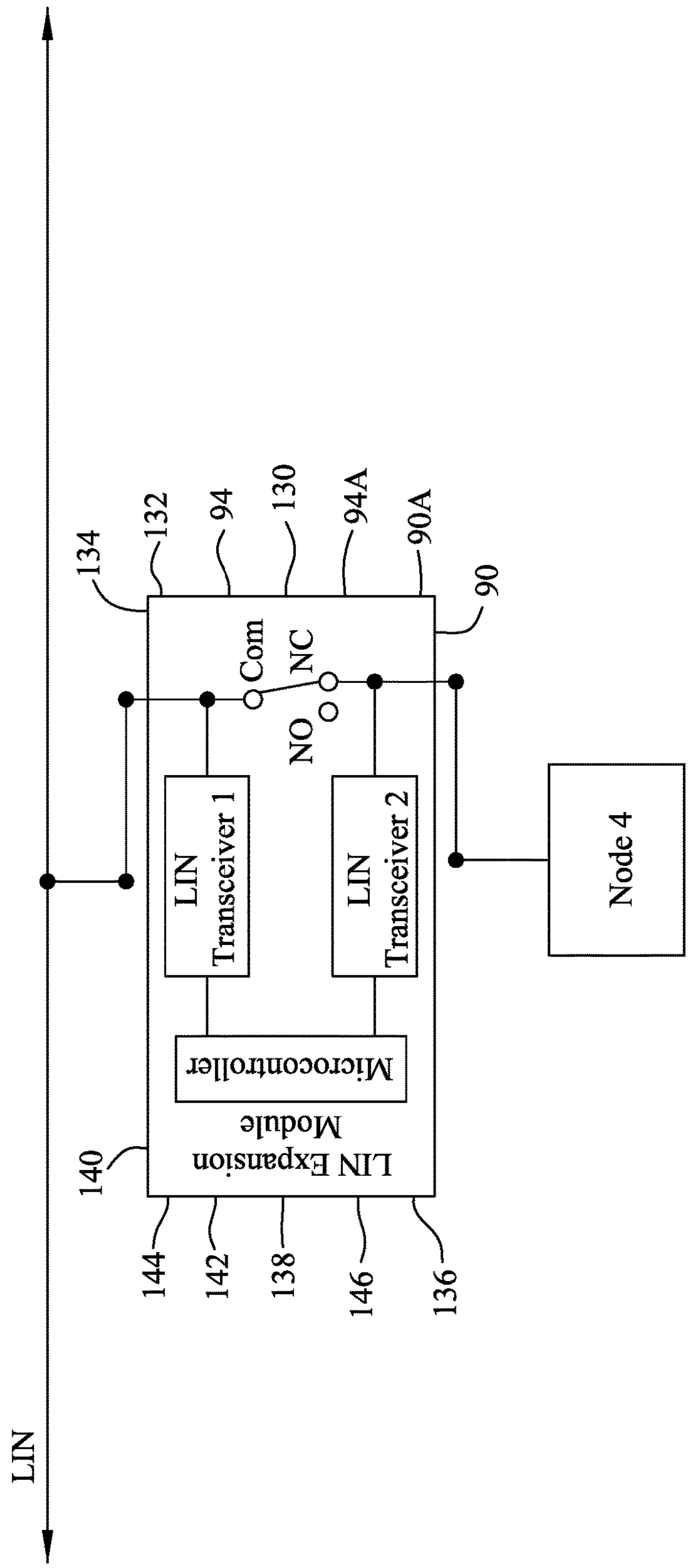
FIG. 23 is an electrical diagram similar to FIG. 22 illustrating the third step for installing the Local Interconnect Network (UN) expansion module by calculating baud rate.
Figure 24:
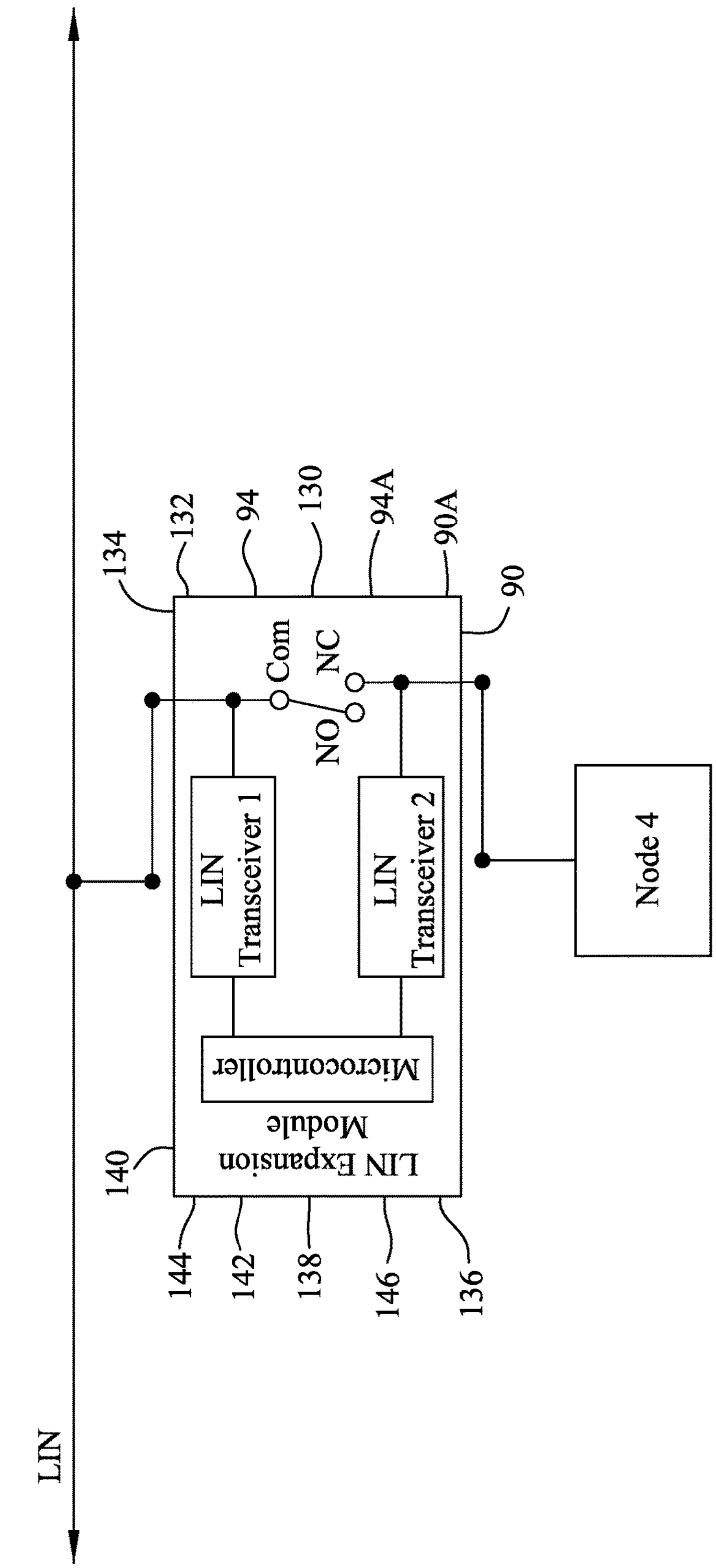
Figure 25:
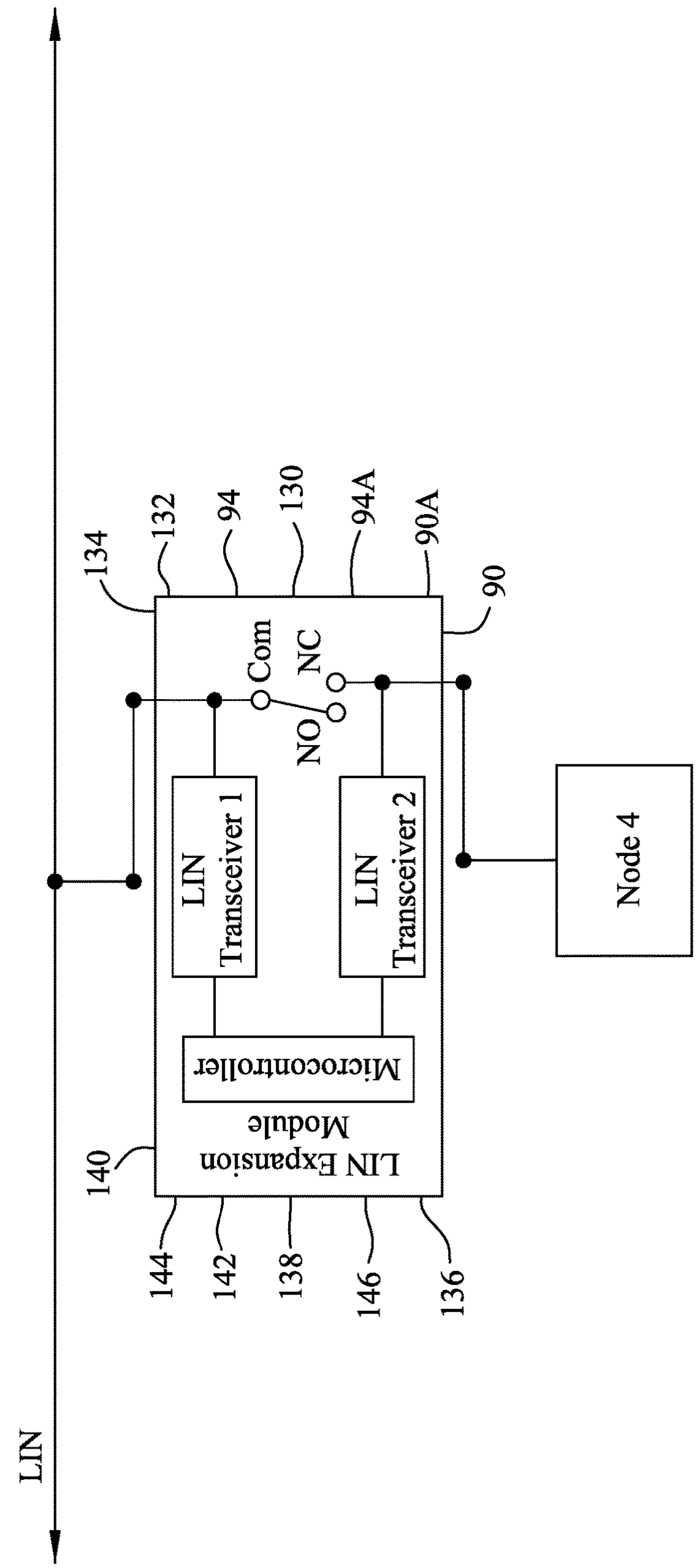
FIG. 25 is an electrical diagram similar to FIG. 24 illustrating the fifth step for installing the Local Interconnect Network (LIN) expansion module by recording IDLE State.
Figure 26:
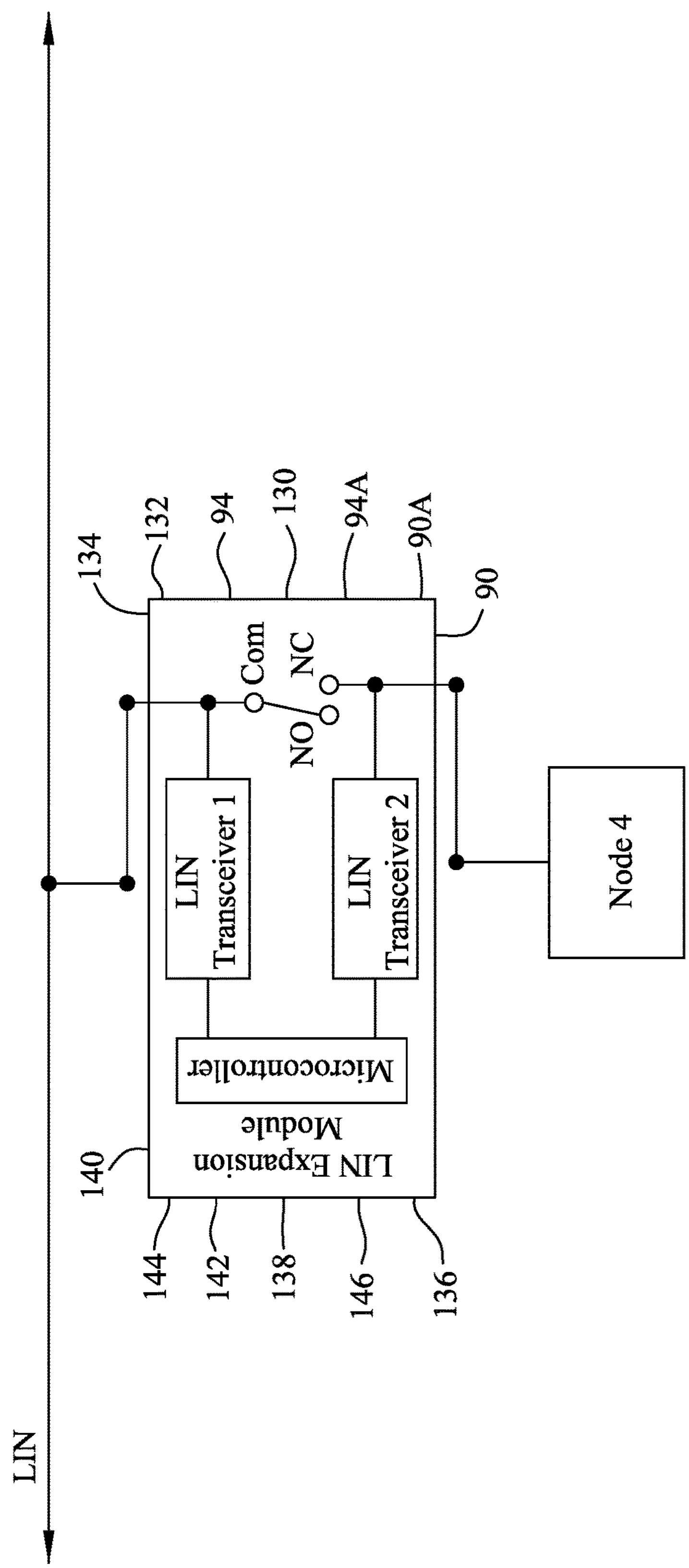
FIG. 26 is an electrical diagram similar to FIG. 25 illustrating the sixth step for installing the Local Interconnect Network (LIN) expansion module by calibrating functions.
Figure 27:
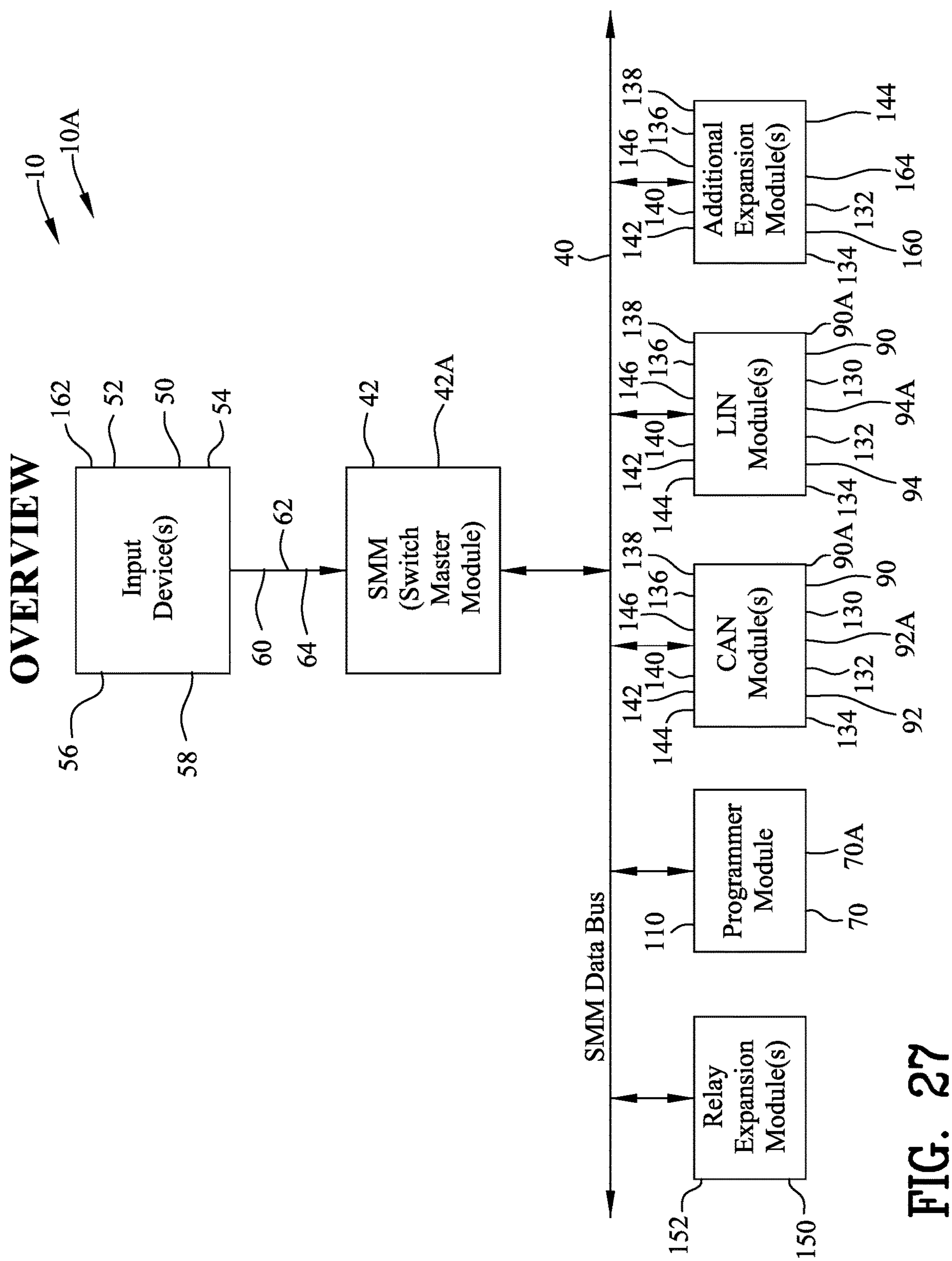
FIG. 27 is a second overall view of the self programmable microcontroller incorporating the present invention.
Figure 28:
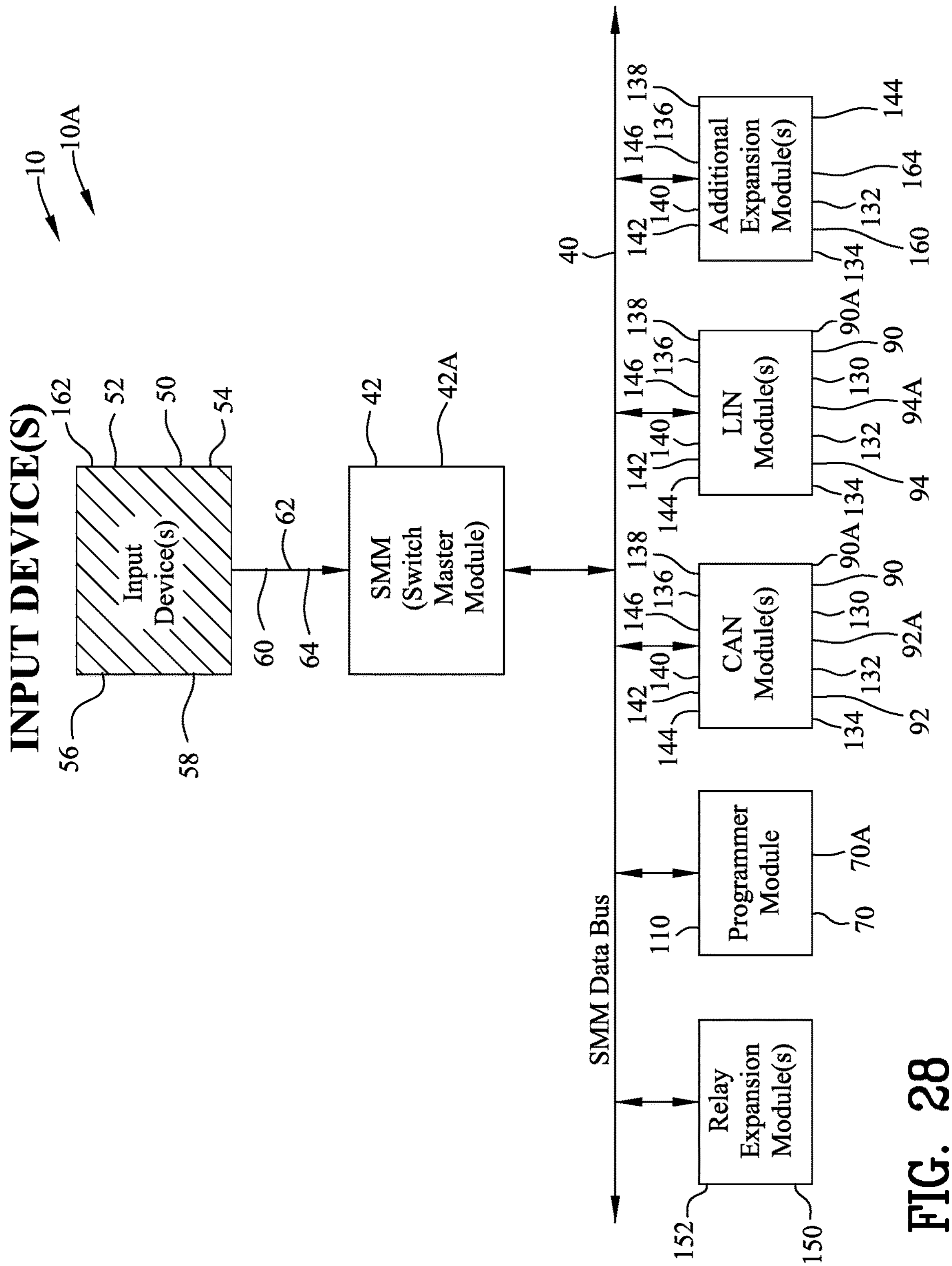
FIG. 28 is a view similar to FIG. 27 illustrating input device(s)
Figure 29:
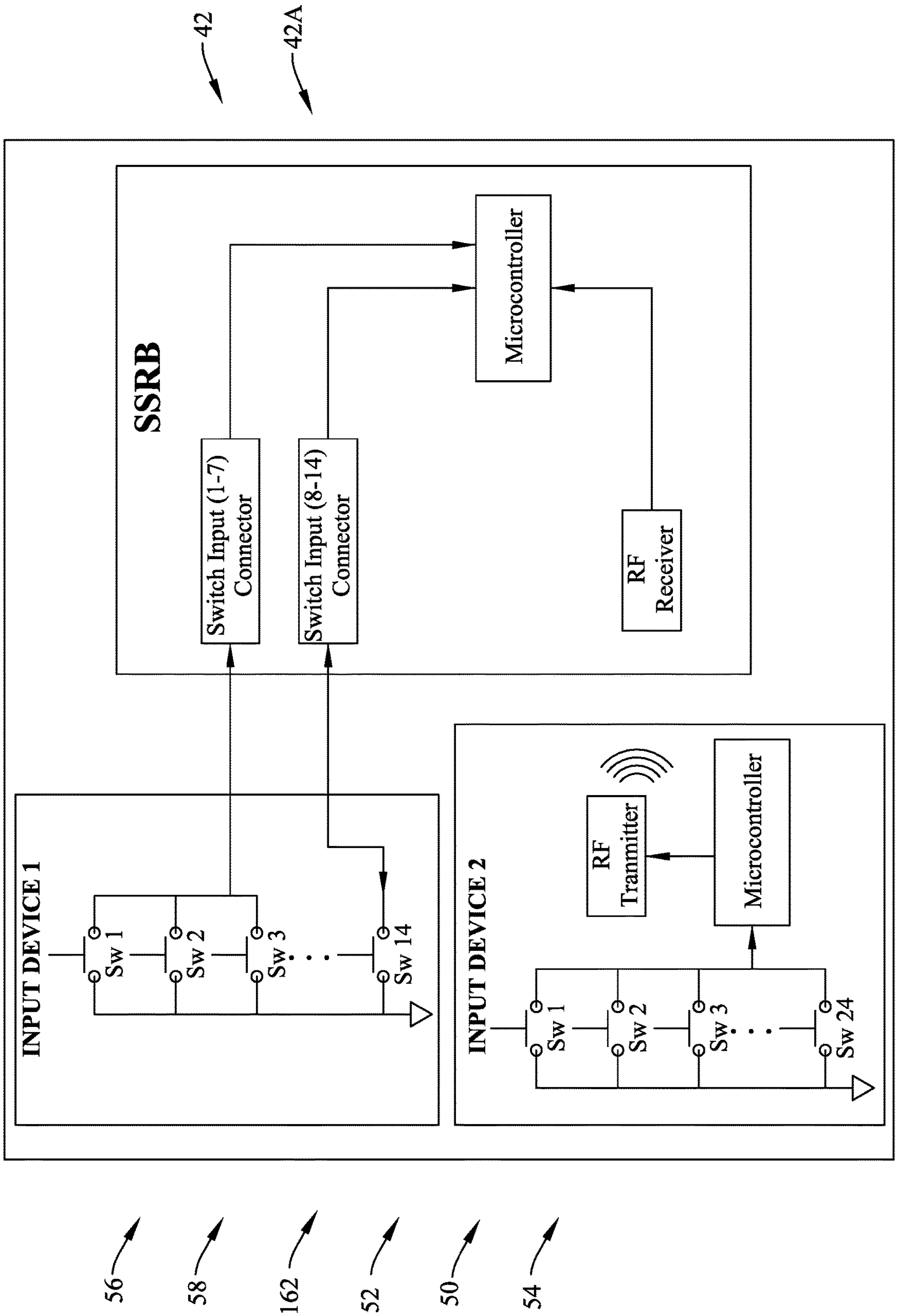
FIG. 29 is an electrical diagram of FIGS. 27 and 28.
Figure 30:
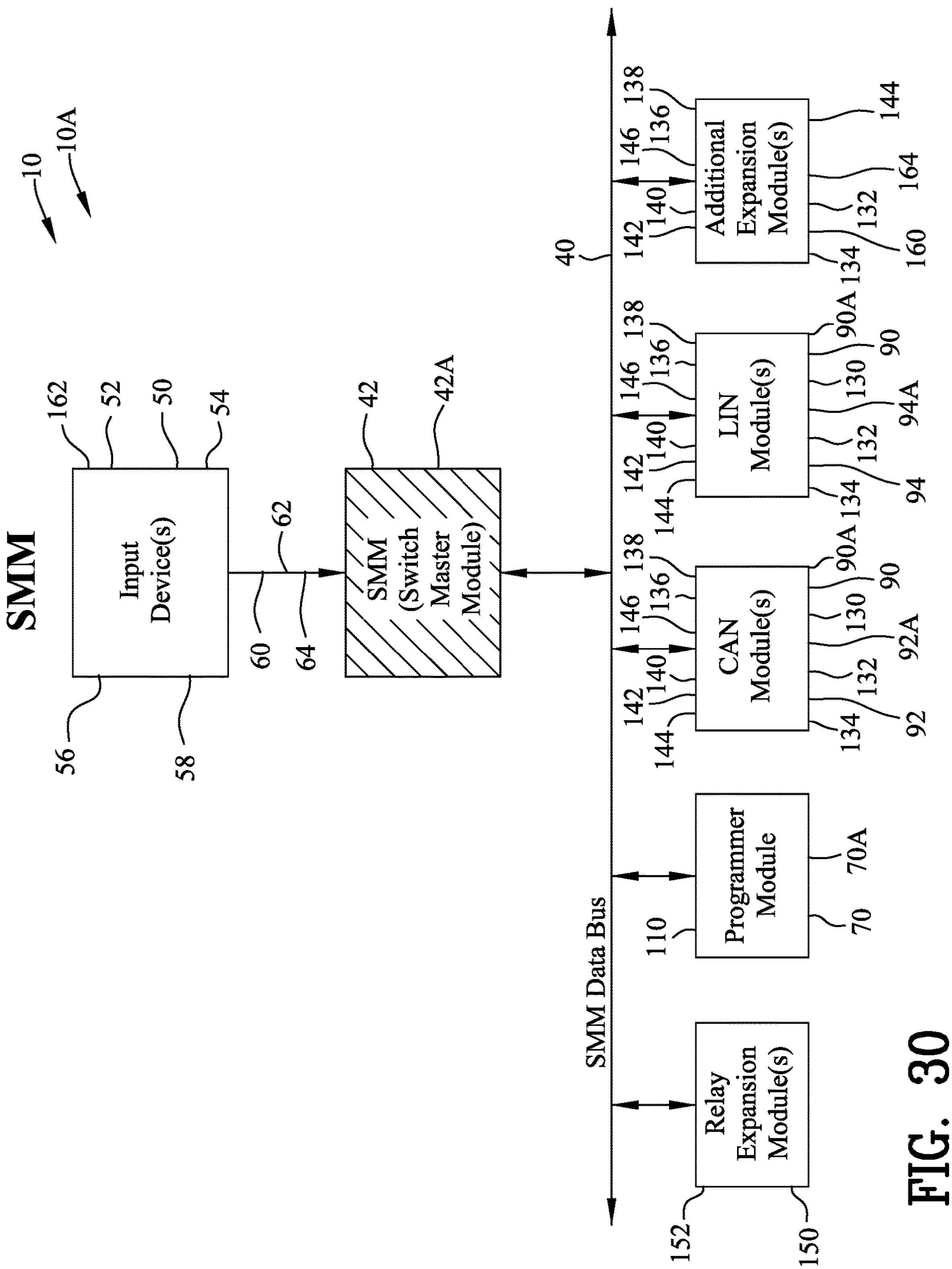
FIG. 30 is a view similar to FIG. 28 illustrating a switch module.
Figure 31:
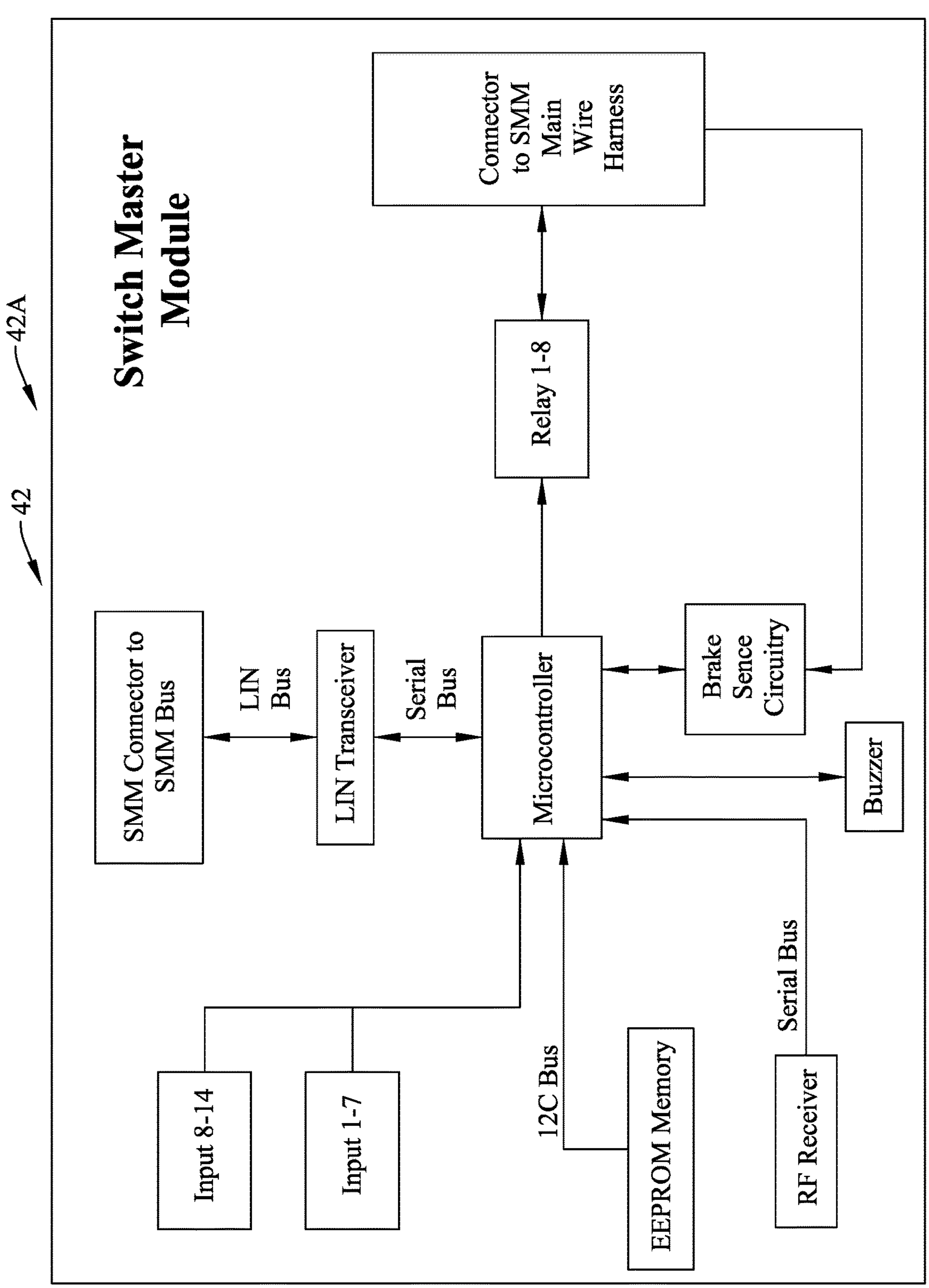
FIG. 31 an electrical diagram of the switch module in FIG. 30.
Figure 32:
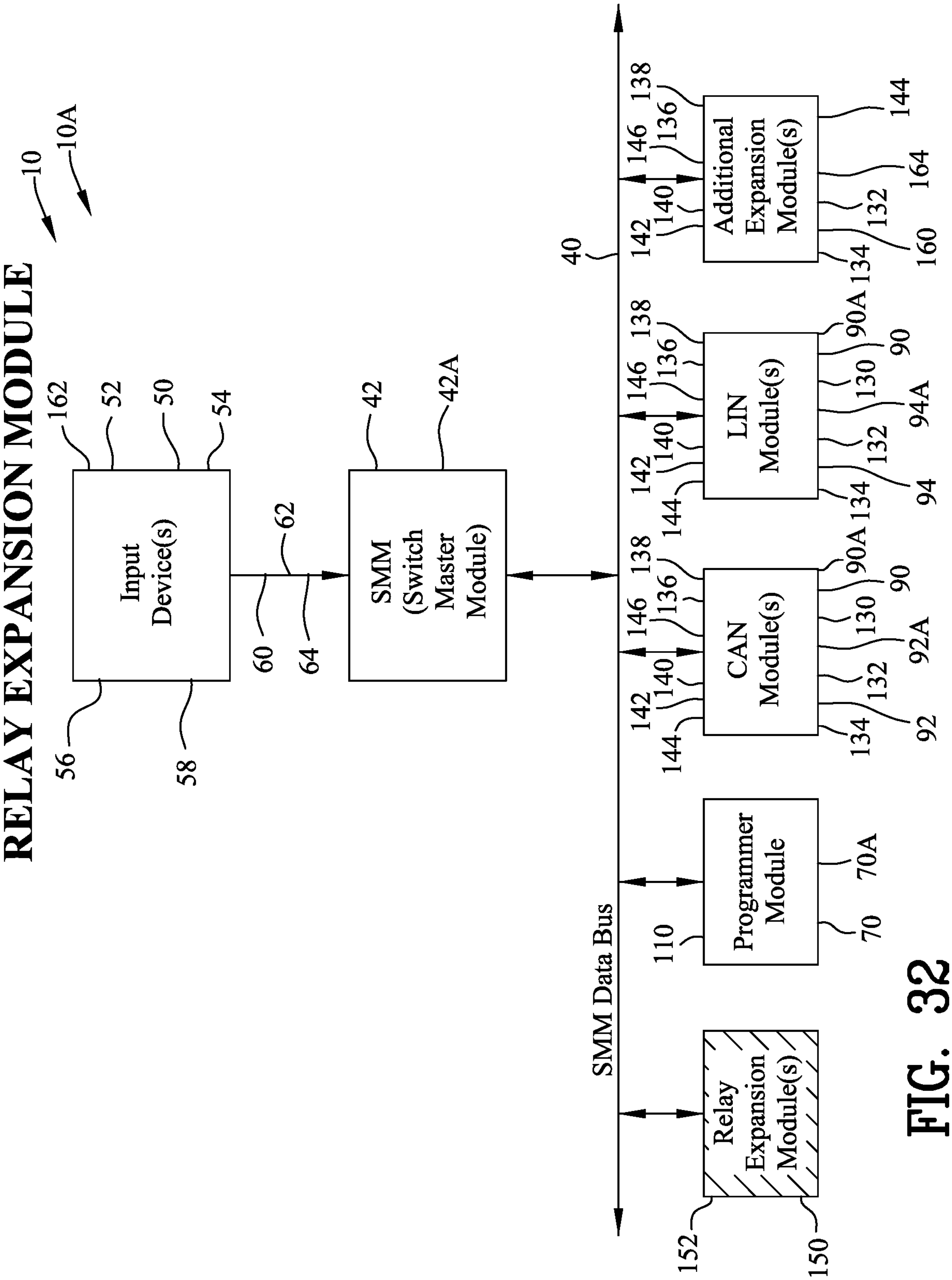
FIG. 32 is a view similar to FIG. 28 illustrating a relay expansion module.
Figure 33:
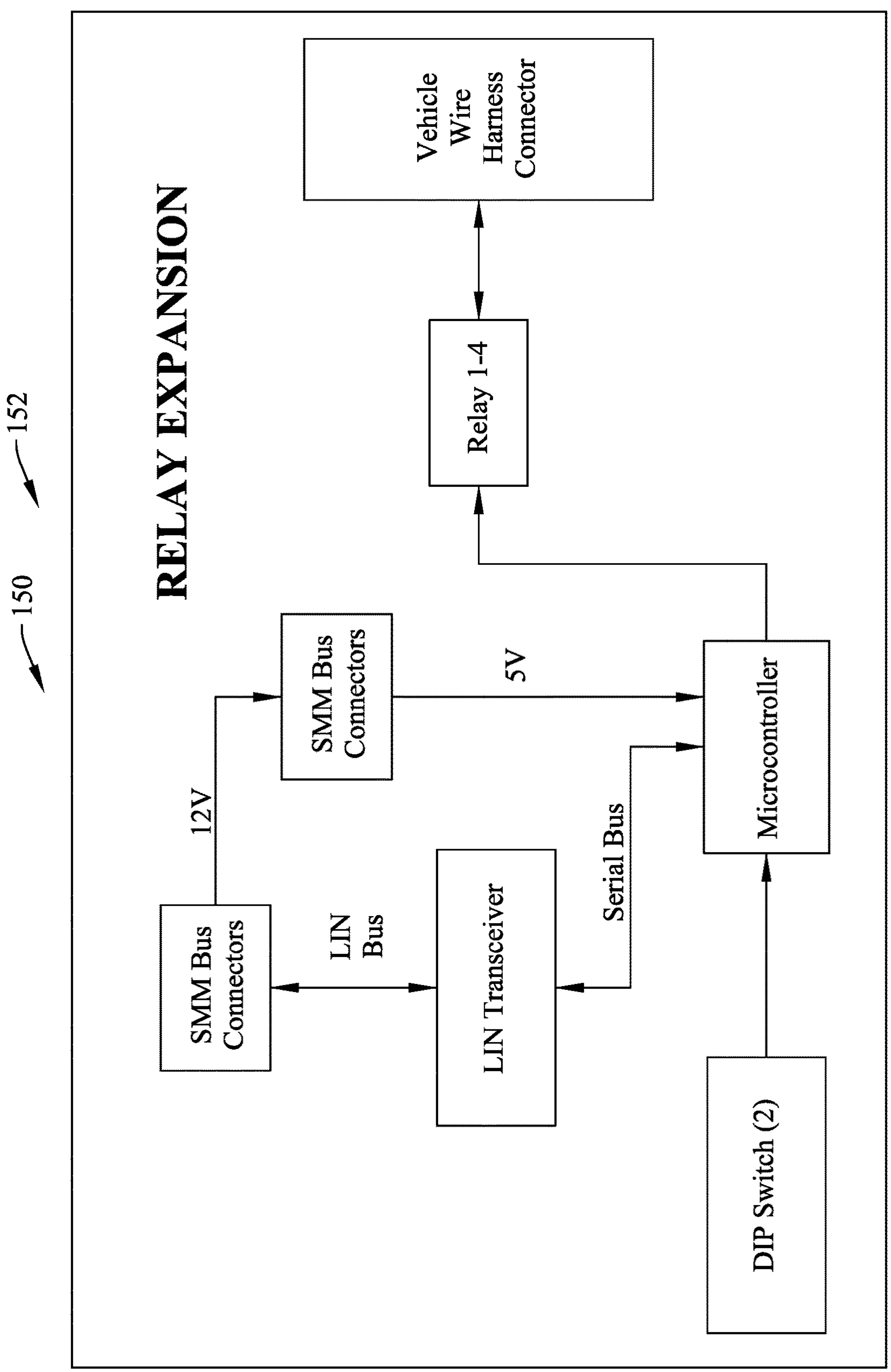
FIG. 33 is an electrical diagram of the relay expansion module in FIG. 32.
Figure 34:
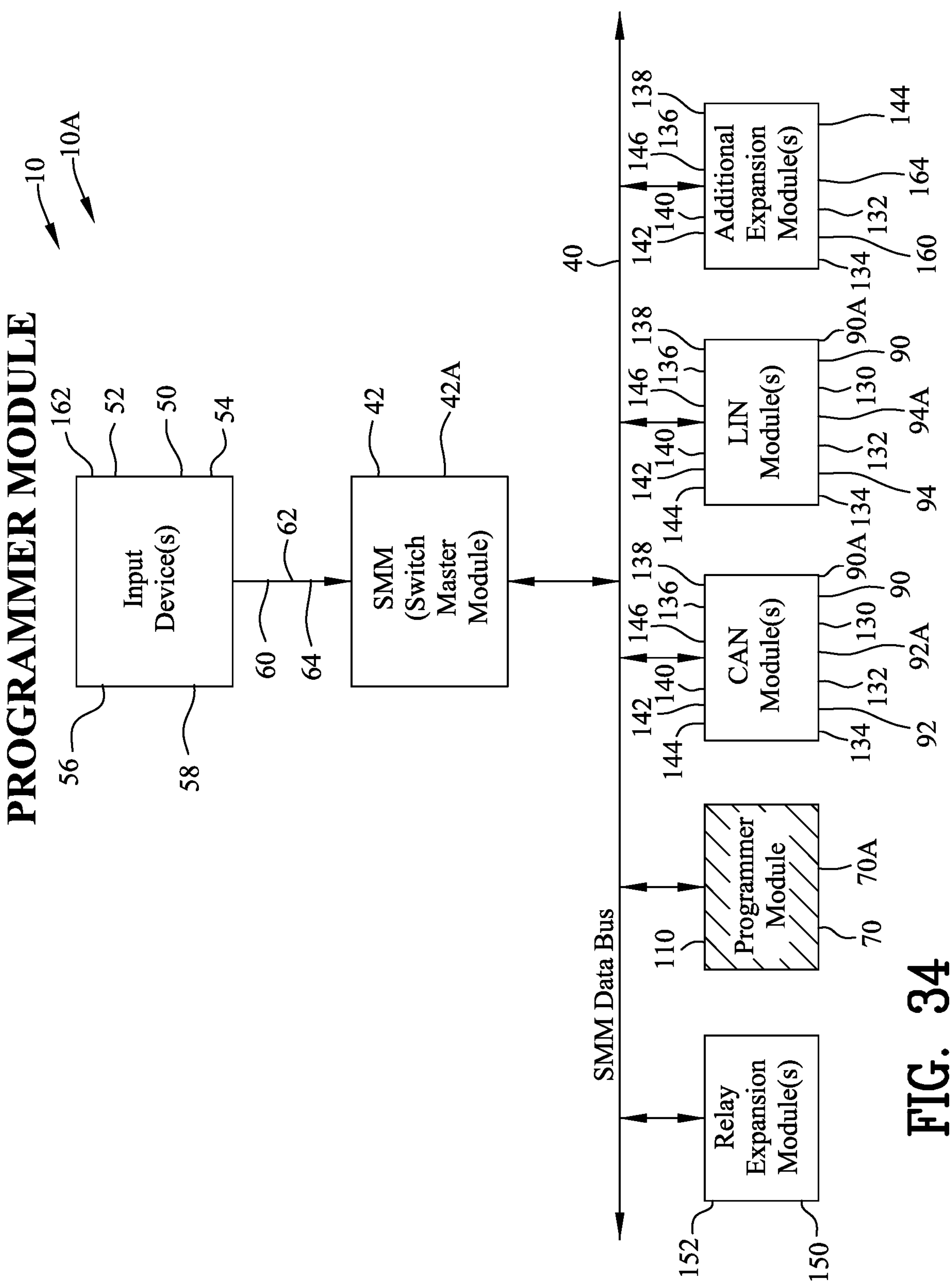
FIG. 34 is a view similar to FIG. 28 illustrating a programmer module.
Figure 35:
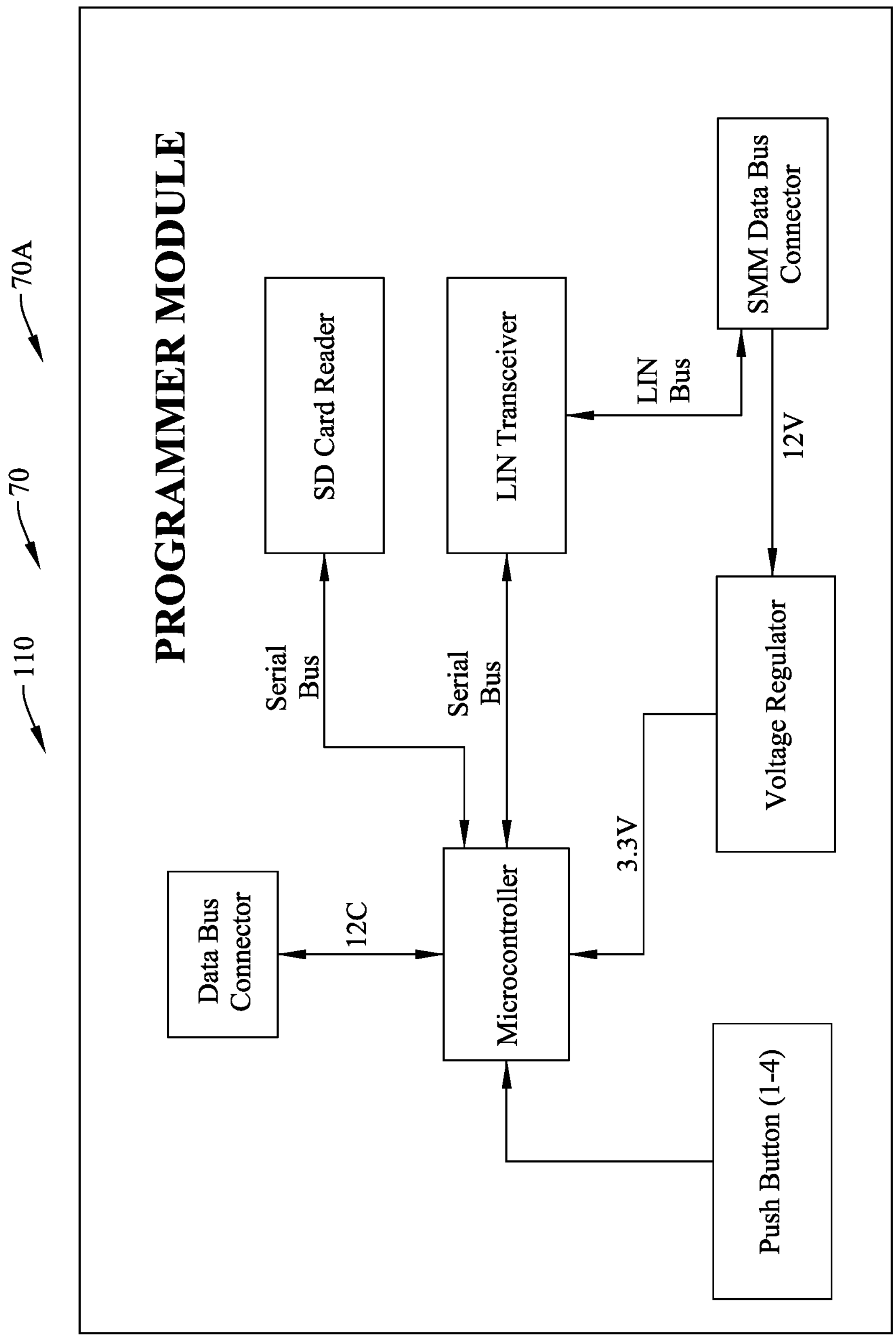
FIG. 35 is an electrical diagram of the programmer module in FIG. 34.
Figure 36:
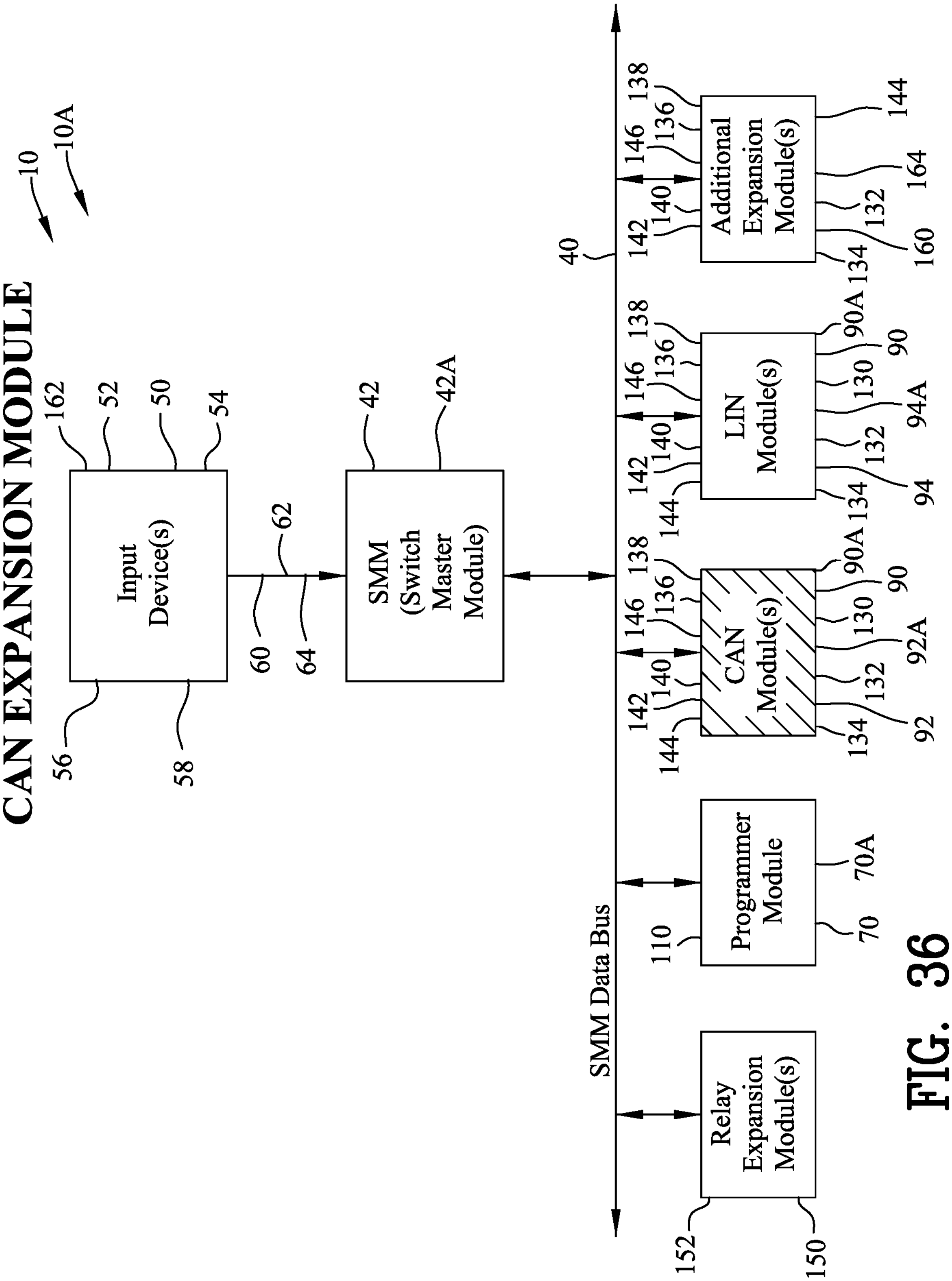
FIG. 36 is a view similar to FIG. 28 illustrating a Controller Area Network (CAN) expansion module.
Figure 37:
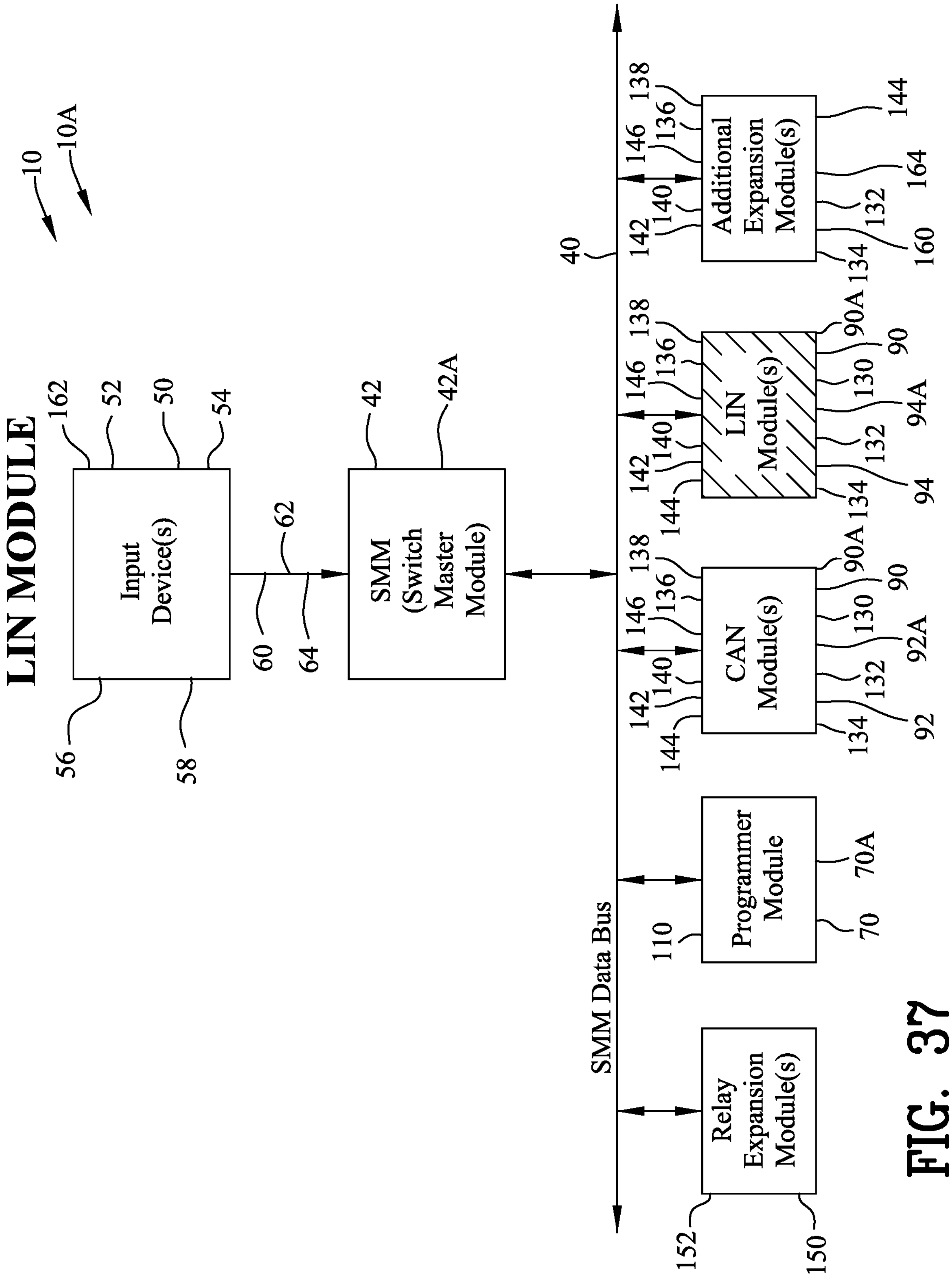
FIG. 37 is a view similar to FIG. 28 illustrating a Local Interconnect Network (LIN) expansion module.
Figure 38:
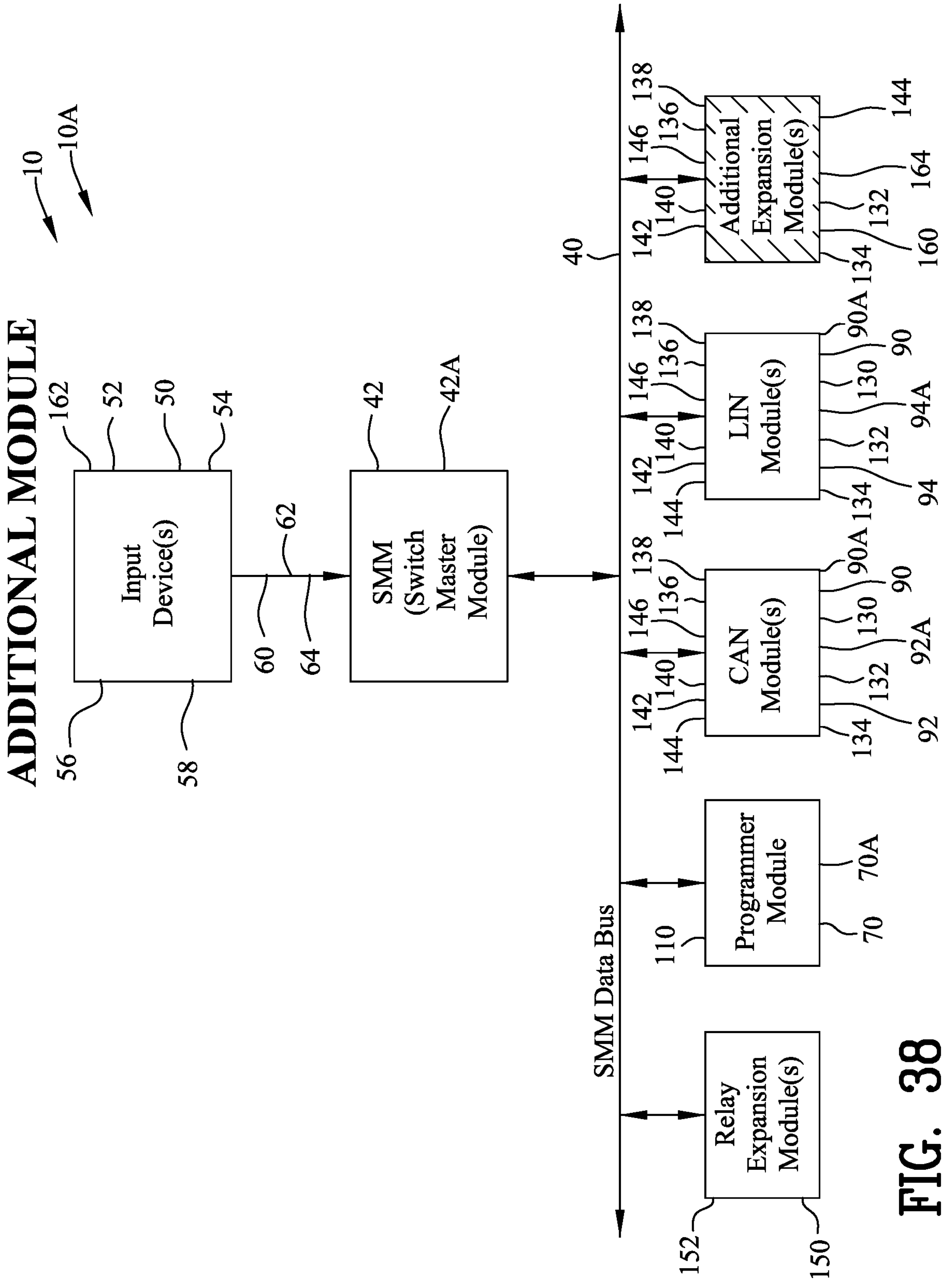
FIG. 38 is a view similar to FIG. 28 illustrating an additional module.
Figure 39:
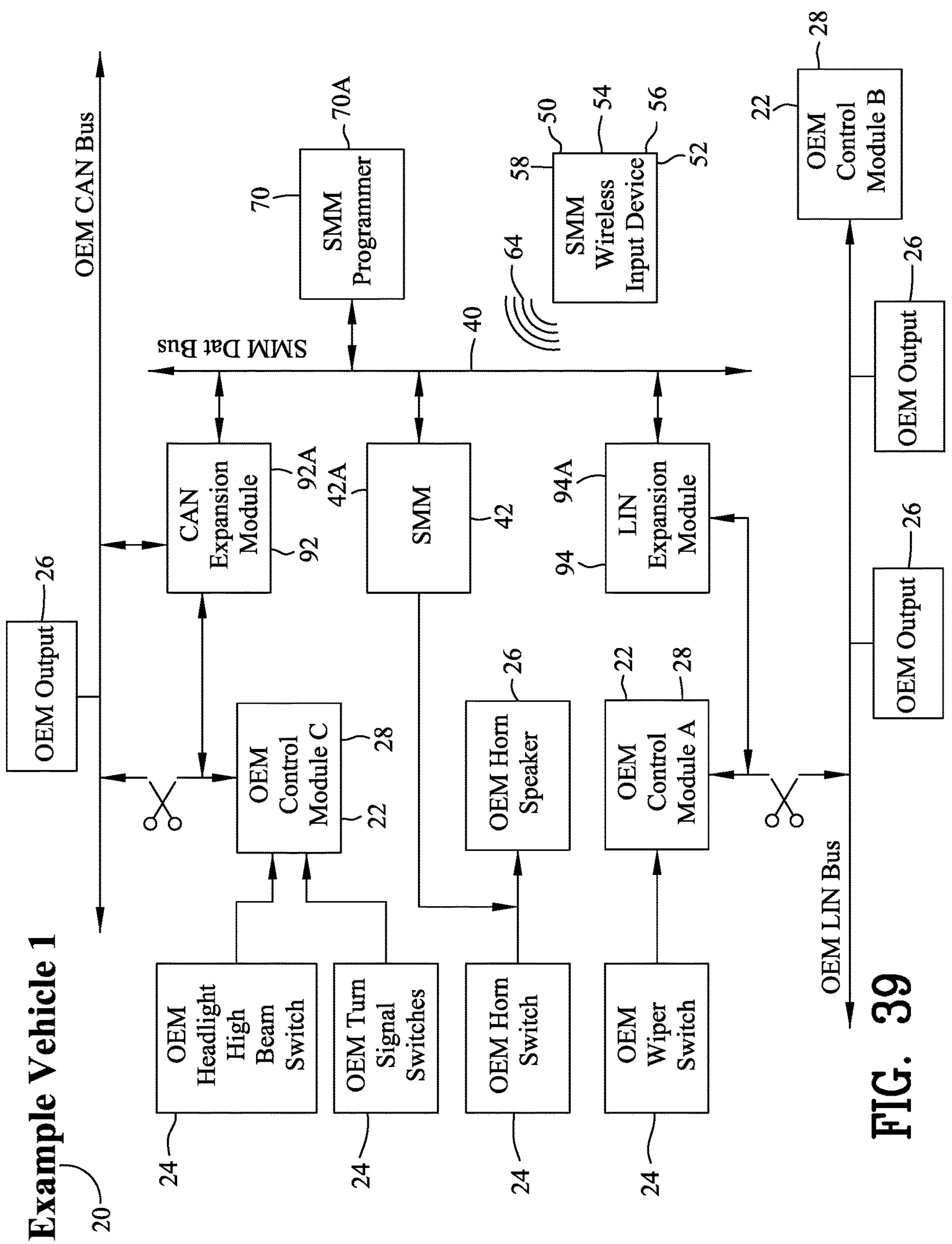
FIG. 39 is an electrical diagram of the self programmable microcontroller incorporating into a first vehicle.
Figure 40:
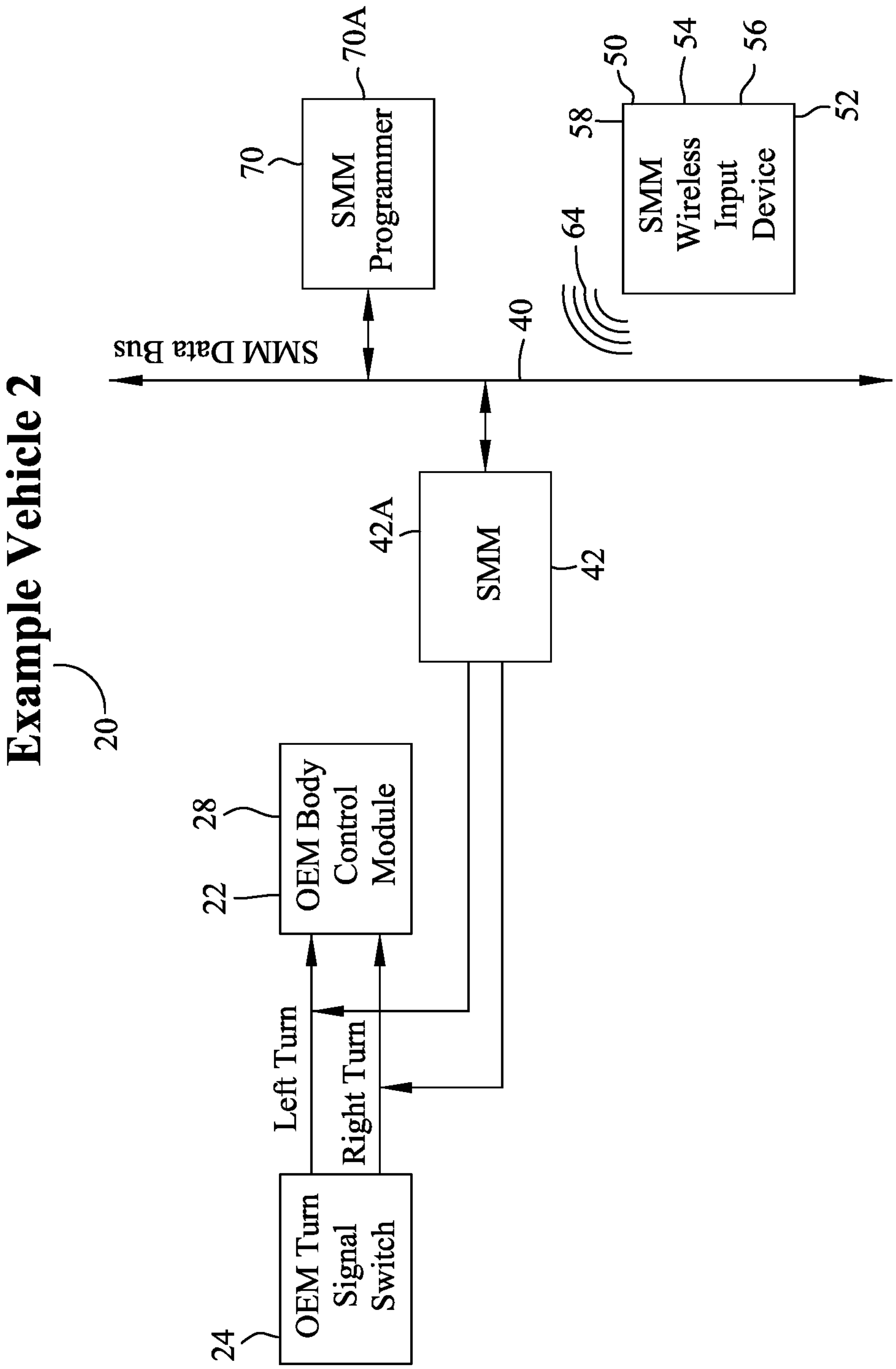
FIG. 40 is an electrical diagram of the self programmable microcontroller incorporating into a second vehicle.
Figure 41:
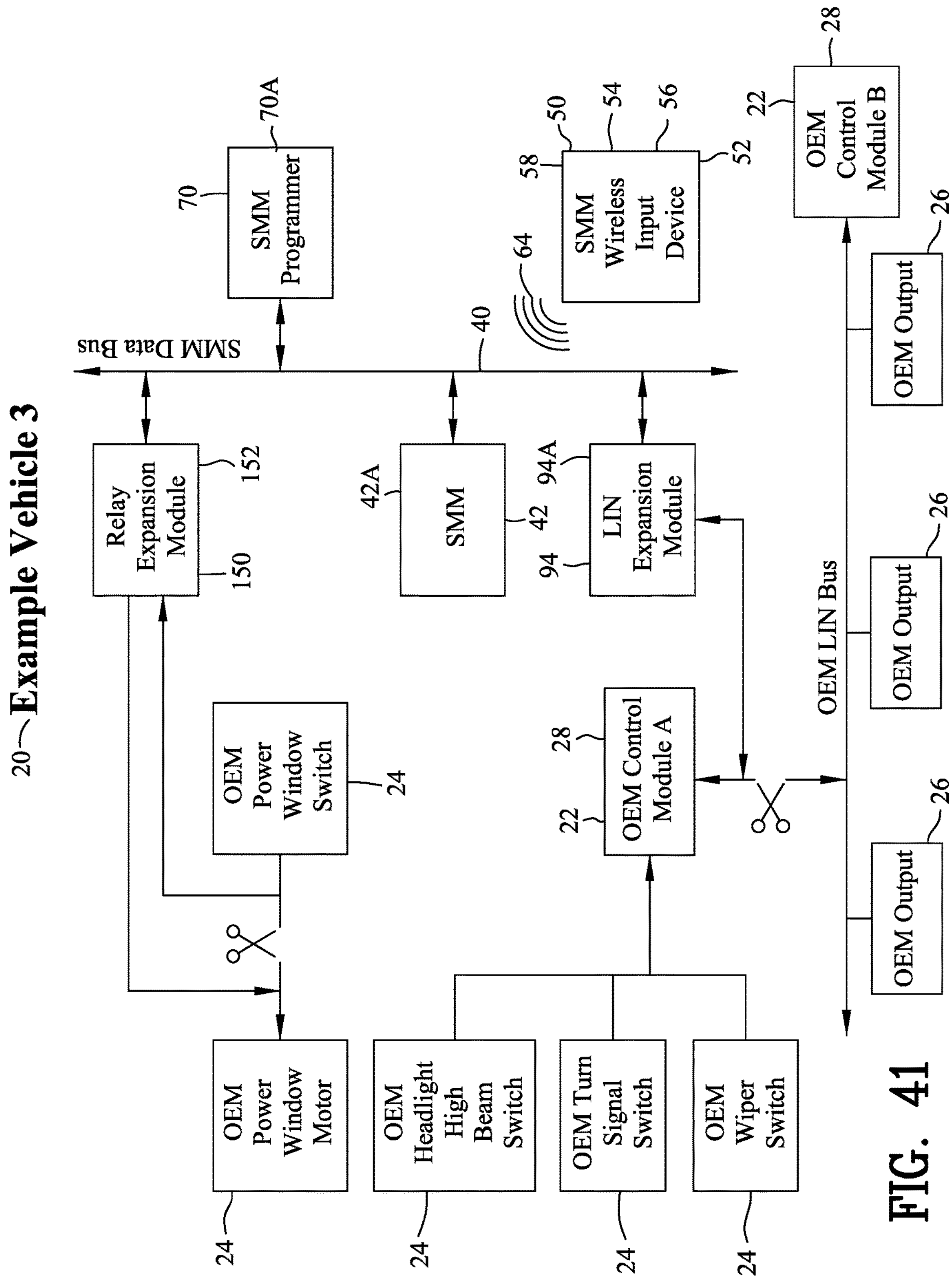
FIG. 41 is an electrical diagram of the self programmable microcontroller incorporating into a third vehicle.
Figure 42:
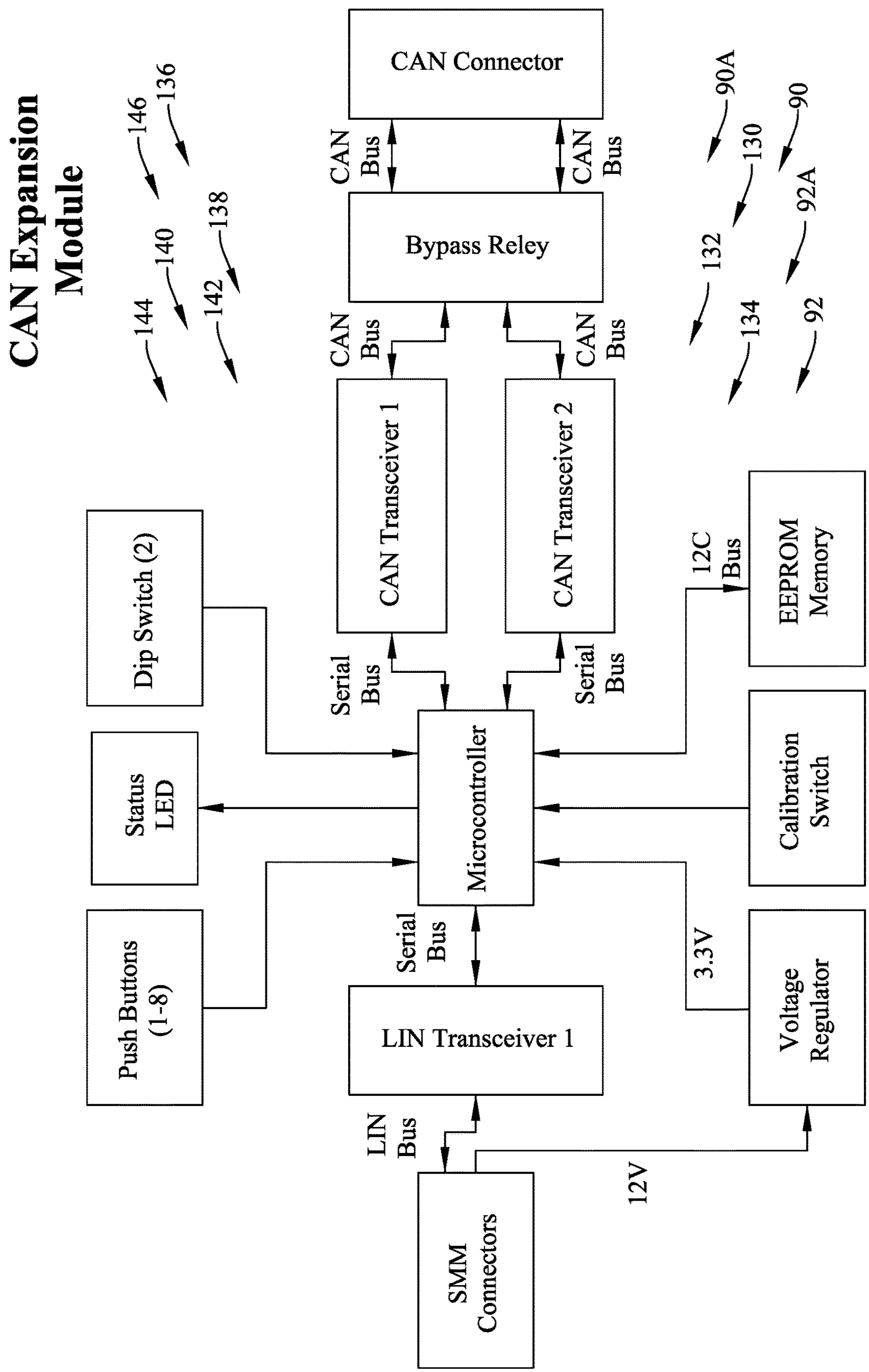
FIG. 42 is a block diagram of the Controller Area Network (CAN) expansion module.
Figure 43:
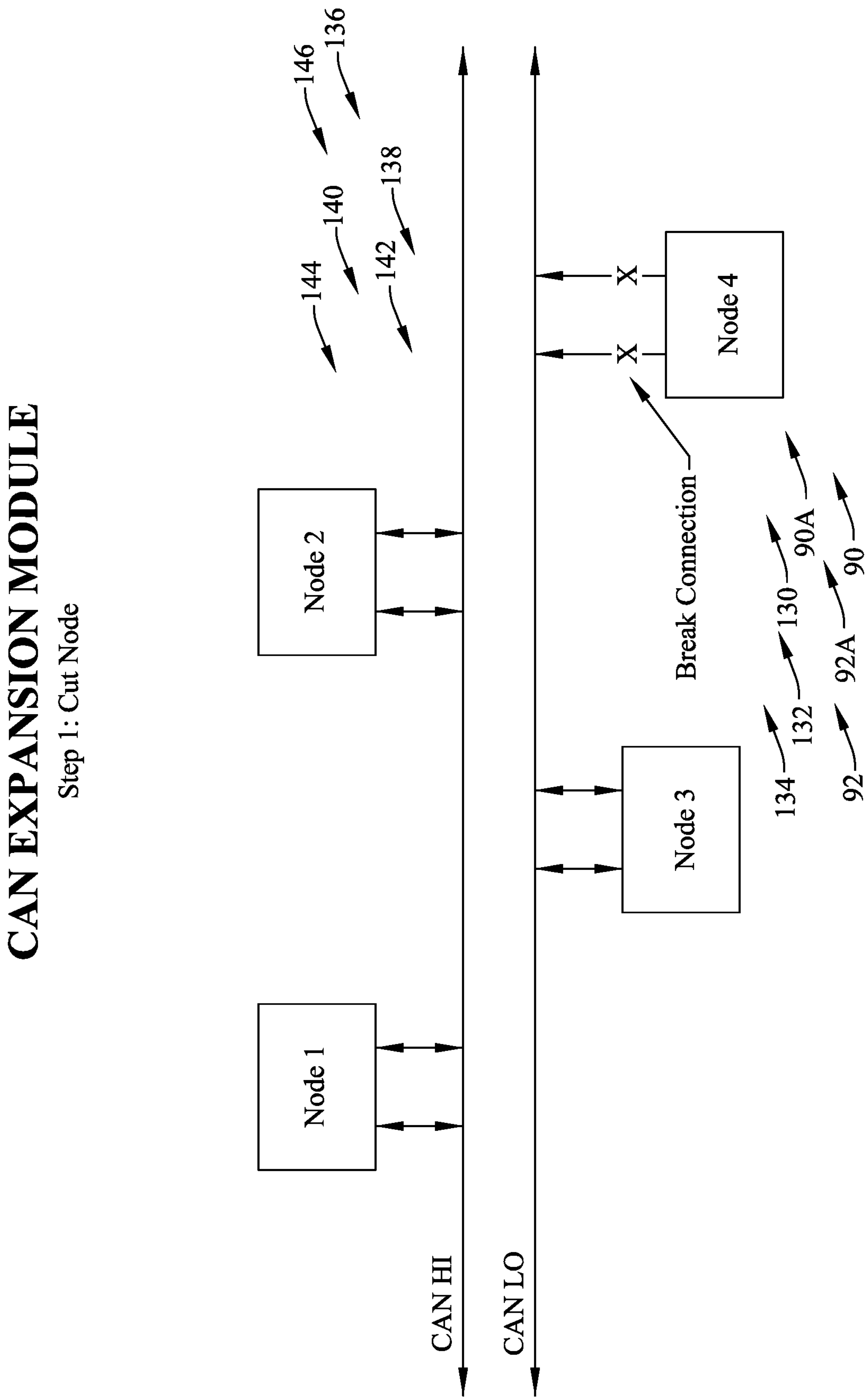
FIG. 43 is a first electrical diagram illustrating a first step for installing the self programmable microcontroller using the Controller Area Network (CAN) expansion module.
Figure 44:
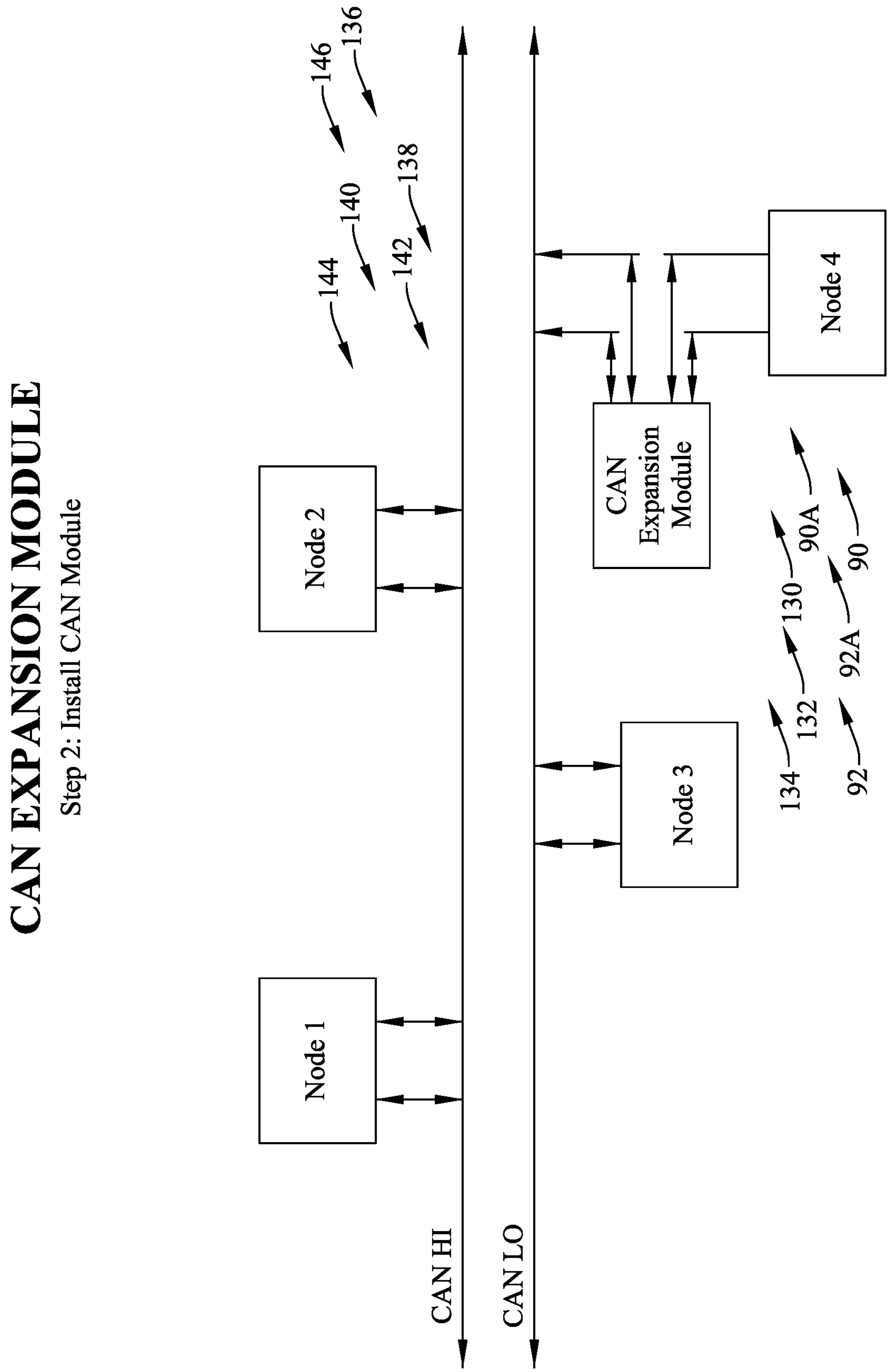
FIG. 44 is a second electrical diagram illustrating a second step for installing the self programmable microcontroller using the Controller Area Network (CAN) expansion module.
Figure 45:
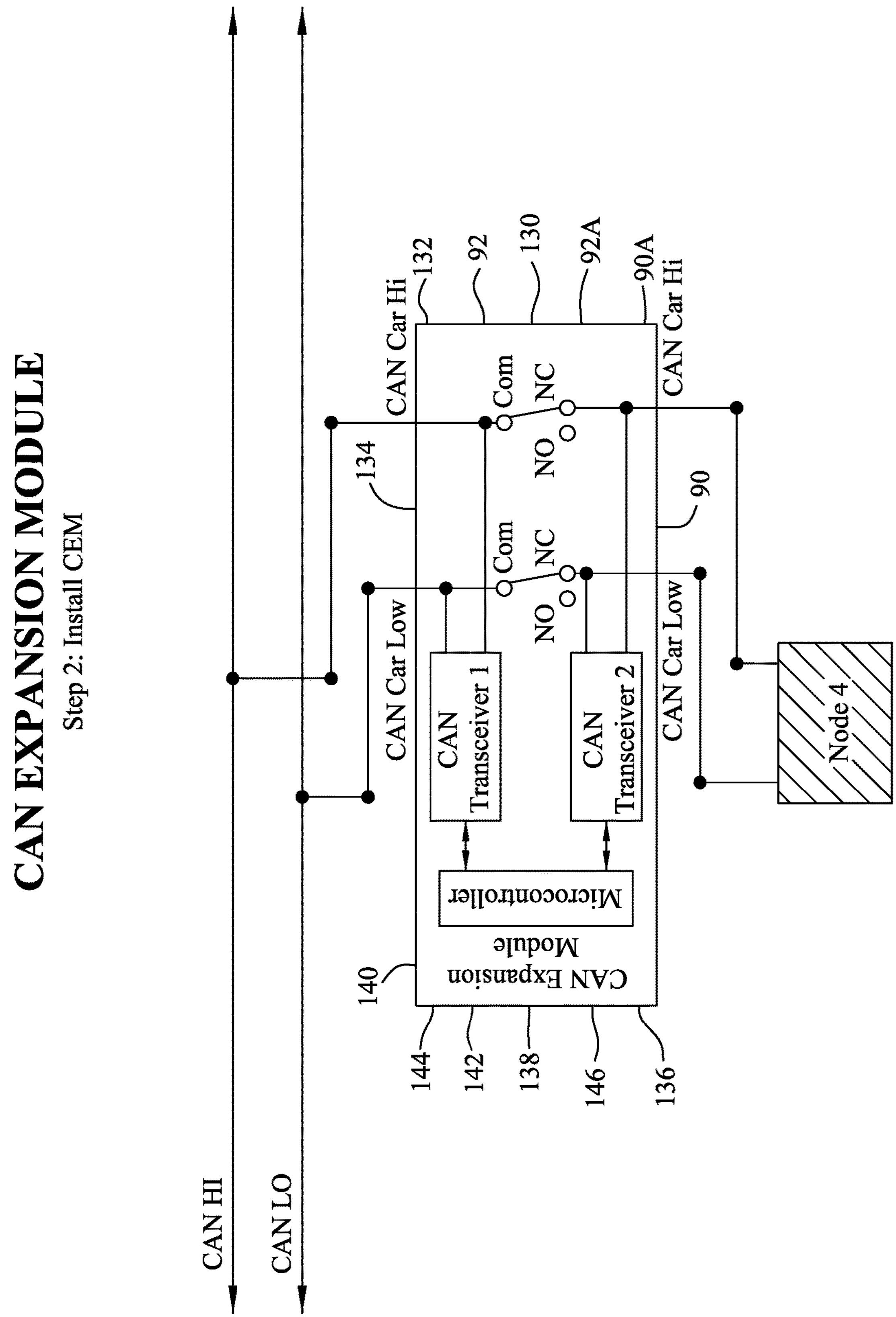
FIG. 45 is an electrical diagram of a portion of FIG. 44.
Figure 46:
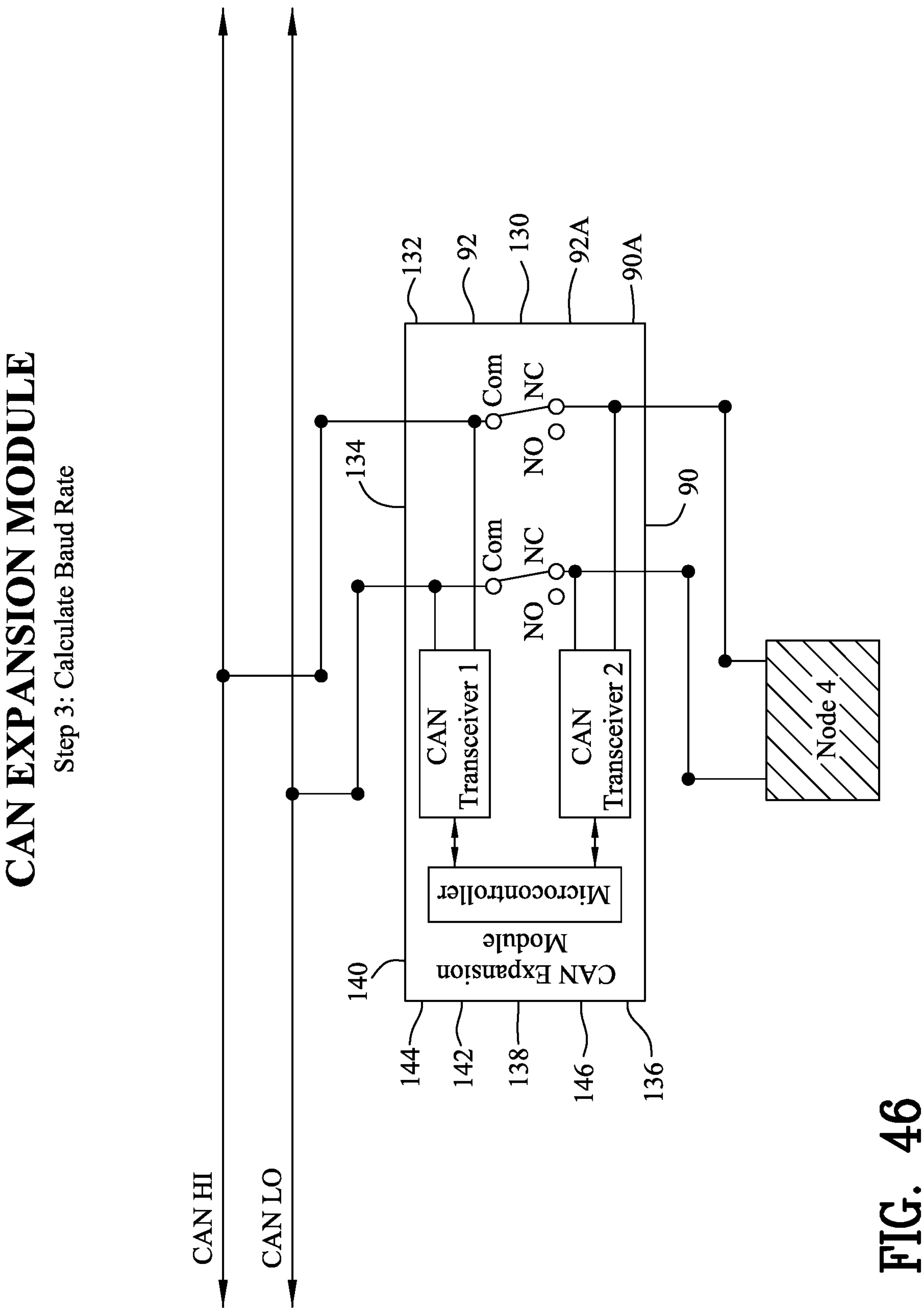
FIG. 46 is an electrical diagram similar to FIG. 45 illustrating a third step for installing the self programmable microcontroller using the Controller Area Network (CAN) expansion module.
Figure 47:
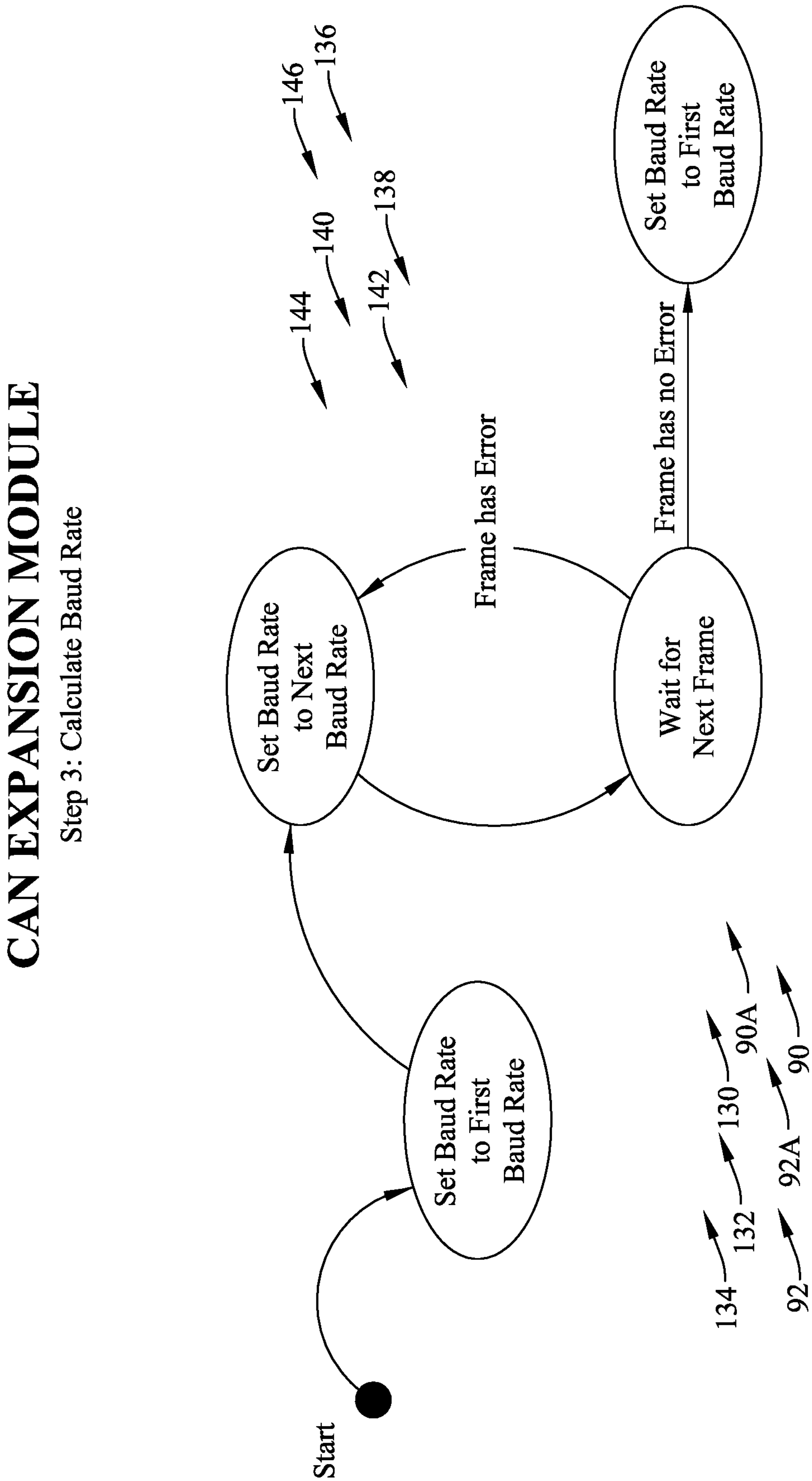
FIG. 47 is a flow diagram of FIG. 46 illustrating calculating a baud rate.
Figure 48:
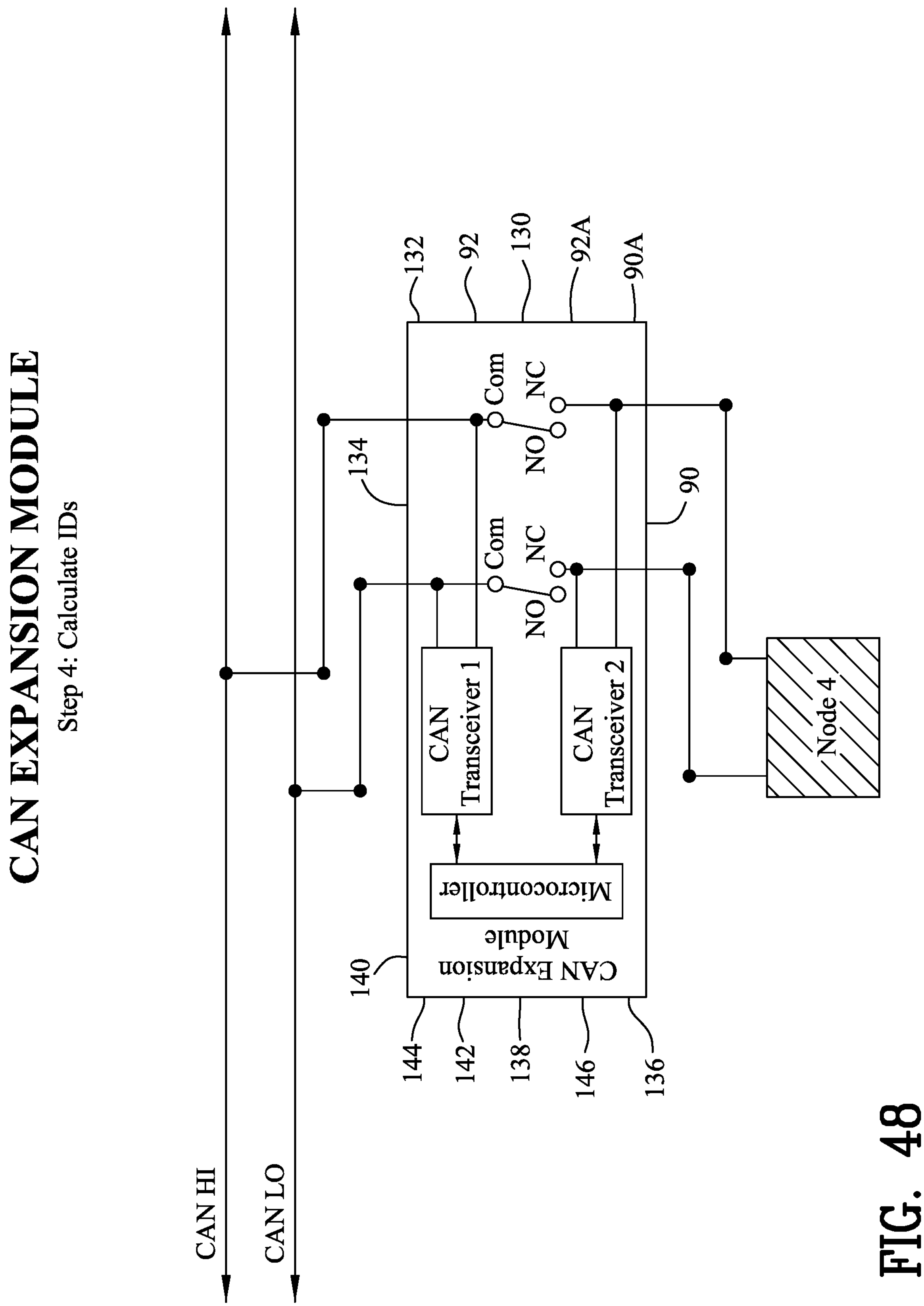
FIG. 48 is an electrical diagram similar to FIG. 46 illustrating a fourth step for installing the self programmable microcontroller using the Controller Area Network (CAN) expansion module.
Figure 49:
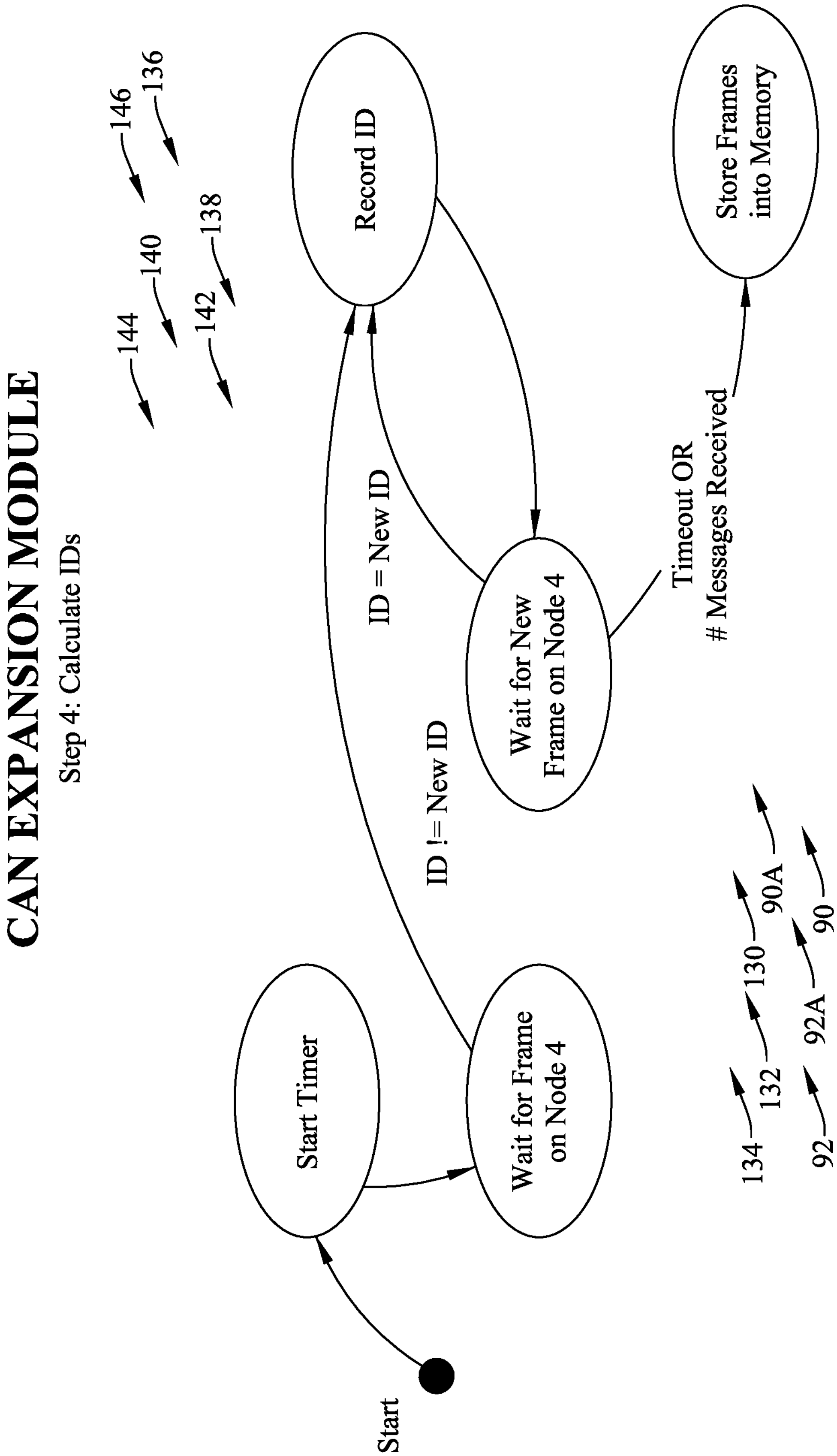
FIG. 49 is a flow diagram of FIG. 48 illustrating calculating IDs.
Figure 50:
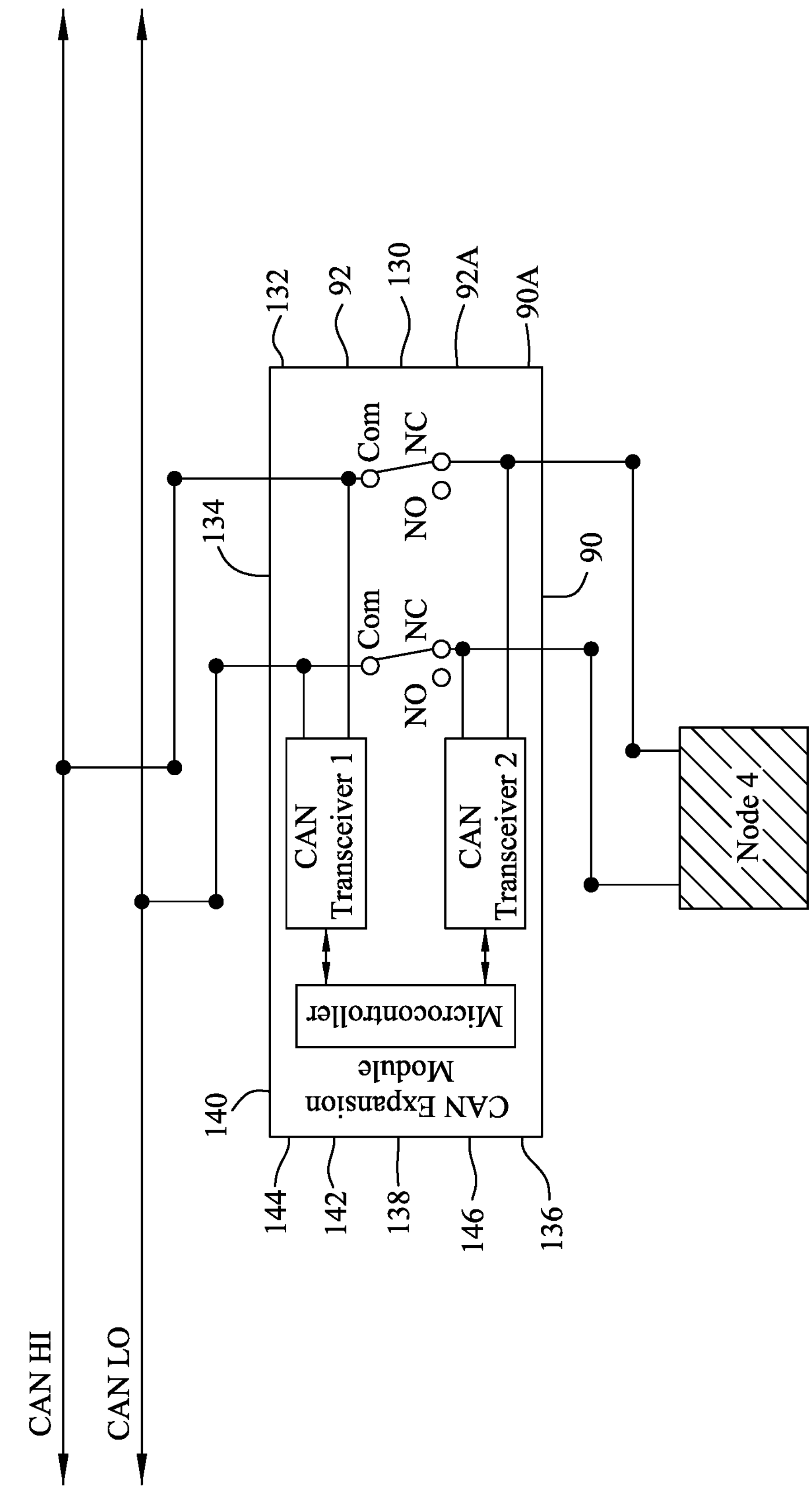
FIG. 50 is an electrical diagram similar to FIG. 48 illustrating a fifth step for installing the self programmable microcontroller using the Controller Area Network (CAN) expansion module.
Figure 51:
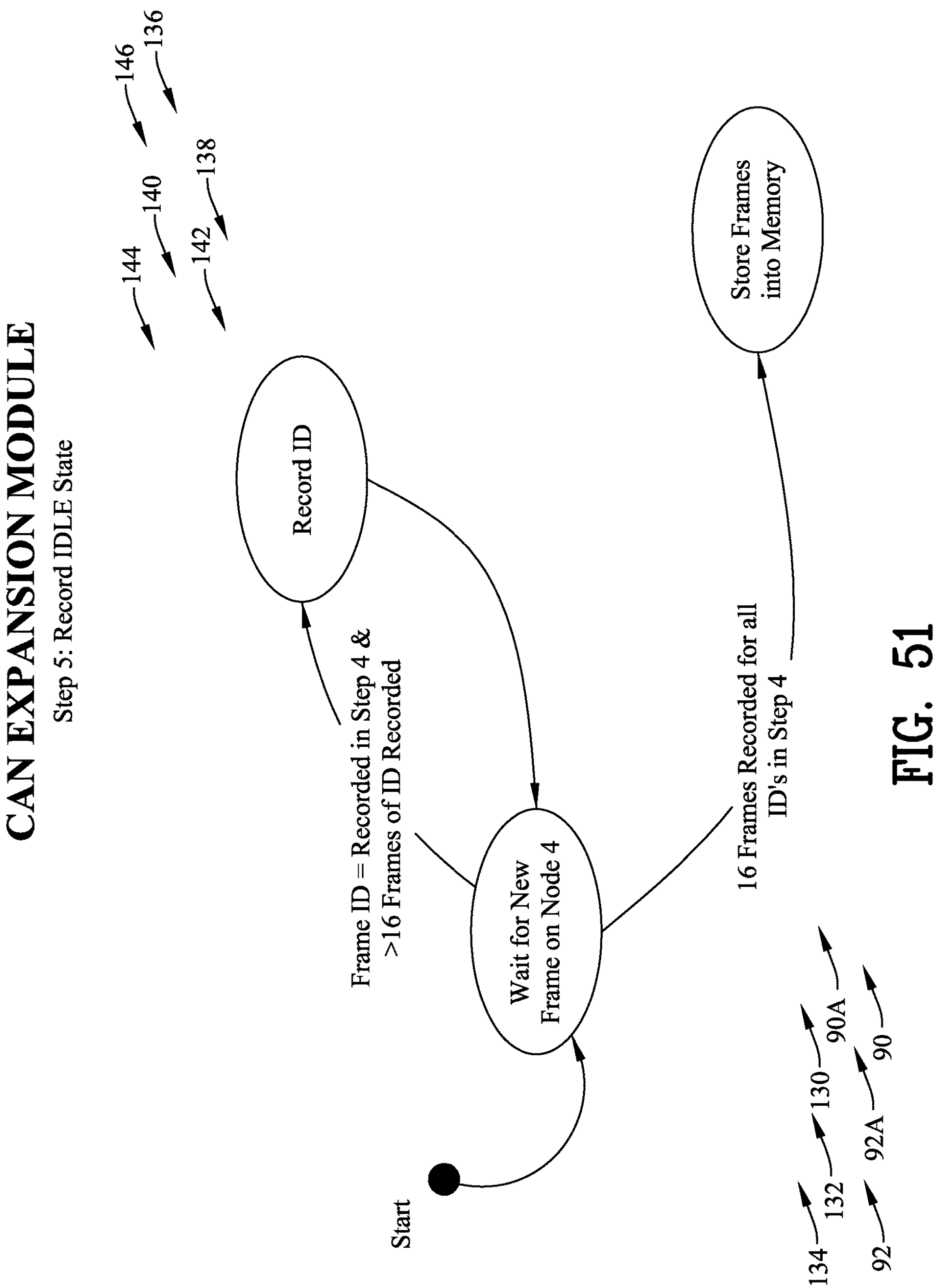
FIG. 51 is a flow diagram of FIG. 50 illustrating recording IDLE state.
Figure 52:
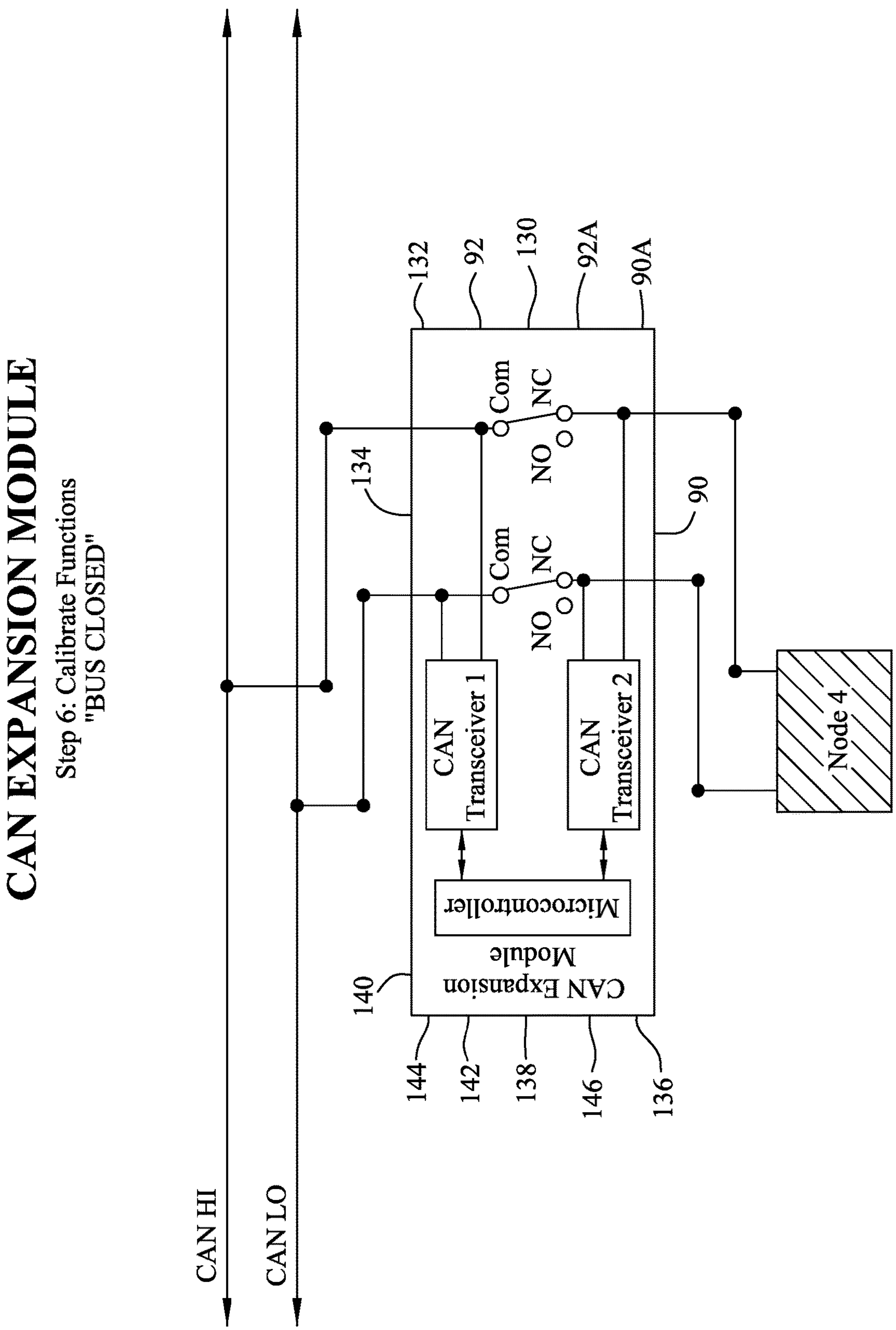
FIG. 52 is an electrical diagram similar to FIG. 50 illustrating a sixth step for installing the self programmable microcontroller using the Controller Area Network (CAN) expansion module.
Figure 53:
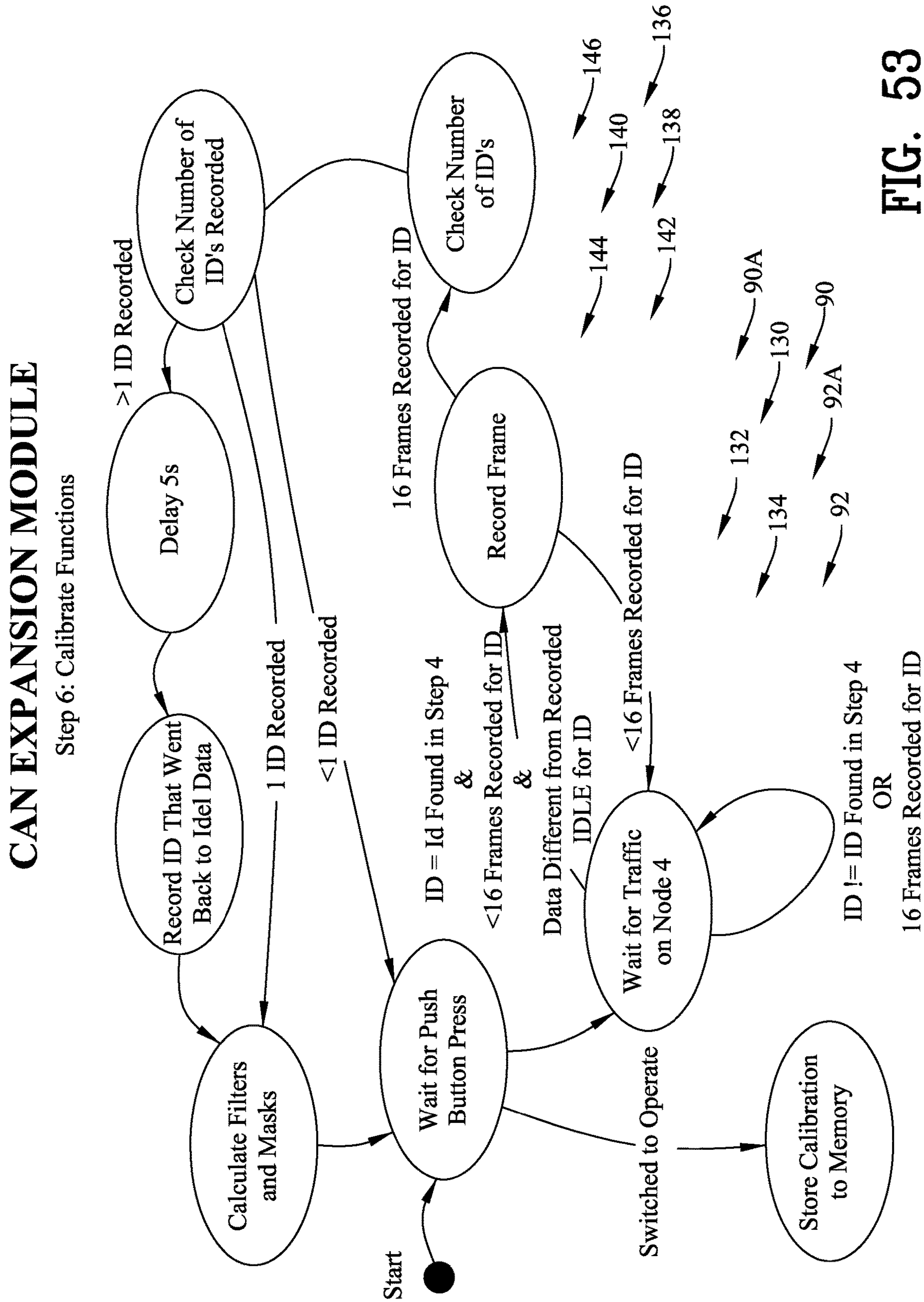
FIG. 53 is a flow diagram of FIG. 52 illustrating calibrating functions.
Figure 54:
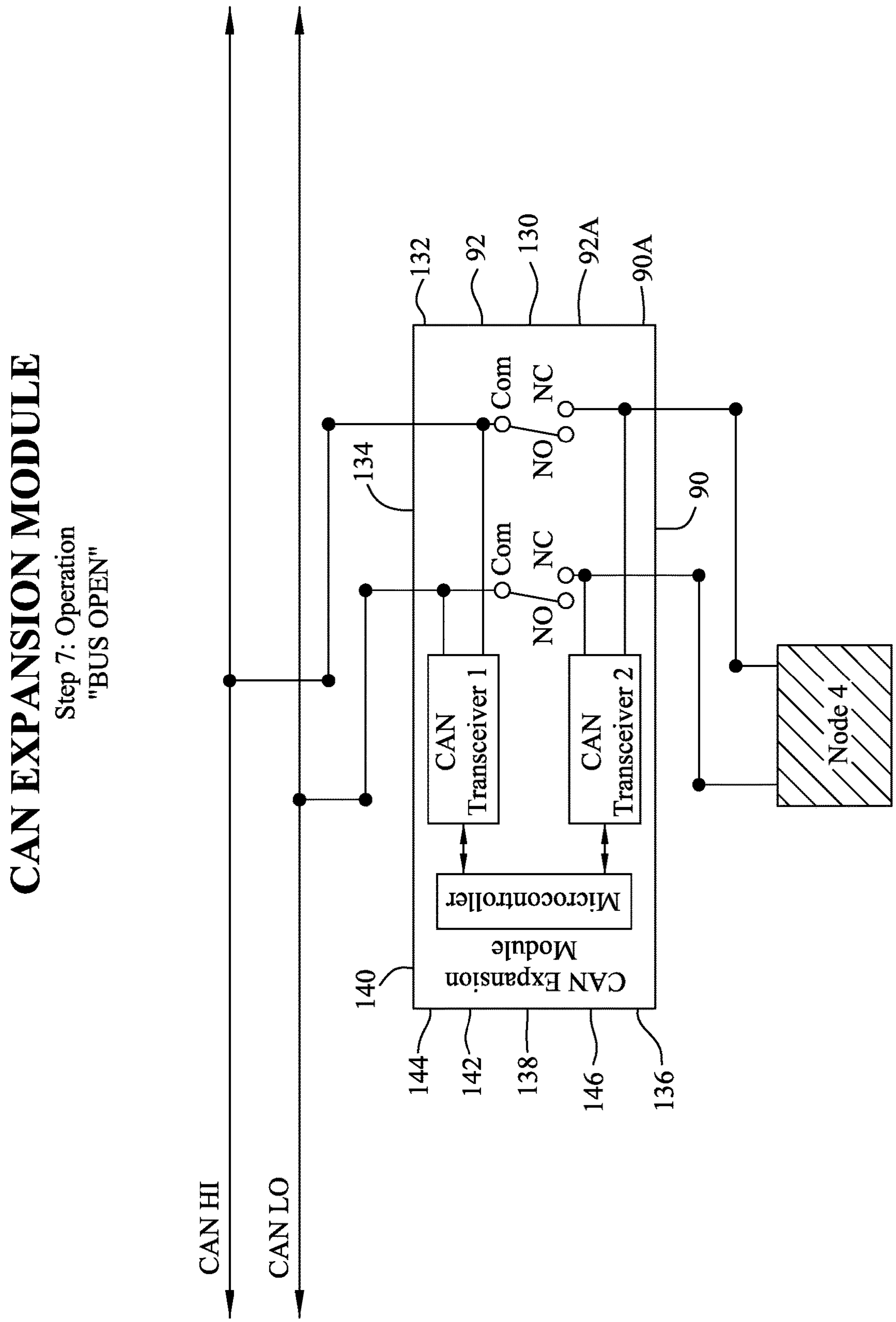
FIG. 54 is an electrical diagram similar to FIG. 52 illustrating a seventh step for installing the self programmable microcontroller using the Controller Area Network (CAN) expansion module.
Figure 55:
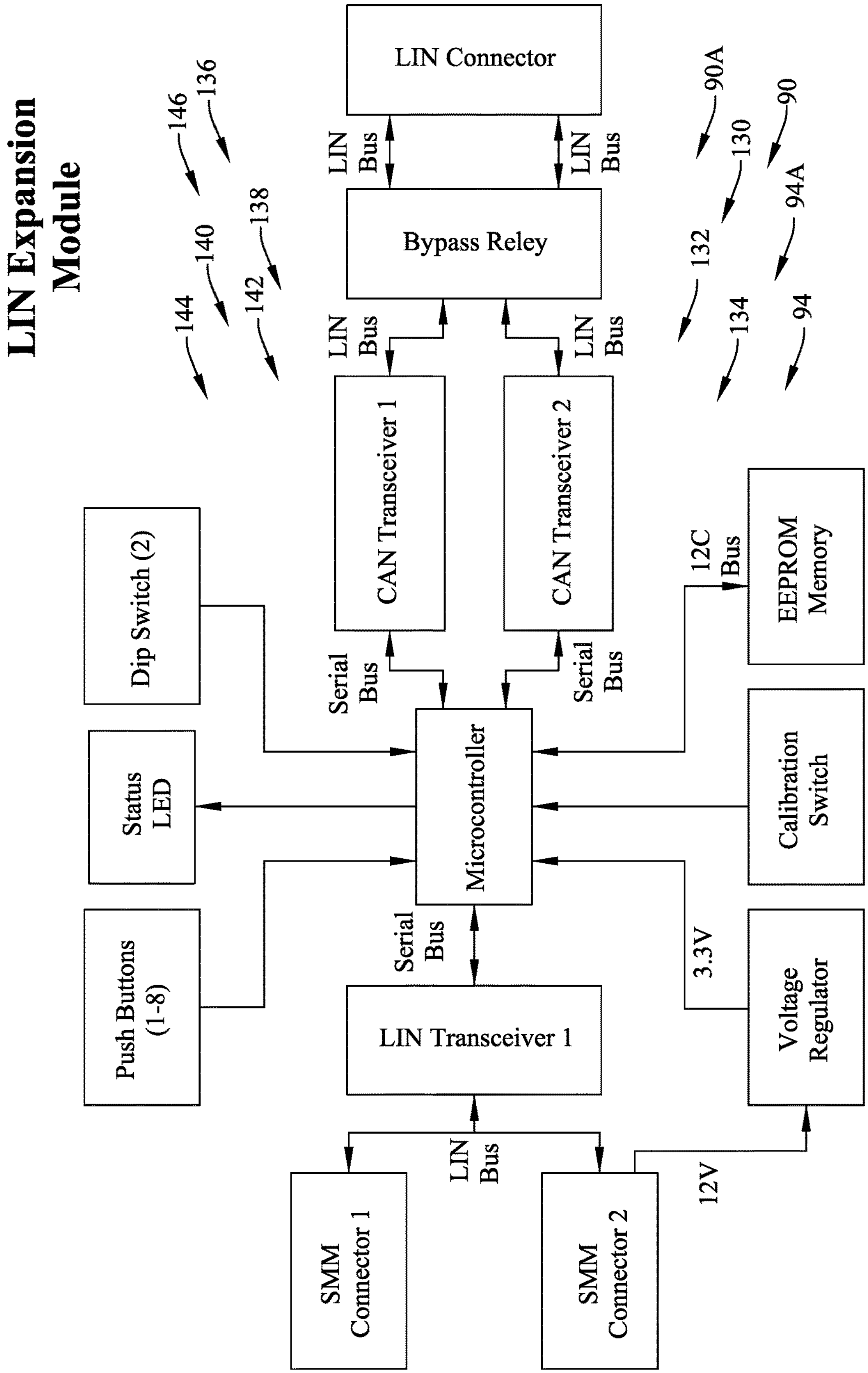
FIG. 55 is a block diagram of the Local Interconnect Network (LIN) expansion module.
Figure 56:
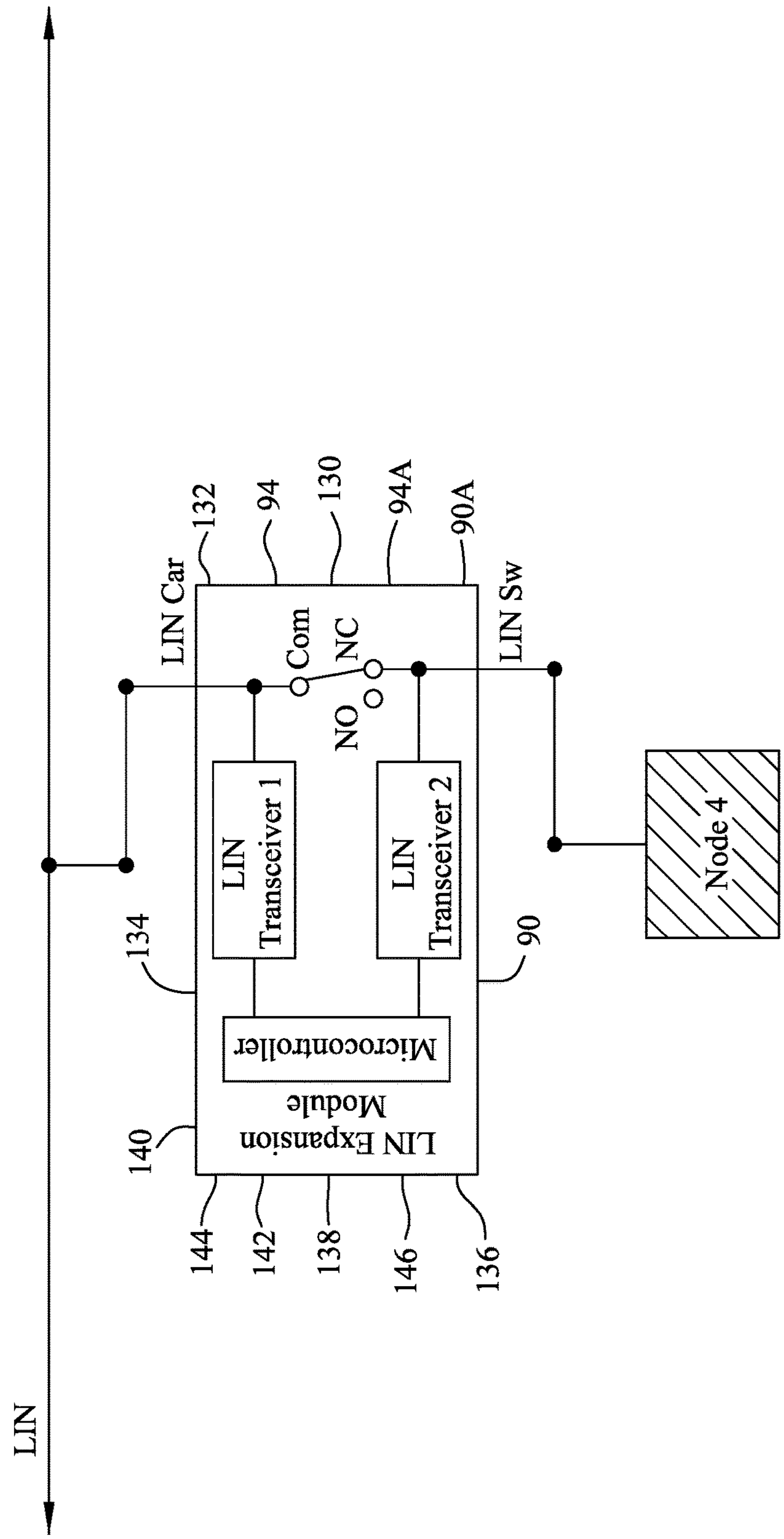
FIG. 56 is an electrical diagram illustrating a second step for installing the self programmable microcontroller using the Local Interconnect Network (LIN) expansion module.
Figure 57:
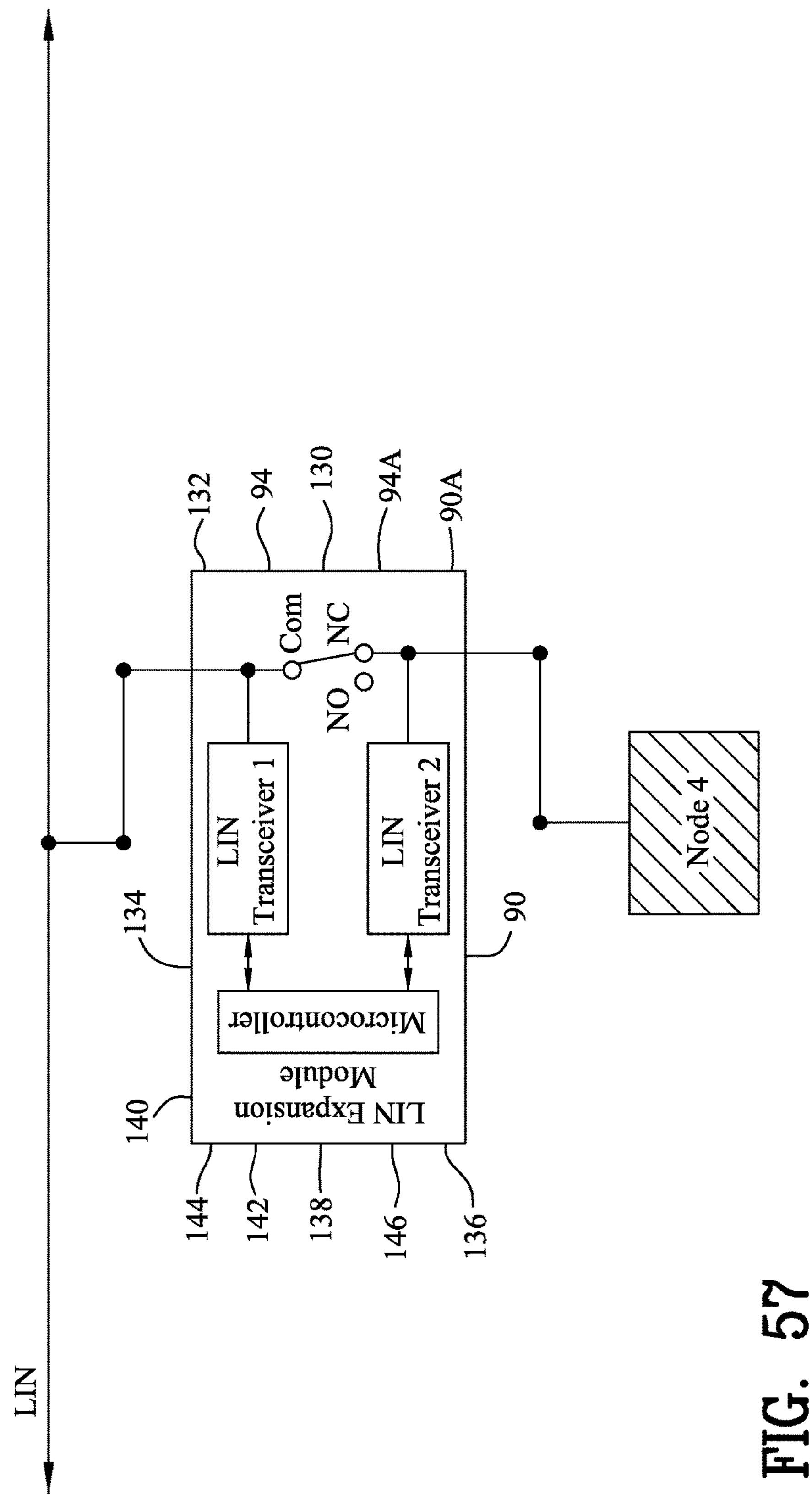
FIG. 57 is an electrical diagram similar to FIG. 56 illustrating a third step for installing the self programmable microcontroller using the Local Interconnect Network (LIN) expansion module.
Figure 58:
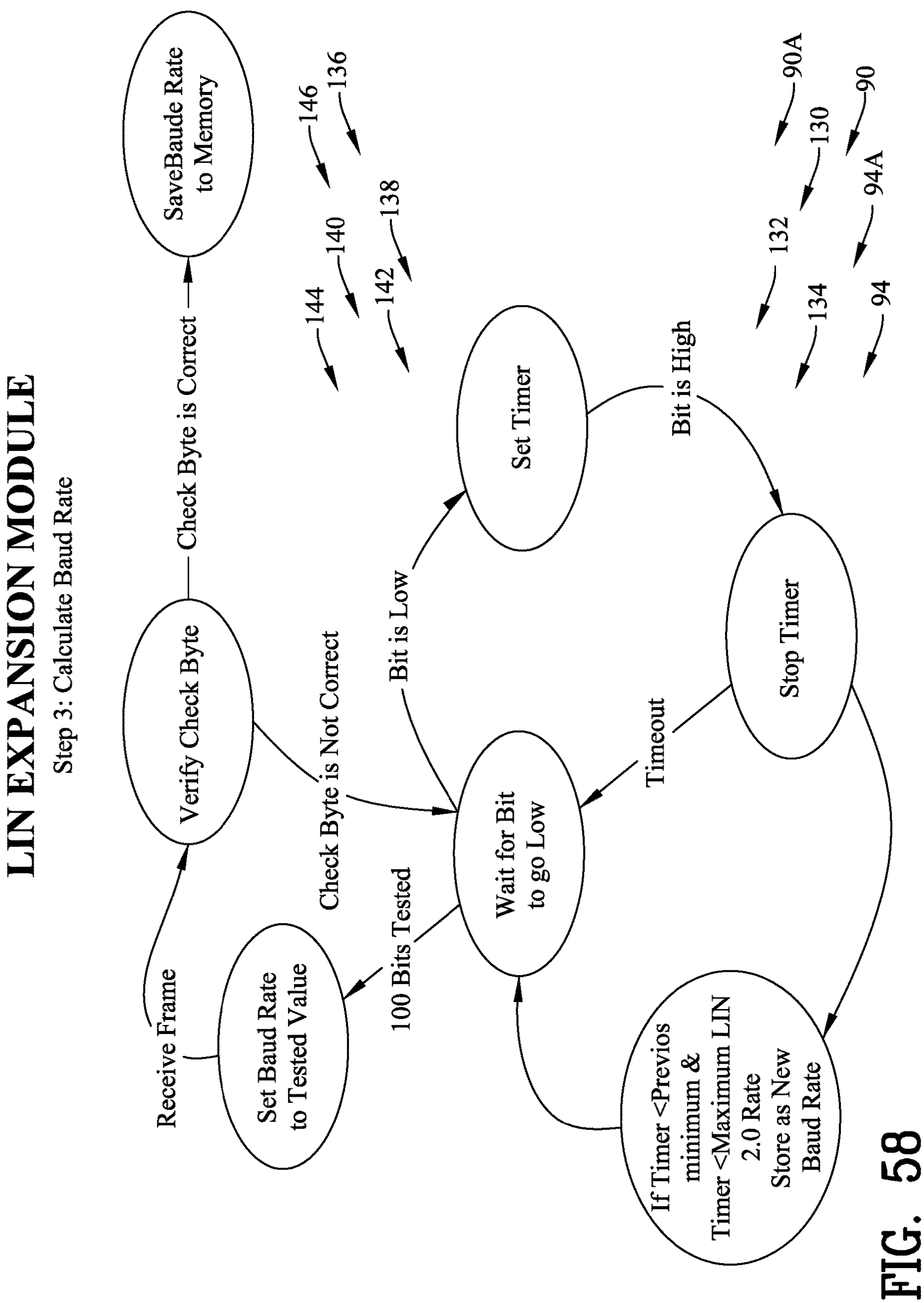
FIG. 58 is a flow diagram of FIG. 57 illustrating calculating a baud rate.
Figure 59:
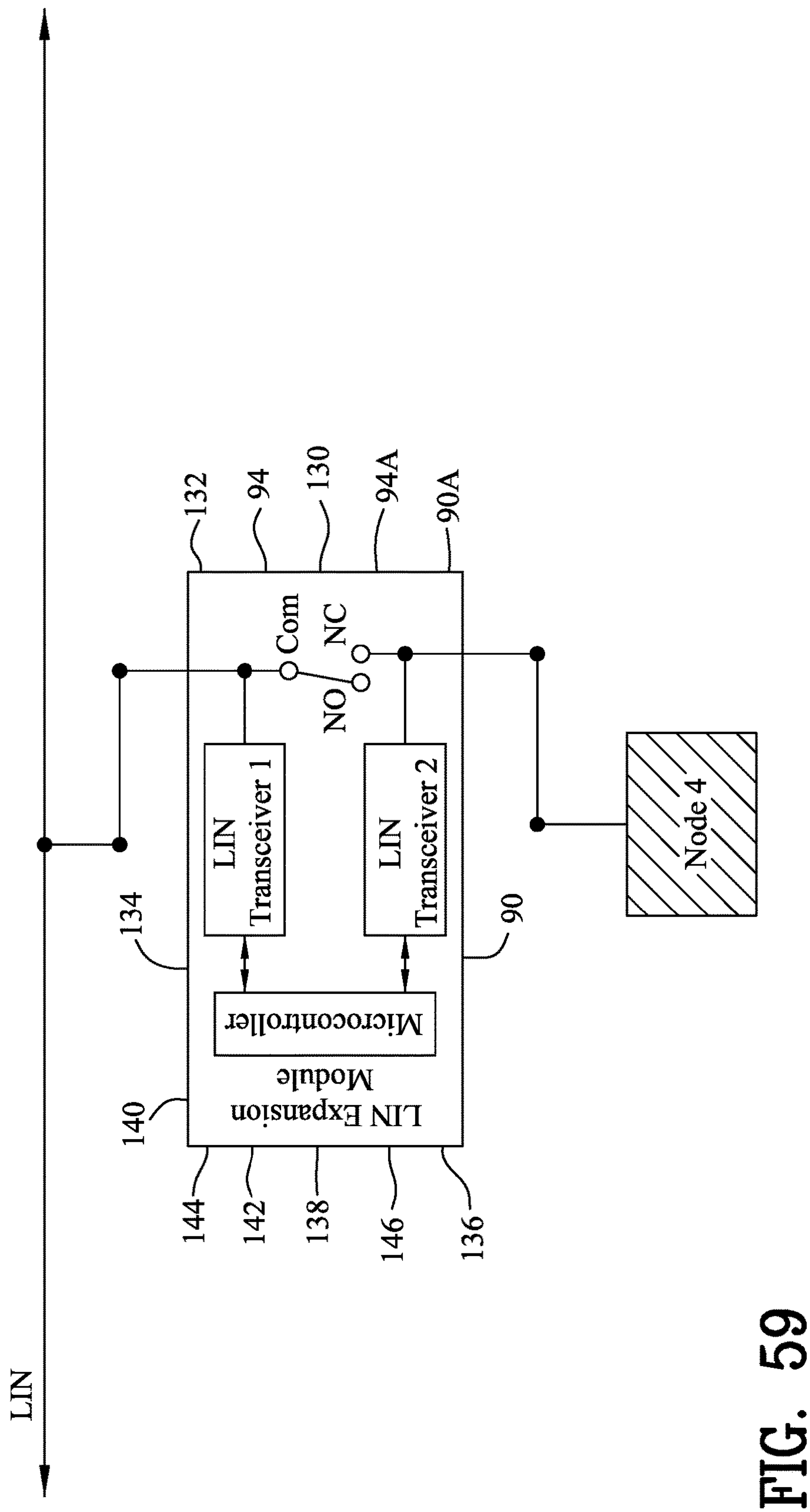
FIG. 59 is an electrical diagram similar to FIG. 57 illustrating a fourth step for installing the self programmable microcontroller using the Local Interconnect Network (LIN) expansion module.
Figure 60:
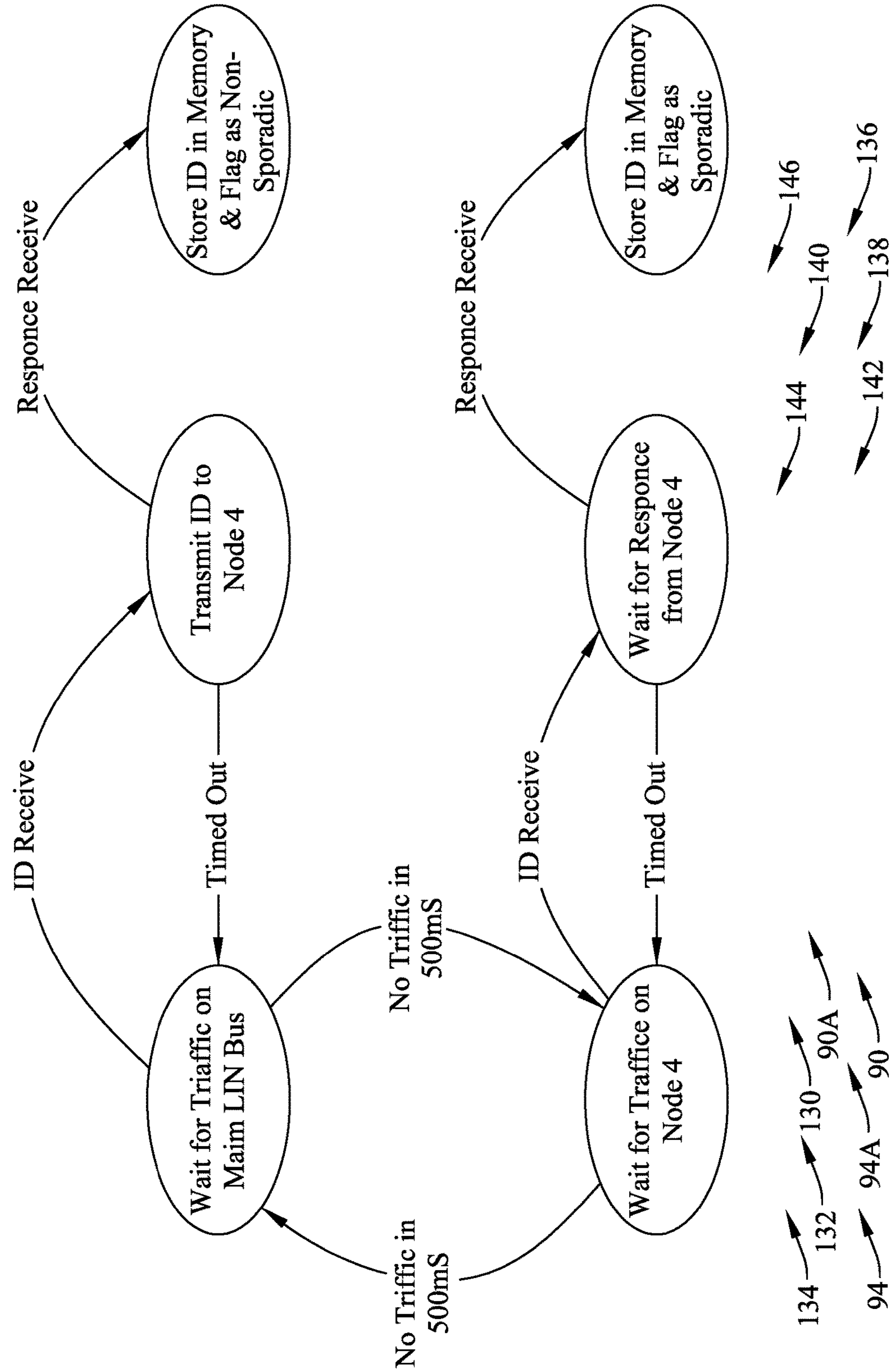
FIG. 60 is a flow diagram of FIG. 59 illustrating calculating a IDs.
Figure 61:
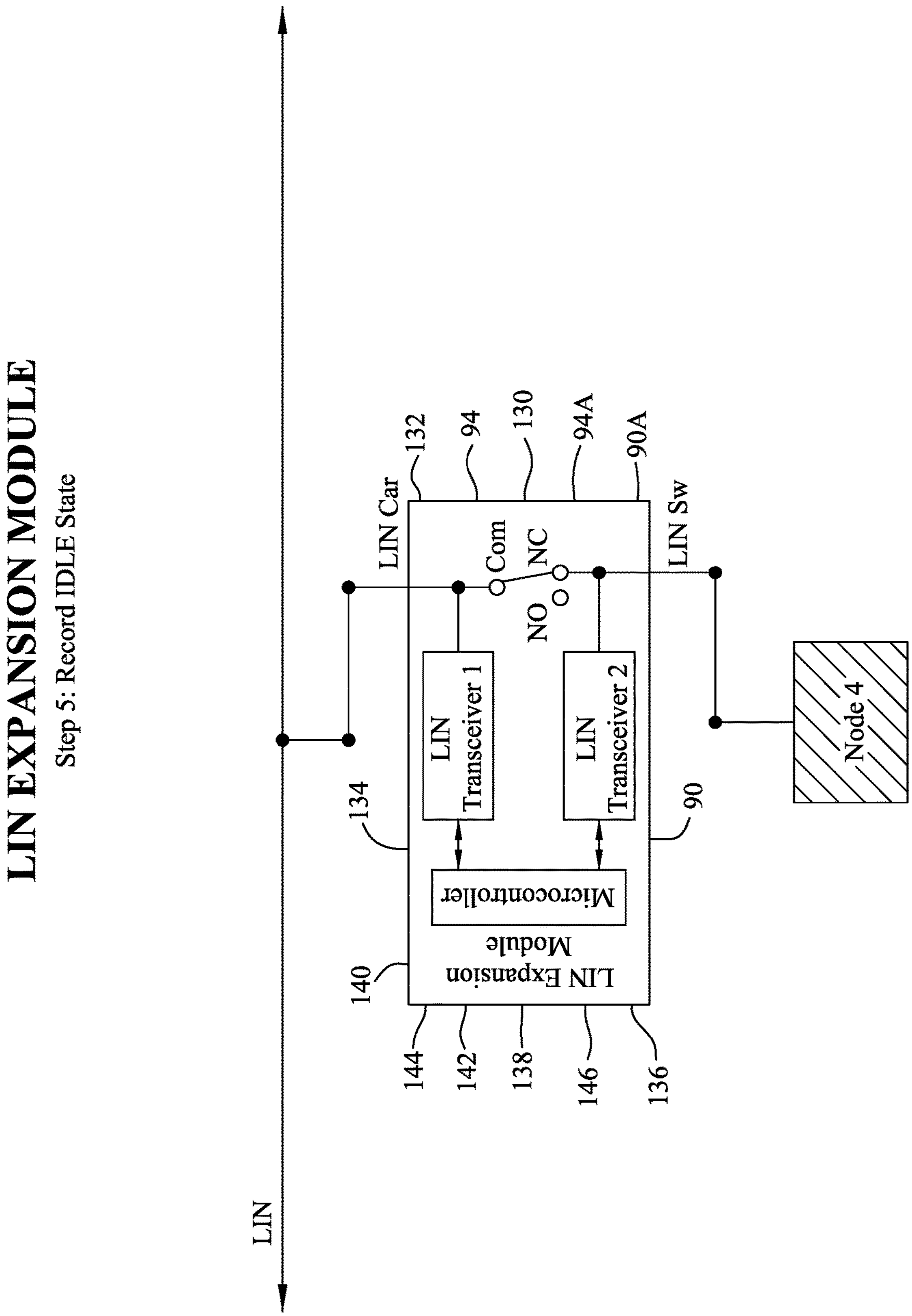
FIG. 61 is an electrical diagram similar to FIG. 59 illustrating a fifth step for installing the self programmable microcontroller using the Local Interconnect Network (LIN) expansion module.
Figure 62:
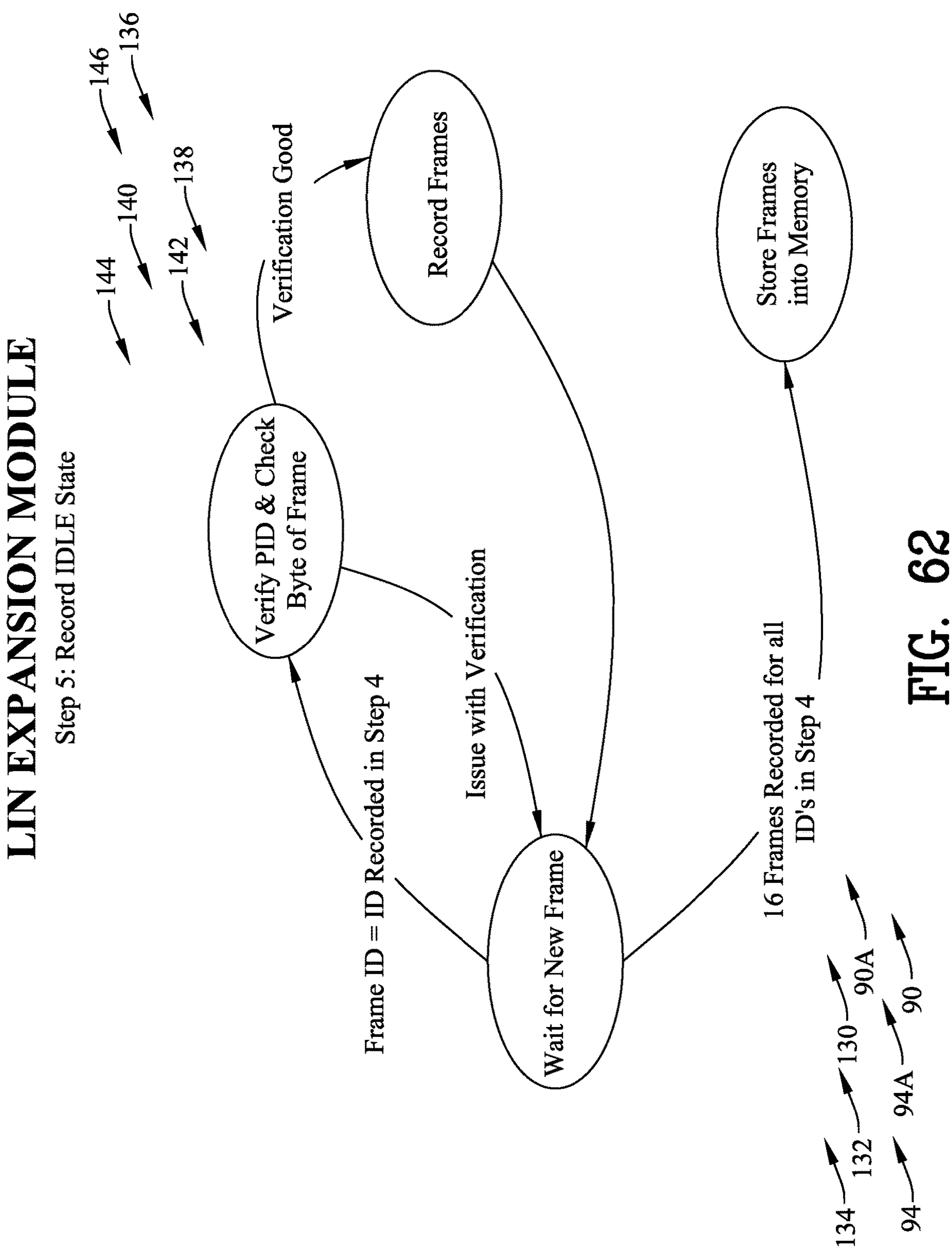
FIG. 62 is a flow diagram of FIG. 61 illustrating calculating IDLE State.
Figure 63:
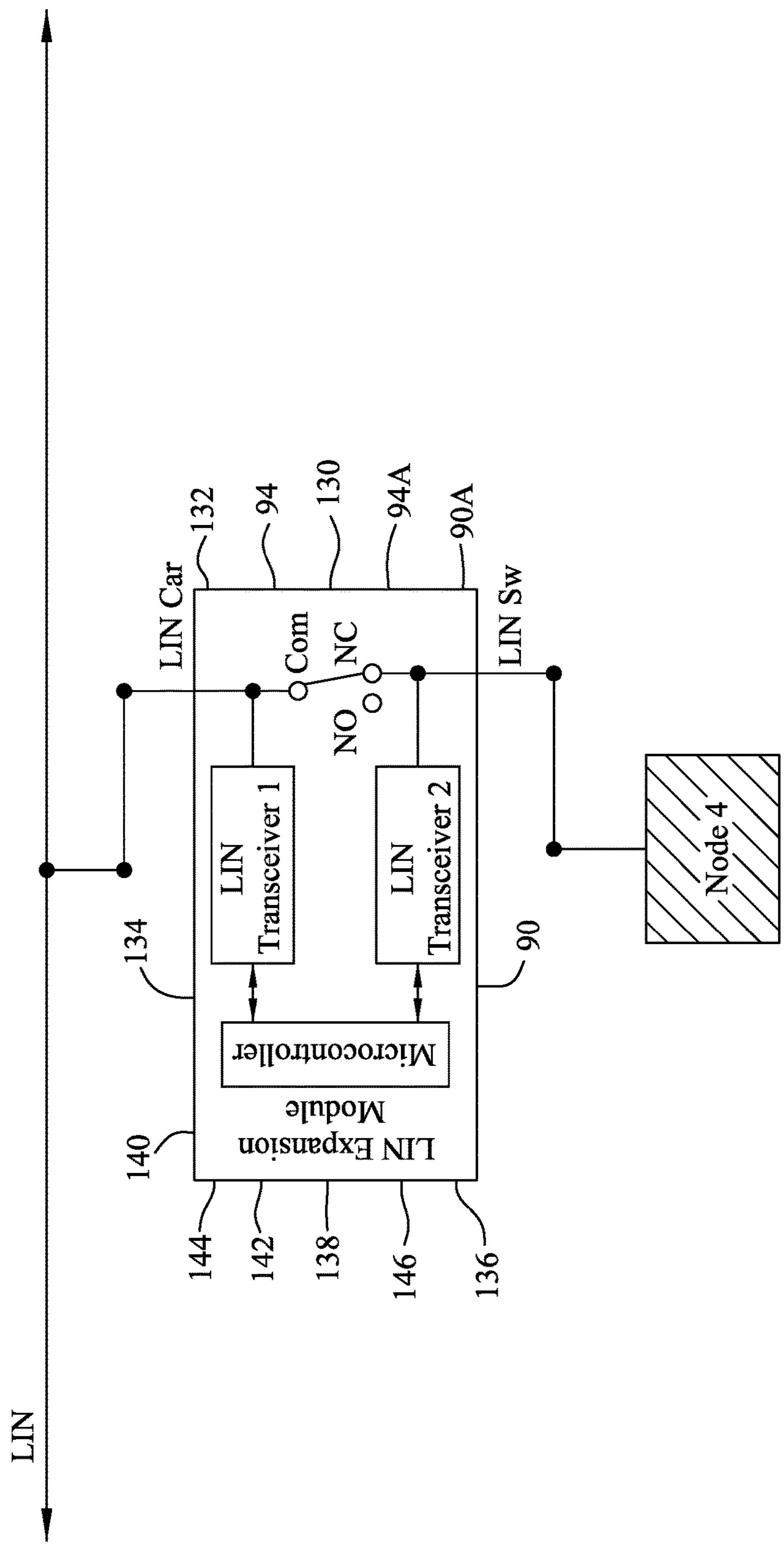
FIG. 63 is an electrical diagram similar to FIG. 61 illustrating a sixth step for installing the self programmable microcontroller using the Local Interconnect Network (LIN) expansion module.
Figure 64:
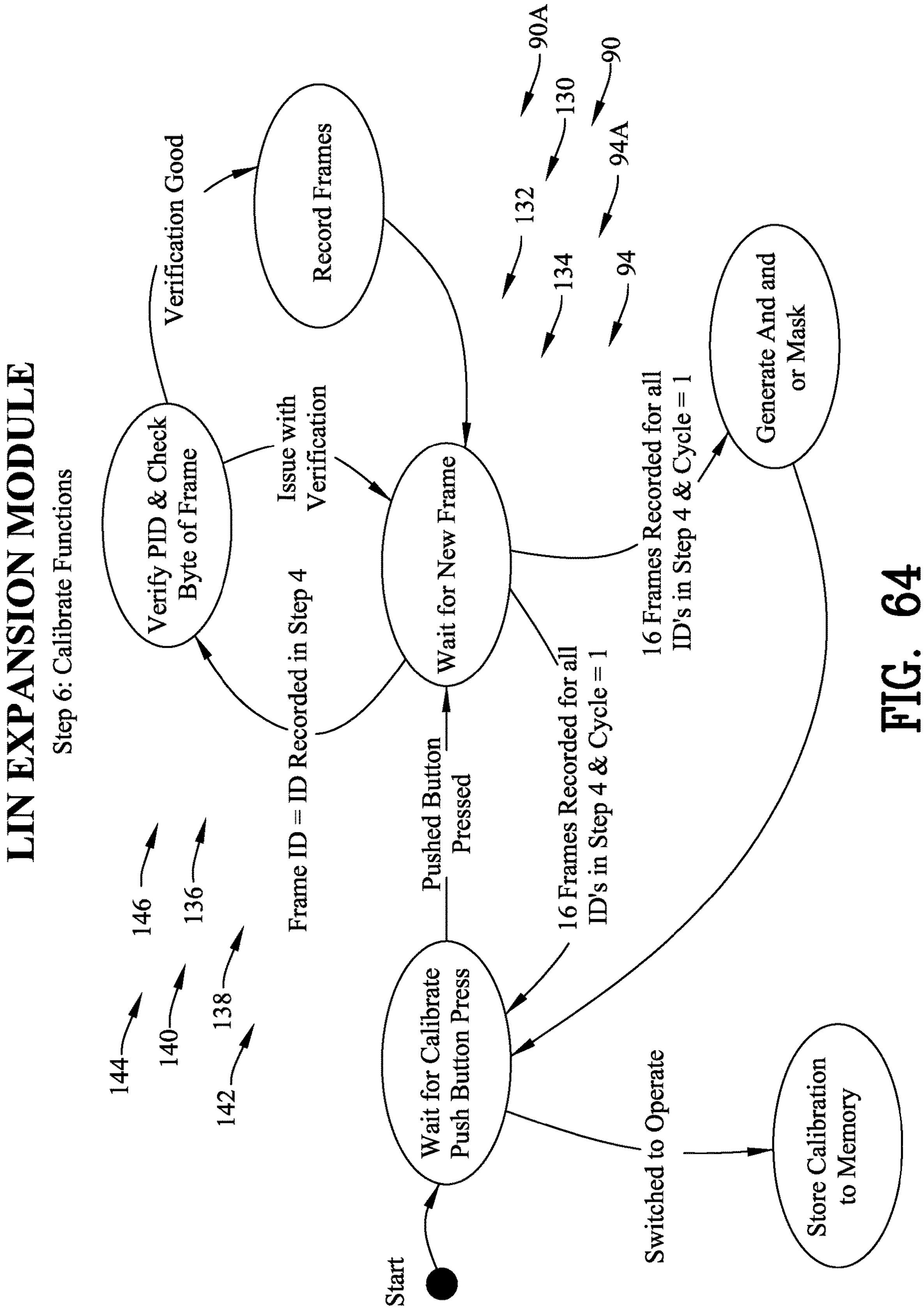
FIG. 64 is a flow diagram of FIG. 63 illustrating calibrating functions.
Figure 65:
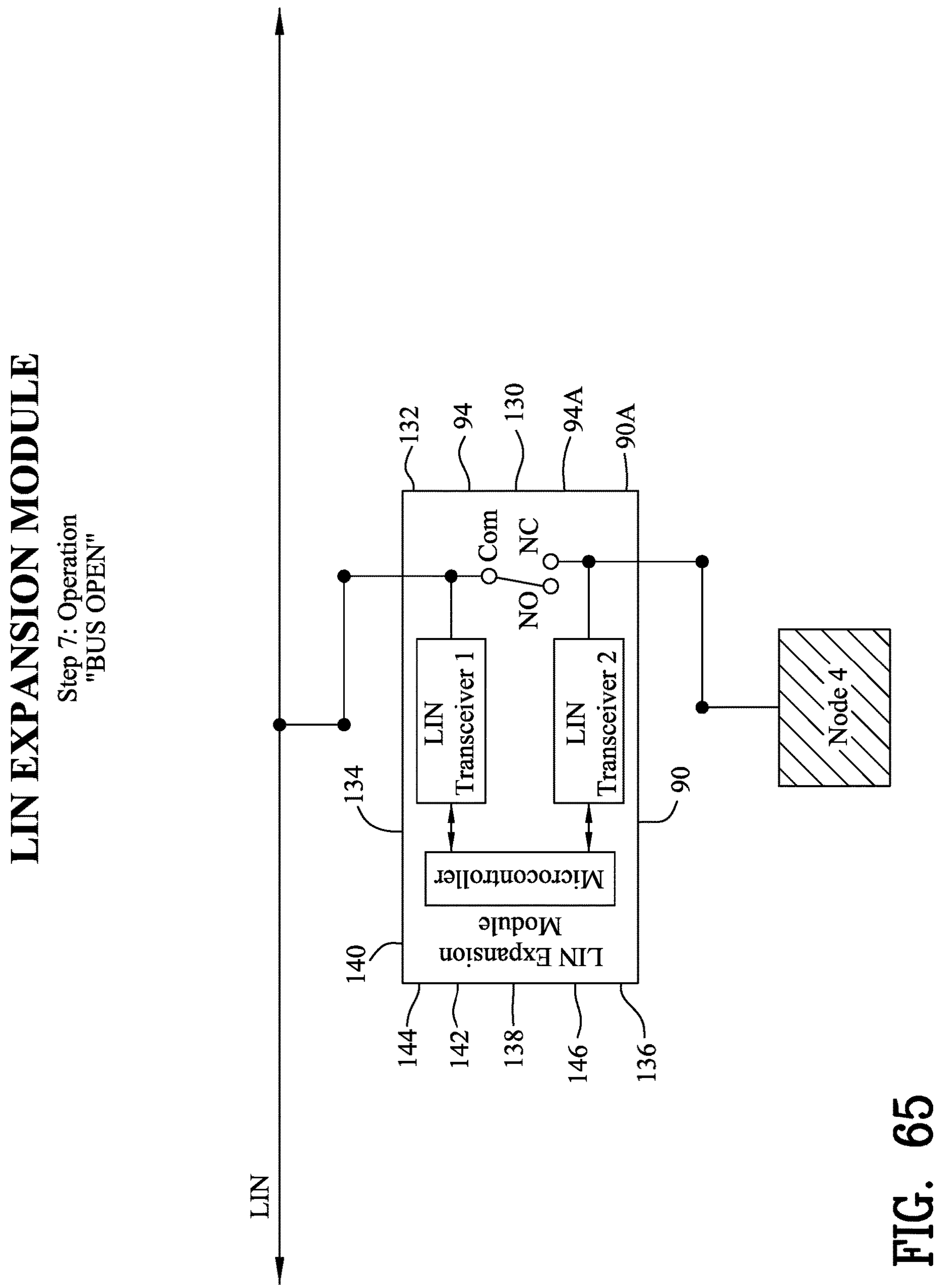
FIG. 65 is an electrical diagram similar to FIG. 63 illustrating a seventh step for installing the self programmable microcontroller using the Local Interconnect Network (LIN) expansion module.
Figure 66:
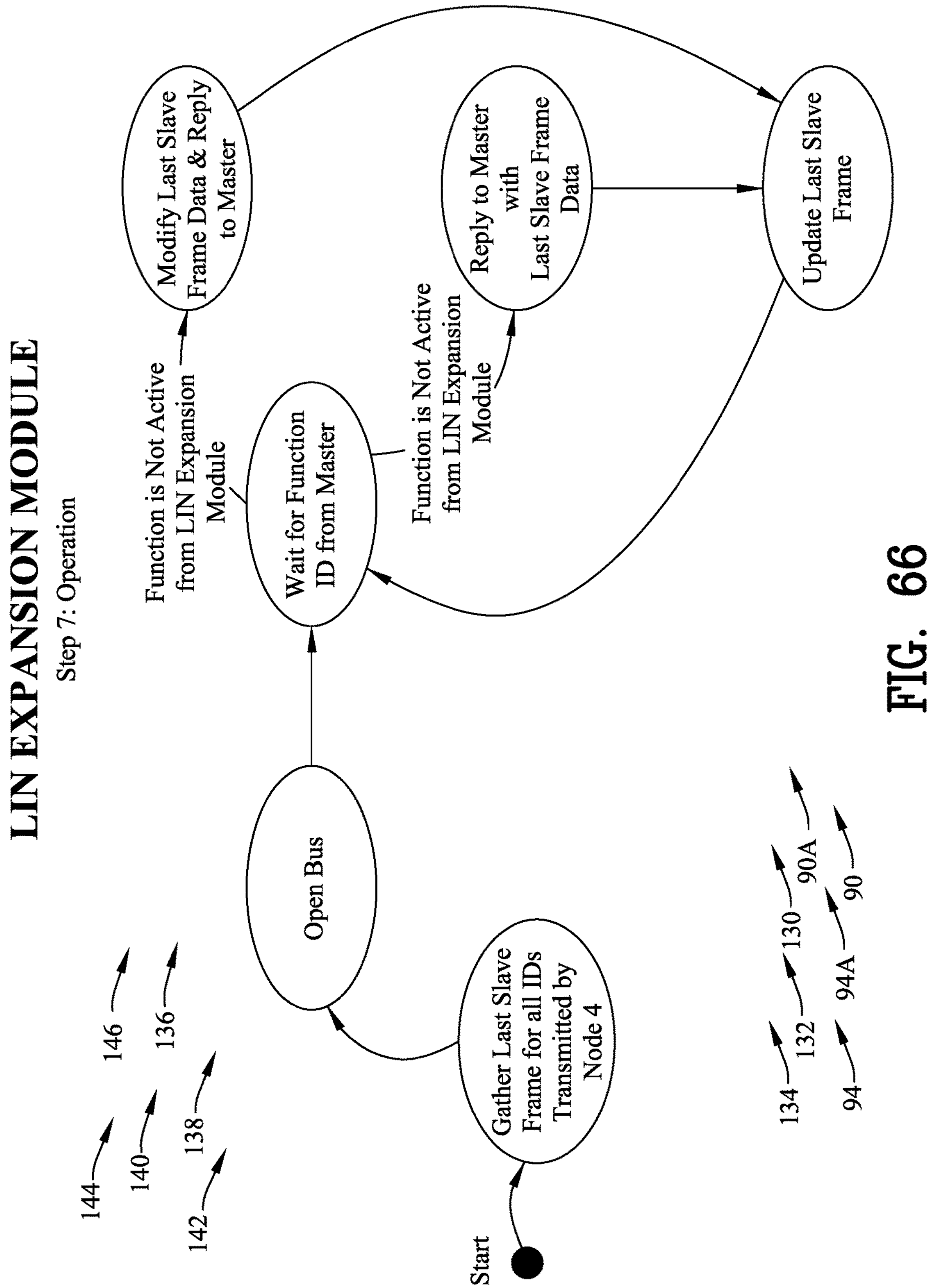
FIG. 66 is a flow diagram of FIG. 65 illustrating conducting a bus open operation.
Figure 67:
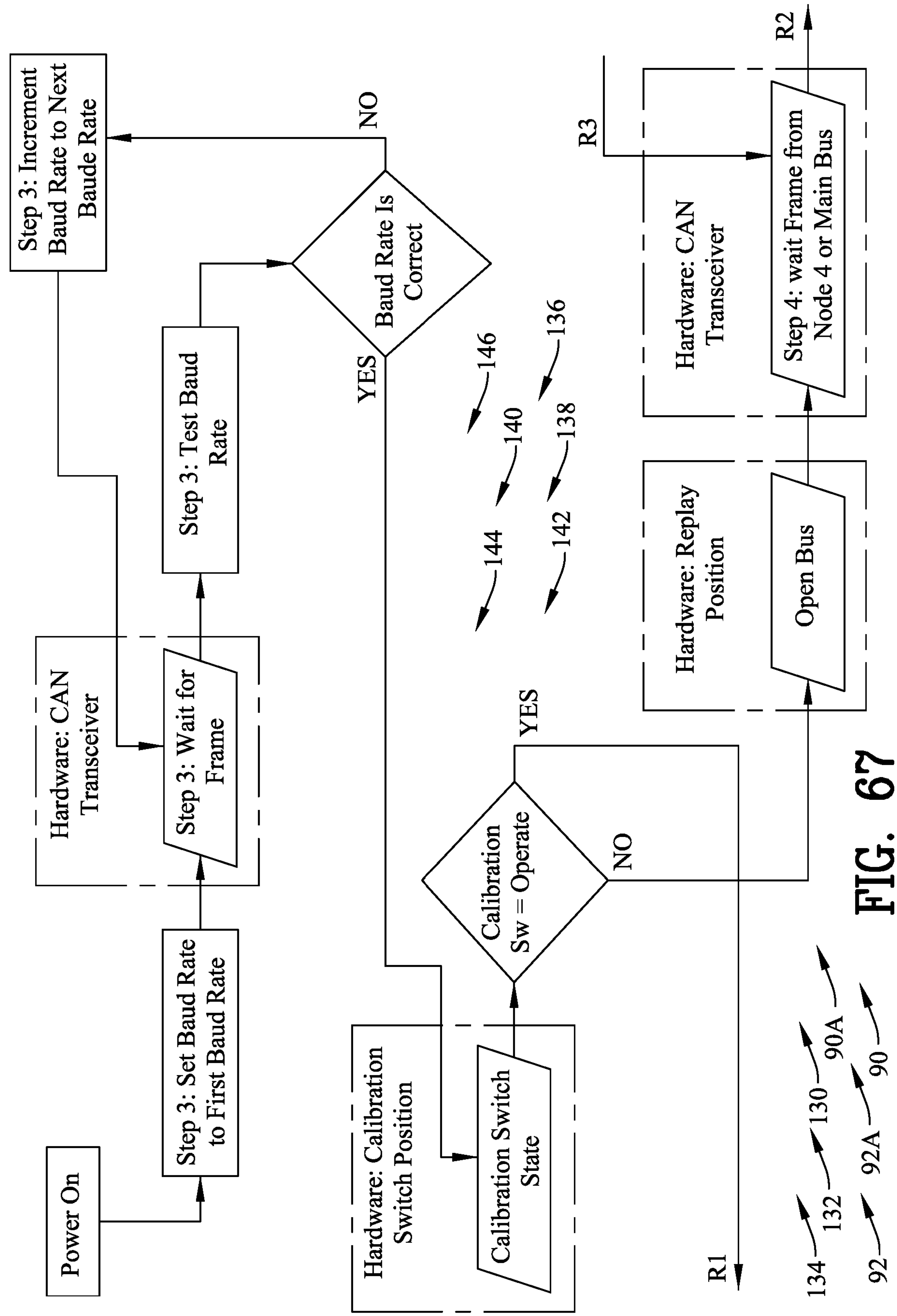
FIG. 67 is a first flow diagram of the self programmable microcontroller using a Controller Area Network (CAN) expansion module within the vehicle.
Figure 68:
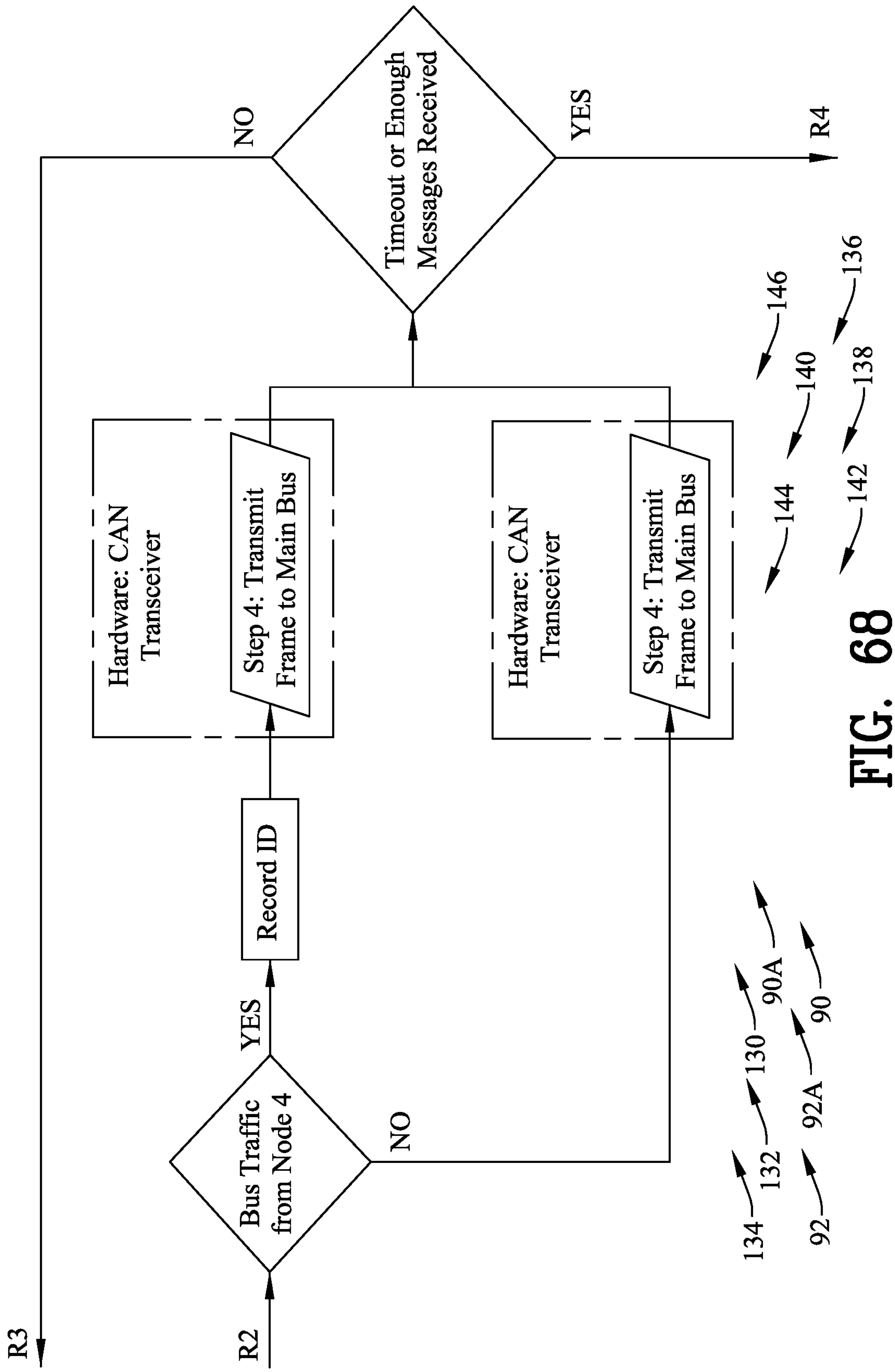
FIG. 68 is a second flow diagram of the self programmable microcontroller using a Controller Area Network (CAN) expansion module within the vehicle.
Figure 69:
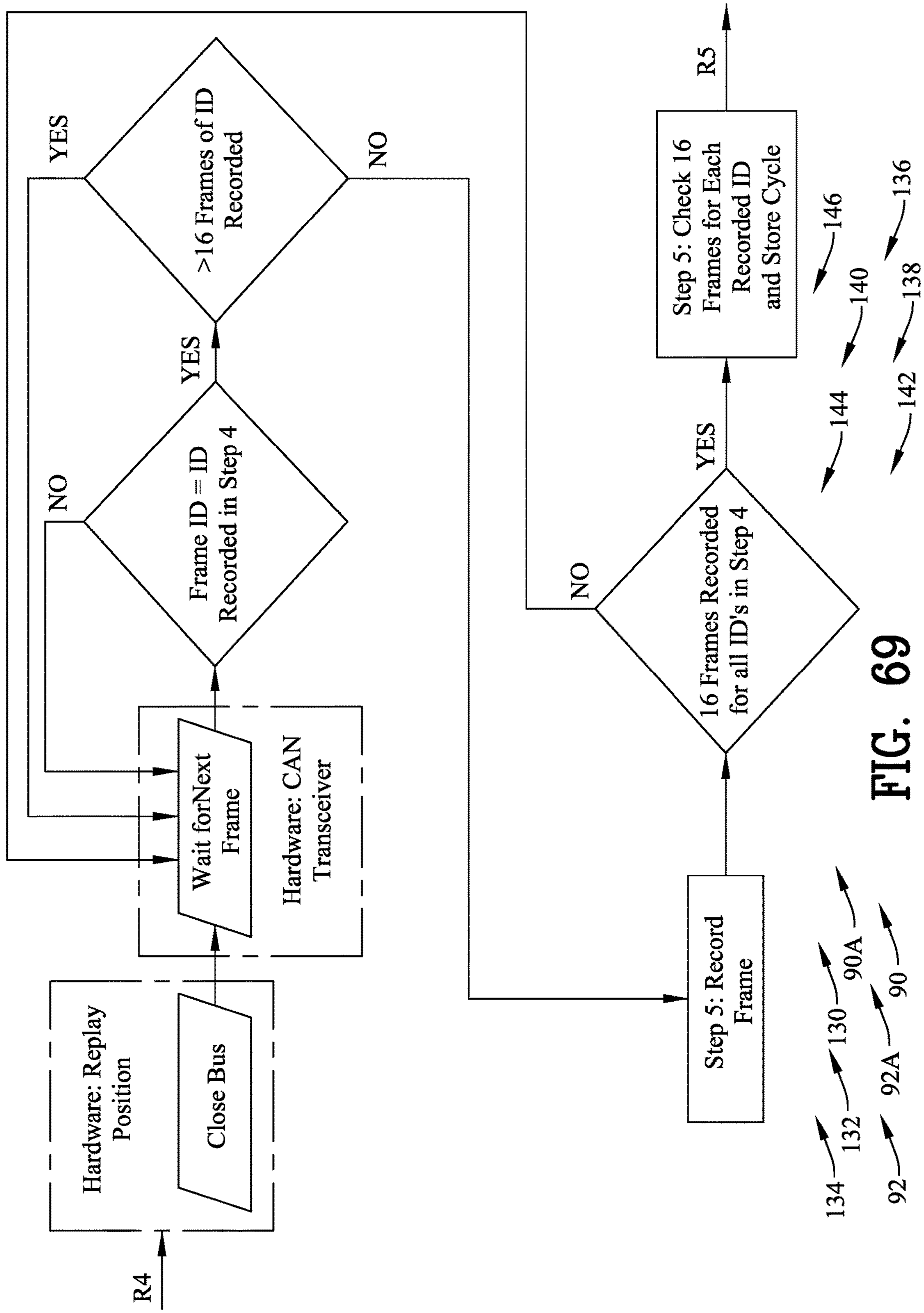
FIG. 69 is a third flow diagram of the self programmable microcontroller using a Controller Area Network (CAN) expansion module within the vehicle.
Figure 70:
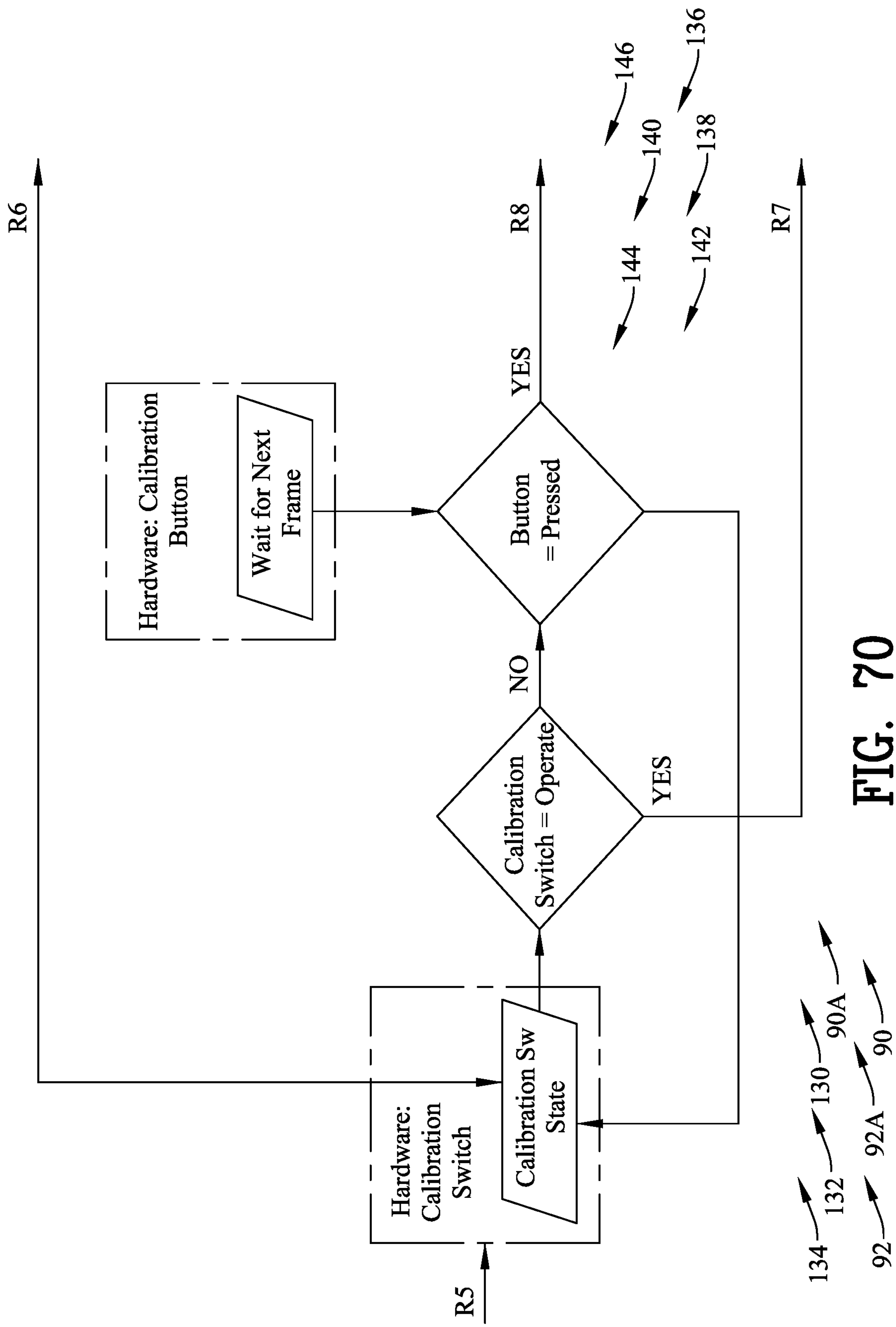
FIG. 70 is a fourth flow diagram of the self programmable microcontroller using a Controller Area Network (CAN) expansion module within the vehicle.
Figure 71:
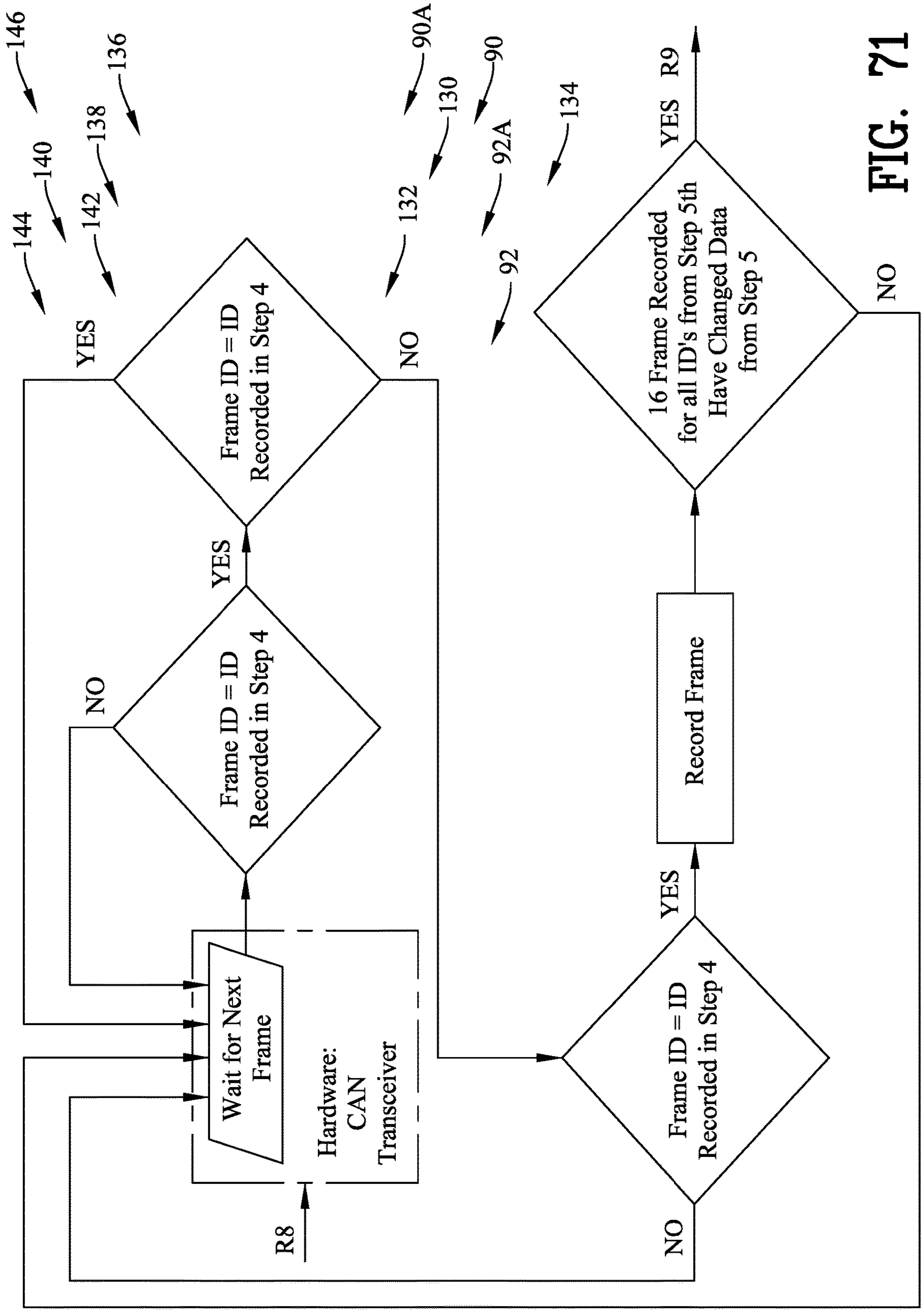
FIG. 71 is a fifth flow diagram of the self programmable microcontroller using a Controller Area Network (CAN) expansion module within the vehicle.
Figure 72:
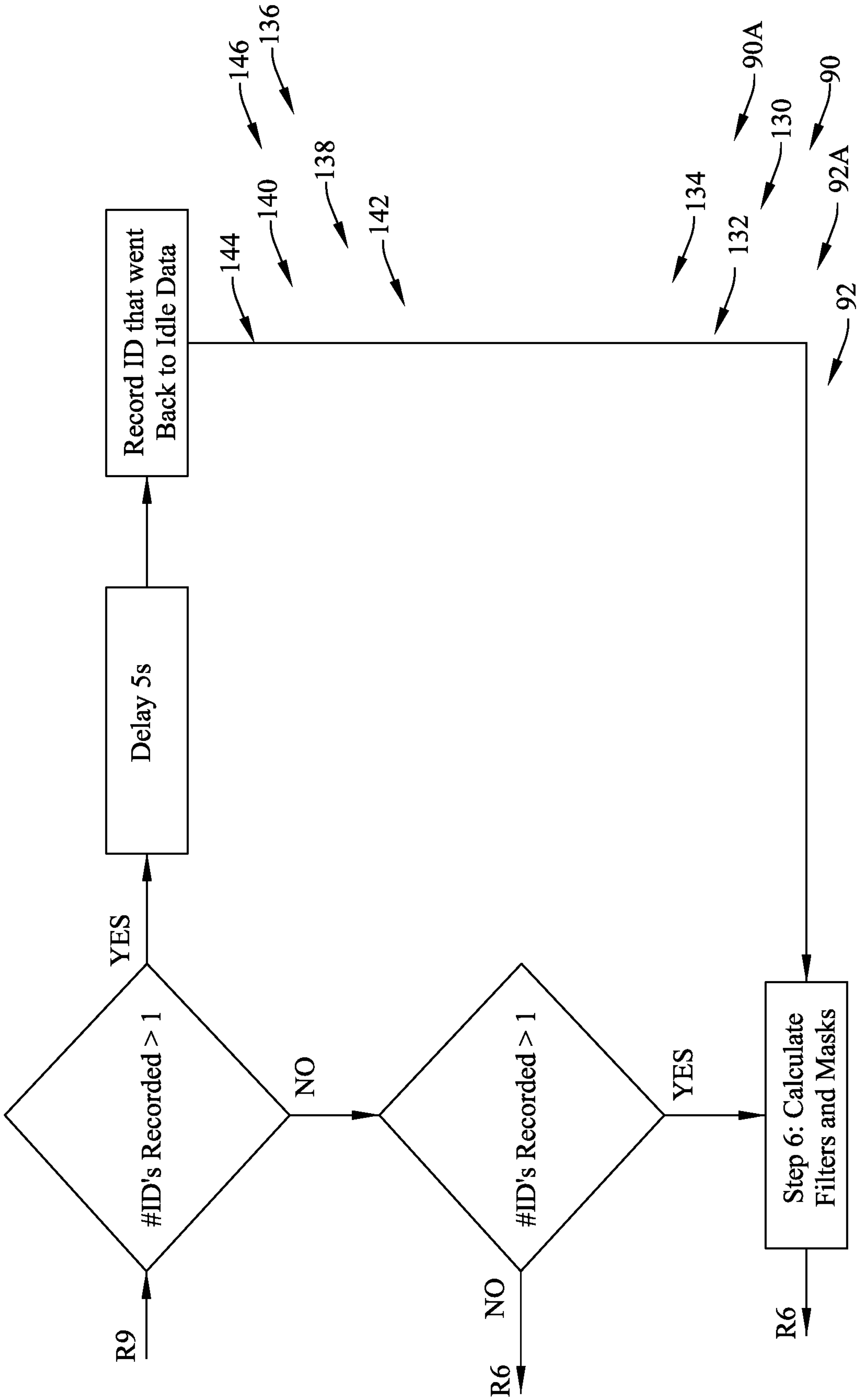
FIG. 72 is a sixth flow diagram of the self programmable microcontroller using a Controller Area Network (CAN) expansion module within the vehicle.
Figure 73:
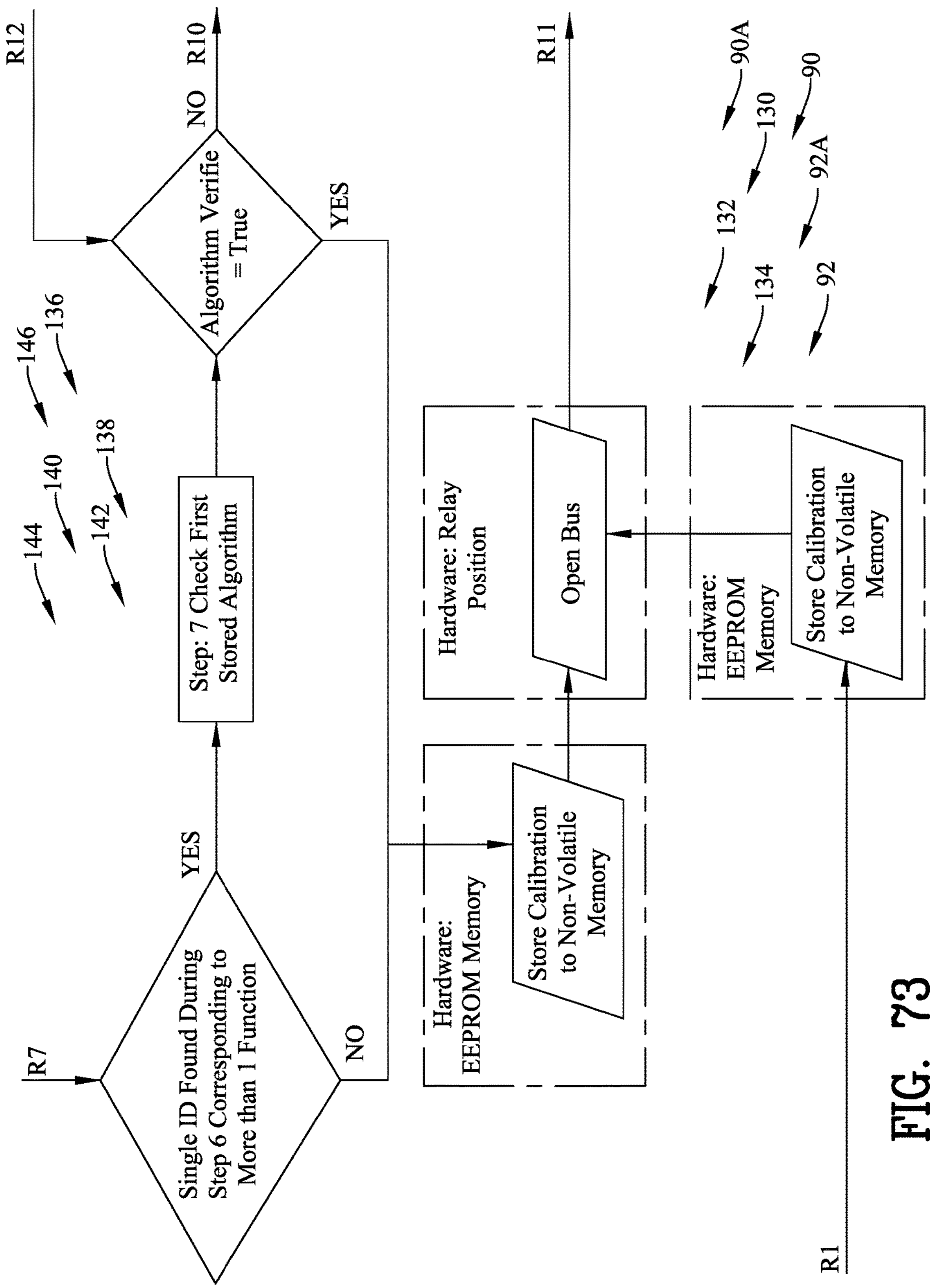
FIG. 73 is a seventh flow diagram of the self programmable microcontroller using a Controller Area Network (CAN) expansion module within the vehicle.
Figure 74:
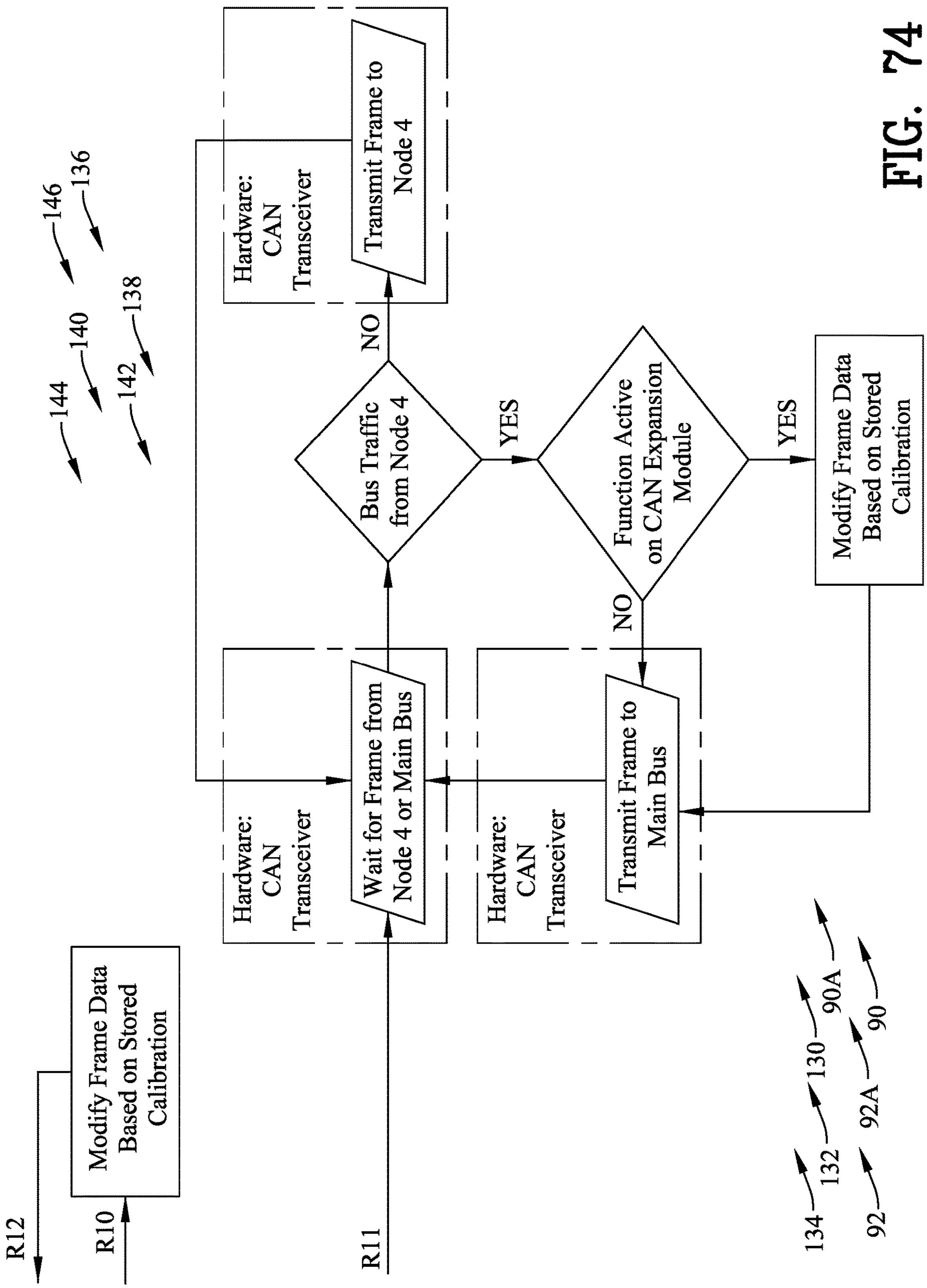
FIG. 74 is an eighth flow diagram of the self programmable microcontroller using a Controller Area Network (CAN) expansion module within the vehicle.
Figure 75:
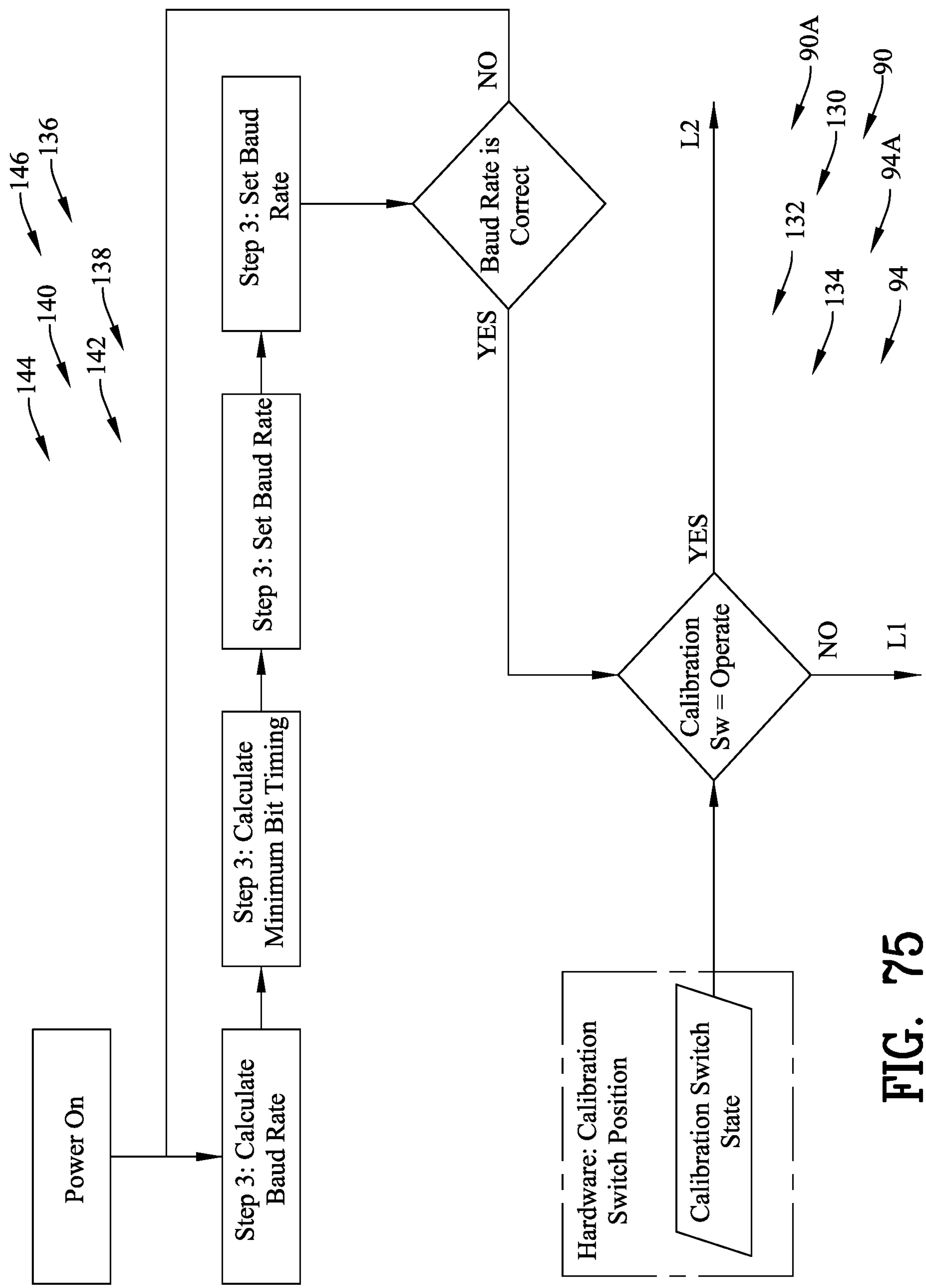
FIG. 75 is a first flow diagram of the self programmable microcontroller using a Local Interconnect Network (LIN) expansion module within the vehicle.
Figure 76:
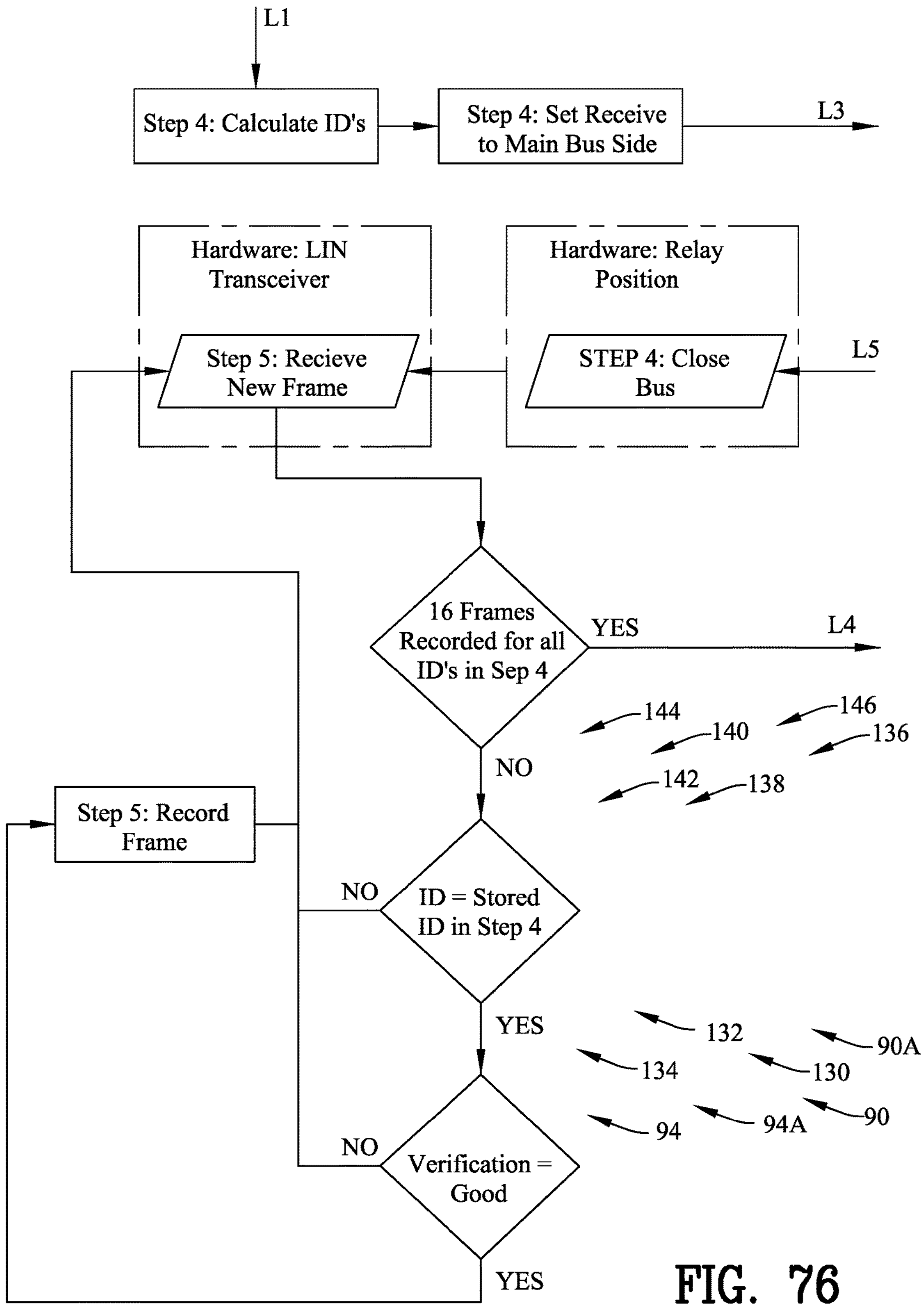
FIG. 76 is a second flow diagram of the self programmable microcontroller using a Local Interconnect Network (LIN) expansion module within the vehicle.
Figure 77:
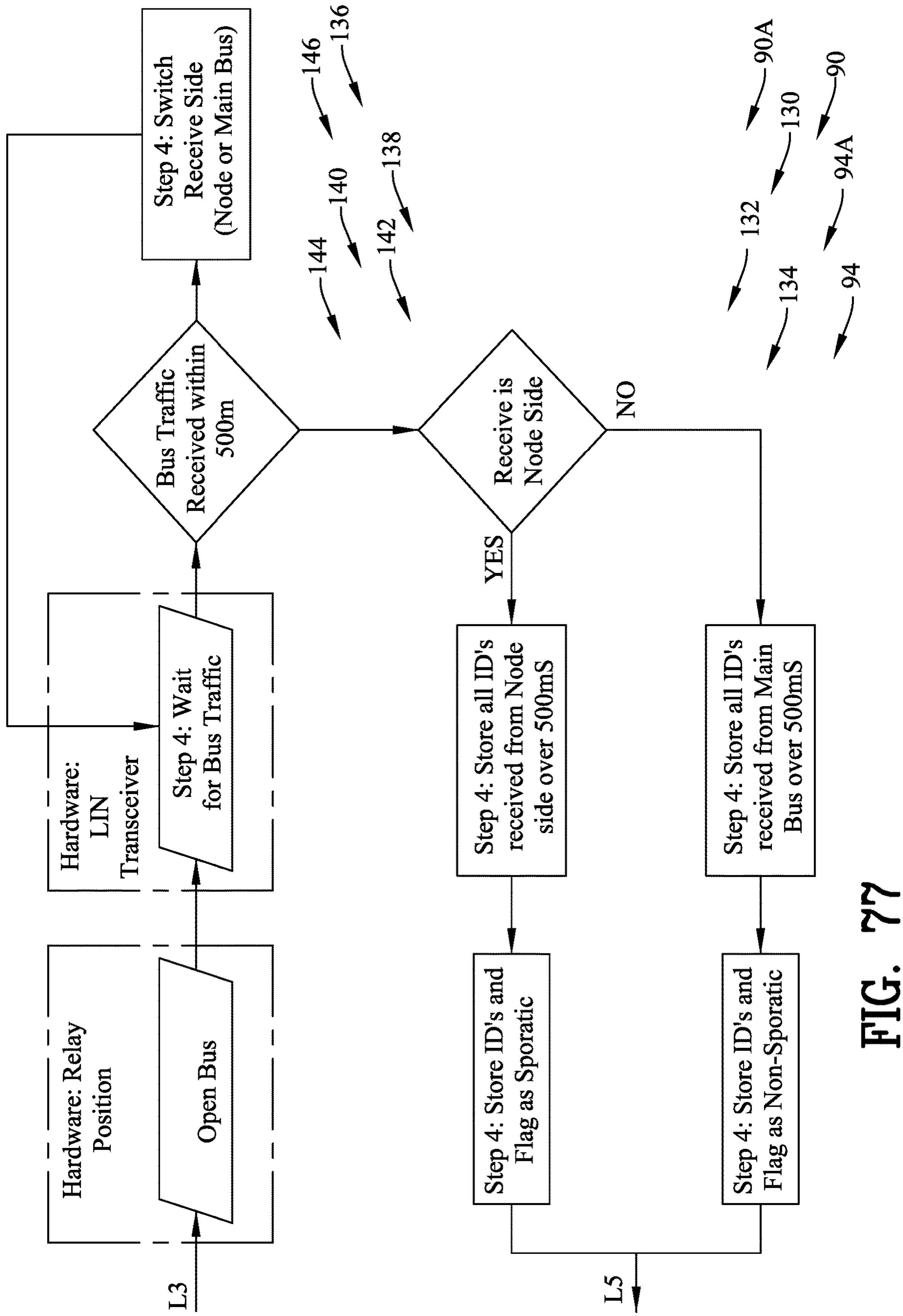
FIG. 77 is a third flow diagram of the self programmable microcontroller using a Local Interconnect Network (LIN) expansion module within the vehicle.
Figure 78:
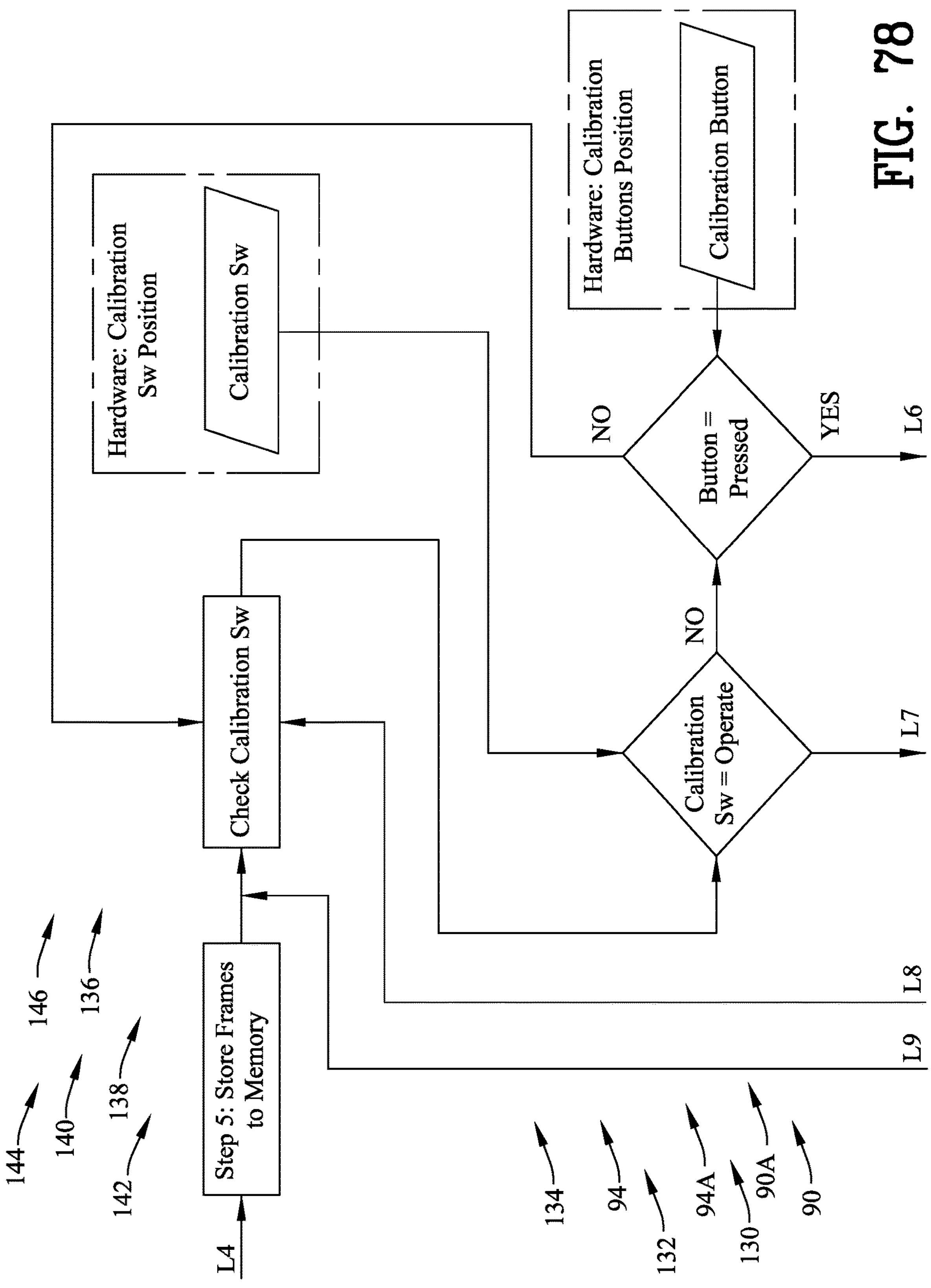
FIG. 78 is a fourth flow diagram of the self programmable microcontroller using a Local Interconnect Network (LIN) expansion module within the vehicle.
Figure 79:
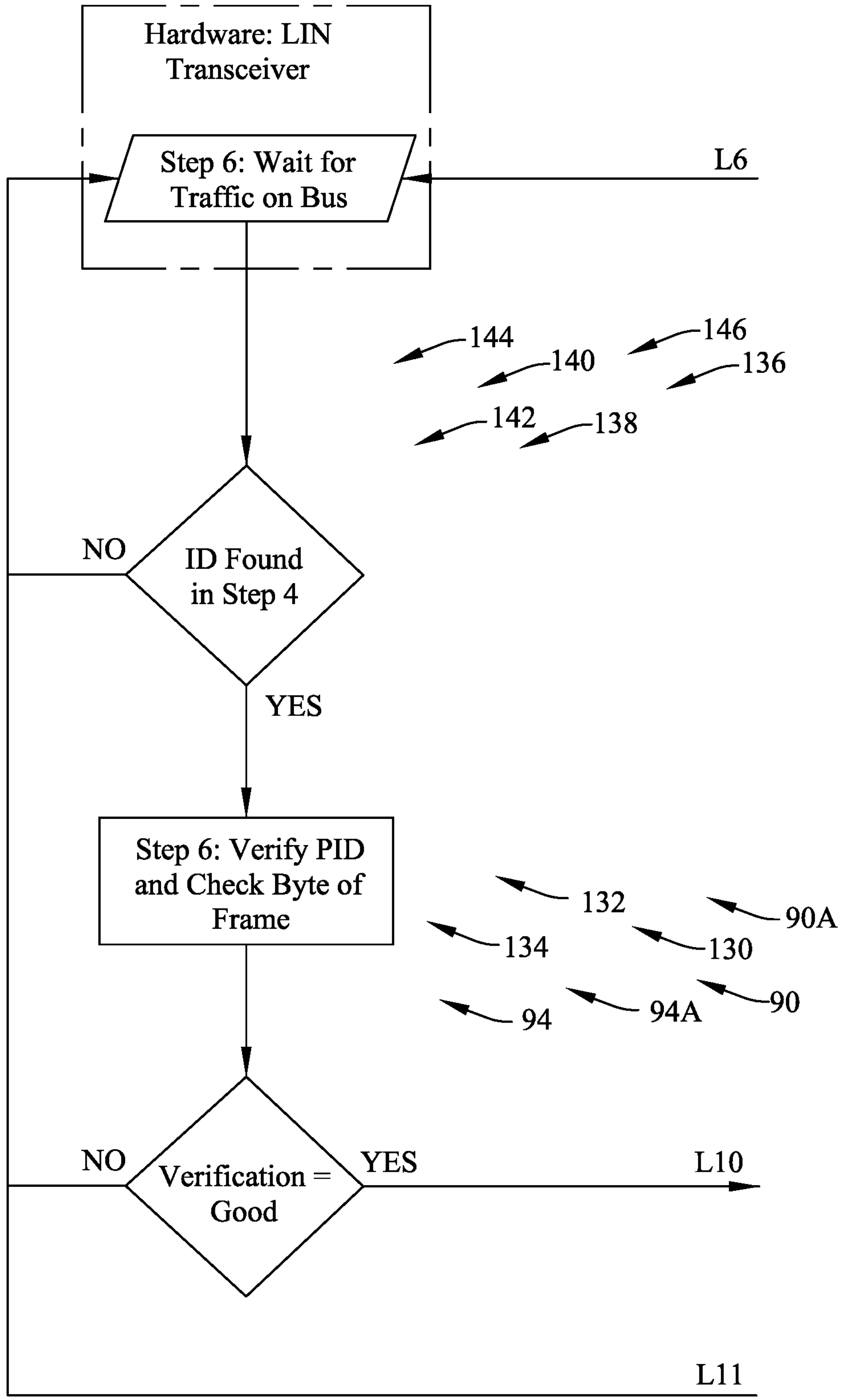
FIG. 79 is a fifth flow diagram of the self programmable microcontroller using a Local Interconnect Network (LIN) expansion module within the vehicle.
Figure 80:
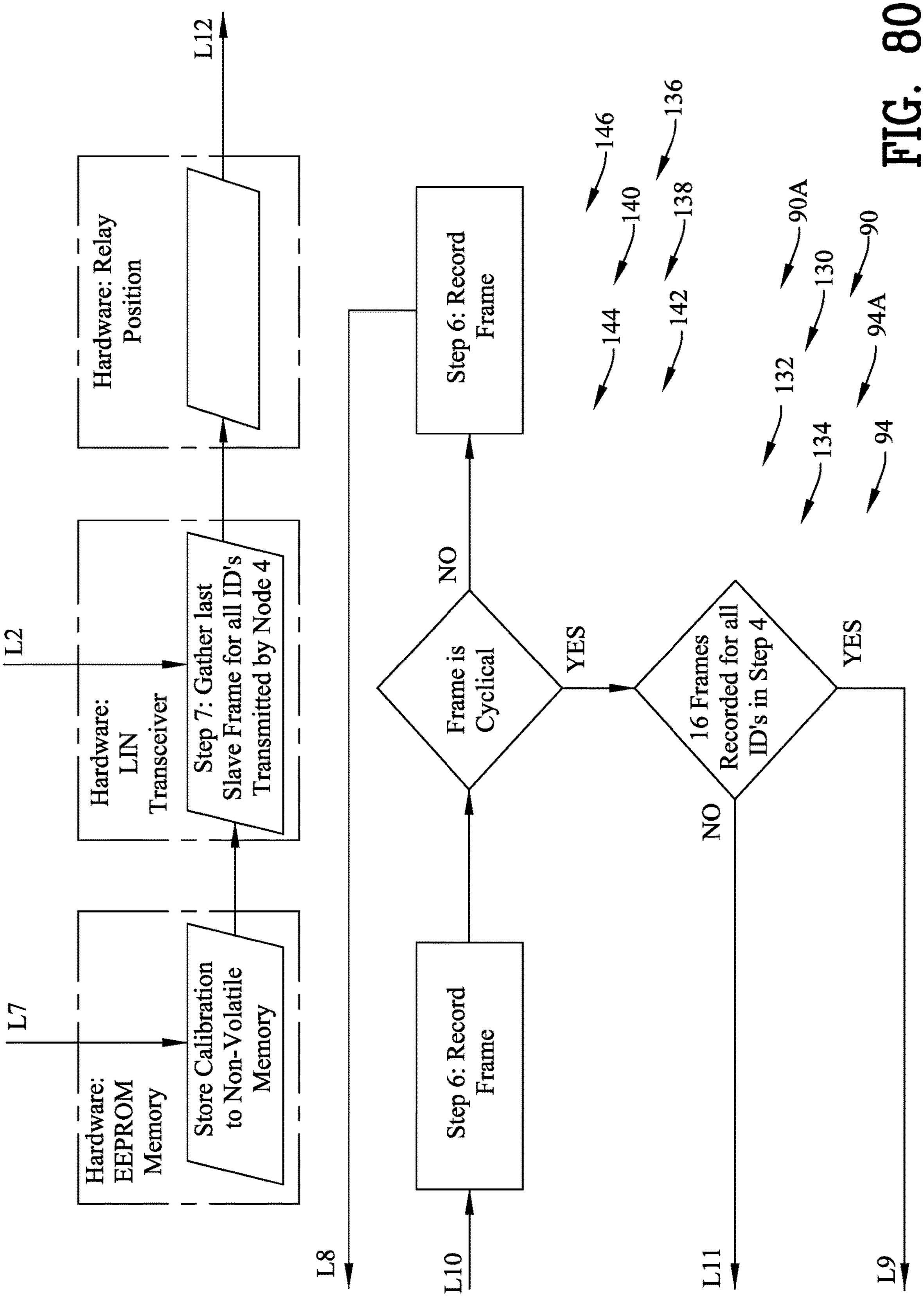
FIG. 80 is a sixth flow diagram of the self programmable microcontroller using a Local Interconnect Network (LIN) expansion module within the vehicle.

Expansion modules plug directly into the SMM through the 4-pin harness labeled Expansion port shown in FIG. 5. Expansion modules will have a supplemental page for installation and install similarly to the SMM.

Relay Expansion Module

The Relay Expansion Module (REM) allows for 4 additional high current relays. The REM is controlled by the SMM. A dip switch is located on the REM to select between 4 different addresses, which allows for multiple expansion units to be controlled by one SMM. It is important that the REM is addressed properly. If the SMM tries to activate an expansion module that is not connected, the SMM will beep to notify the user of the fault. The REM connects through the expansion port on the SMM. The expansion port provides power, ground and the Switch communication bus (SCB).

Relay Expansion Module Installation Procedure (if included)

Step 1: Connect the Switch expansion harness to the REM and SMM or another expansion module. At least one expansion unit must be connected to the SMM as the SMM will power all expansion modules.

Step 2: Using the wire diagrams, connector views and the provided REM wire map, locate the appropriate wires for each function and attach them to the corresponding REM wires. Care should be taken to ensure the correct relay and wire color is used from the REM. Any connection made to the vehicle should be soldered and covered with heat shrink or another acceptable seal. It is recommended to test switch operation in between installing each function. This ensures that installation errors do not propagate through the entire installation.

Step 3: Start the vehicle and confirm OEM and secondary switch operations. Be sure to thoroughly test all the functions that were installed. Function location can be found on the included Layout Sheet.

Step 4: Tie up all the wires using zip ties or another similar permanent means. Wires should never be secured to moving parts or in areas where they will be rubbed or damaged. If fastening wires to metal within the vehicle, loom should be used to increase the longevity of the switch.

CAN/LIN Expansion Module

The CAN or LIN expansion modules connect in series to an OEM CAN bus or LN bus. A supplemental page is included with the order to display how the unit is wired into the vehicle. If a connector is available, the unit will come with a connector for a plug-and-play installation.

Since the units are universal, they must be calibrated before use. To calibrate a LIN or CAN expansion Module:

LIN Expansion Module Installation Procedure (if included)

Step 1: Remove the lid off the module and locate the calibration switch. Ensure that the calibration switch is in the calibration position.

Step 2: Locate the 8 push buttons on the module, taking note of the numbering.

Step 3: Connect the Switch Expansion Harness to the SMM or another expansion module. At least one expansion unit must be connected to the SMM as the SMM will power all expansion modules.

Step 4: Ensure that all secondary functions are in the off position. Turn the ignition on and wait for the system to calibrate to IDLE and the LED will turn blue.

Step 5: Activate the required function using the OEM activation and press the designated push buttons located on the modules' calibration page while the function is active. The LED on the module will turn purple as it is calibrating once it returns to blue, the push button has been calibrated.

Step 6: Return the OEM function to the neutral position.

Step 7: Repeat steps 5-6 until all functions are calibrated.

Step 8: Switch the calibration switch to operate. The LED will turn green.

Step 9: Test the secondary functionality and ensure all calibrated secondary functions are operating through the SMM activation device. To ensure calibration the push buttons can be used to activate the functions as well, while the LED is green.

Step 10: Replace the lid on the LIN Expansion Module.

Step 11: Mount the device high under the dash, utilizing the two mounting flanges.

CAN Expansion Module Installation Procedure (if included)

Step 1: Remove the lid off the module and locate the calibration switch. Ensure that the calibration switch is in the calibration position.

Step 2: Locate the 8 push buttons on the module, taking note of the numbering.

Step 3: Connect the Switch Expansion Harness to the SMM or another expansion module. At least one expansion unit must be connected to the SMM as the SMM will power all expansion modules.

Step 4: Ensure that all secondary functions are in the off position. Turn the ignition on, the LED will turn white. It is critical that no functions are activated during this time. Try to avoid movement of the steering wheel. This is not critical but will save you time while calibrating. Wait for the system to calibrate to IDLE and the LED will turn blue.

Step 5: Activate the required function using the OEM activation and press the designated push buttons located on the modules' calibration page while the function is active. The LED on the module will turn purple as it is calibrating once it returns to blue, the push button has been calibrated.

Step 6: If the LED turns teal while calibrating you will have 3 seconds to deactivate the function. Once the LED turns blue, the push button has been calibrated.

Step 7: If the LED turns red the calibration of that button has failed and requires recalibration.

Step 8: Return the OEM function to the neutral position if it has not been already.

Step 9: Repeat steps 5-8 until all functions are calibrated.

Step 10: Switch the calibration switch to operate. The LED will turn green. If it flashes red the module does not have a calibration stored. Restart the calibration procedure from step 1.

Step 11: Test the secondary functionality and ensure all calibrated secondary functions are operating through the SMM activation device. To ensure calibration the push buttons can be used to activate the functions as well while the LED is green.

Step 12: Replace the lid on the CAN Expansion Module.

Step 13: Mount the device high under the dash, utilizing the two mounting flanges.

The CEM or LEM can be recalibrated by putting the calibration switch to the calibrate position and power cycling the device. The switch should stay in the operate position upon a successful calibration.

Installed Potentiometers/Diodes

Some functions in certain vehicles are multiplexed with resistors or diodes, which is using the same wire to represent different functions. For the Switch to mimic the action, potentiometers or diodes will be installed in the positions shown below:

Any potentiometers or diodes required are factory installed and set to the proper values. The potentiometer resistance values can be changed by adjusting the screw on the top of the potentiometer. The proper value for the potentiometer is specified on the Switch Wire Map. You should only need to change the potentiometer value if you are experiencing issues. Once the potentiometer value is confirmed it is recommended that Loctite® or other glue is used to prevent future unwanted movement of the potentiometer.

Operation

The Switch system allows all buttons to be configured with up to four functions per button. The configurations are as follows:

Single Click

Hold

3 Operation Cycle

Each of these configurations can work as a latch or momentary trigger, operating with a delay, and/or intermittent timer.

Latch

The function is activated on the first press and deactivated on the second press.

Momentary

The function is activated while the switch is depressed and deactivates when the switch is released.

Delay

A timer is created when the function is activated, if the timer runs out the function automatically deactivates. This delay can be linked to the brake signal so that it cannot expire while the brake is depressed and restarts when the brake is released; this is used for turning signals.

Intermittent

The function is strobed on and off with both on and off timers programmable. Intermittent can work with a delay. The function will remain active for IntOn seconds and turn off for IntOff seconds before it becomes active again. This is used for intermittent wipers.

3 Operation Cycle

Function 1 is activated on the first click. The seconds click deactivates function 1 and actives function 2 repeating for up to three functions.

If the Switch system is ordered for a specific vehicle, the default configuration is shown in the included Layout sheet. If the Switch system is ordered for inventory, it will require programming before operating. See programming.

Input Devices

The Switch installation is the same regardless of what operational device is used. How each device interacts with the SMM varies.

WIRED: All wired devices plug in directly to the Switch Master Module, such as the Sure Switch 4-Way. There are two ports for wired switches. Port 1 controls triggers 1-7. Port 2 controls triggers 8-14.

WIRELESS: All wireless devices operate through Radio Frequency (RF) to the Switch. The devices only use power when a button is pressed on the device. Each wireless device requires an A23 battery to operate. All units are shipped with a battery uninstalled. Battery replacement procedures can be found in the specific device section. The battery will need to be replaced roughly every 2 years, depending on usage. All wireless devices have an LED on the device. When a button is pressed on the device, if the LED blinks red, the battery should be replaced.

The following features can be adjusted from the wireless device, without requiring access to the relay module. These features require specific button configurations to engage the desire mode. Please contact Sure Grip Hand Controls for the desired configuration as some devices do not have enough buttons so the configuration will need to be done from the circuit board.

Button Swap

The function locations on some devices, such as the RF360, RF Mini or UH360, can be swapped through the wireless device itself. If the button swap combination is held for 5 seconds the device will initiate button swap mode. The status LED will turn solid white. Press the first button to swap. The LED will blink teal. Press the second button to swap and the LED will blink yellow.

Button Delete

Some wireless devices, such as the RF360, RF Mini or UH360, can delete button functions from the wireless device. When the delete button configuration is held for 5 seconds the device will initiate button delete mode. The status LED will turn teal. The next button pressed will delete that button from the wireless device.

Button Default

The button location and deleted buttons can be restored to factory default with the default configuration. Press and hold button configuration for 5 seconds until the LED turns solid yellow. The buttons will be set to their default locations and any deleted buttons will be restored.

Address Change

The address can be changed to 1 byte addressing. This is typically used by evaluators or consumers that need multiple devices paired with a single unit. When the address change configuration is held for 5 seconds the LED will turn solid purple. The next button pressed will change the address to the corresponding button. Trigger 1 is the standard that evaluator equipment is shipped under.

Random Address

Wireless devices can be randomized between address 0x0000 to 0xFFFF. This is done to ensure that there is never any interference between different Switch systems. To randomize the address press and hold the random address button configuration for 5 seconds. The LED will turn solid green. While still holding a button, press and hold the selection button, then release all buttons. The address will be randomized. The Switch will need to be paired with the new address. See programming macros for pairing information.

Programming

Figure 3:
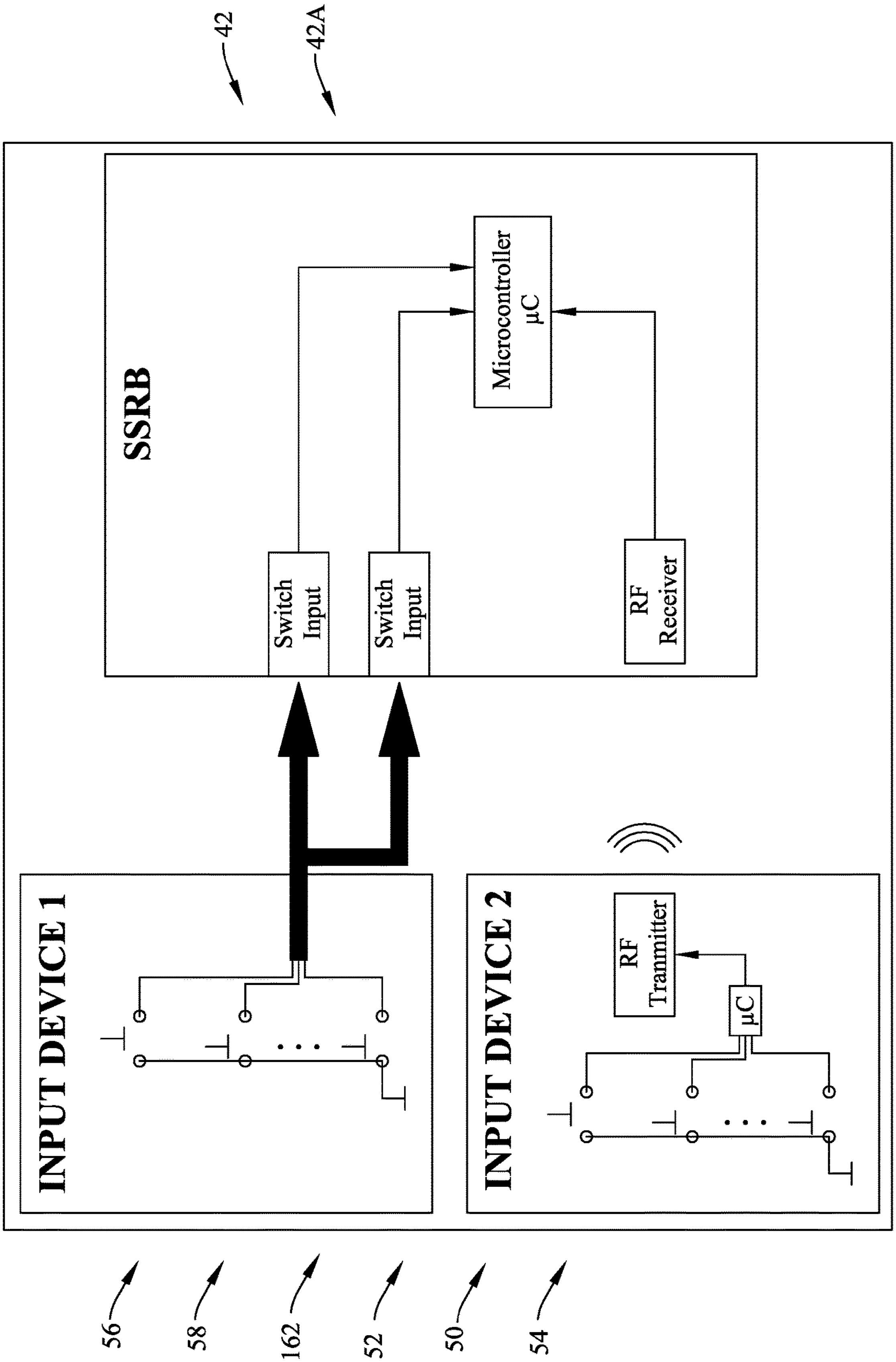
FIG. 3 is an electrical diagram of FIGS. 1 and 2.

The SMM is a fully programmable. To program the SMM a Switch Programmer is required. The programming module plugs in directly to the programming port on the SMM in FIG. 3. With the SMM powered and the programming module plugged in, the programming module will allow for full customization of the Switch functions. See Switch Programming Guide for more assistance.

Checking Power Connections

Make sure the Switch system is properly powered. To confirm that the system is properly grounded, measure the resistance between the black Switch Wire Harness wire and a known good ground (negative battery terminal or negative terminal of the cigarette outlet). The resistance should be below 2 ohm. To confirm that the system has a good power source, measure the voltage between a known good ground and the red wire on the Switch System Wire Harness. The voltage should be: 11V to 12.8V when the ignition is on, 11.9V-14V when the vehicle is running and 0V when the ignition is off.

Checking Harness Connections to OEM Harness

The Switch system operates by making and breaking connections in the vehicle with automotive relays. All the connections can be mimicked by using jumper wires inserted into the back of the Switch Wire Harness. The Switch utilizes a standard wire color scheme throughout the system. Each relay is denoted by a different color on the wire harness. Black and red striping is used to denote normally open and normally closed relay connections, respectively.

To confirm that the system is wired in correctly the function should be mimicked with a wire jumper. For example: If the orange Switch wires control the right turn signal on the Switch System Wire Harness. Jumping the orange wire to the orange with a black stripe wire should activate the right turn signal. If the right turn signal does not activate, the wire harness is not wired correctly.

Verifying Brake Sense Wiring

The brake sense wiring can be verified by first back probing the tan Switch System Wire Harness wire. A 12V change should be noticed on the tan wire when the brake is pressed. If there is no change on the tan wire, a different brake sense wire should be used. Once a 12V change is noticed on the brake sense wire, it should be rechecked with the system plugged in. Check for a voltage drop with the system plugged in and with the system not plugged in. If both voltage responses are the same, the brake sense is wired in correctly.

System is not responsive:

If the SMM is not working, it is likely not receiving power. The first thing to check if there is a double beep from the module on power on. If you do not notice a double beep on power on it is most likely an issue with the power connection or a poor ground connection.

Ensure that you have 12V on the red wire and that the red wire can supply up to 2 A.

1. Measure the voltage on the red wire. The voltage must be between 11-16V.

2. Check the inline fuse on the red wire. Verify that there is continuity on the fuse and that it is not blown.

Verify that there is an acceptable chassis ground on the black wire.

1. Verify that the black wire is attached to a ground location.

2. Verify that you have less than 2 ohms of resistance between the black wire and vehicle chassis ground or negative battery terminal.

Wireless Functions are not Activating

For wireless functions to activate the wireless device requires battery power.

1. Verify that the wireless device is powered. The wireless device operates off a 12V A23 battery. If the battery is below 8V the device may not operate. A green LED on the wireless board should blink when each button is pressed.

2. Verify that wireless device will sync with the SMM. That requires the use of the Switch programmer. See programmer guide for more information on syncing the device.

3. Verify that the wireless device is on the proper 2 byte addressing. See the programmer guide for more information.

4. Verify that the SMM is programmed. See programmer guide for more information.

5. Verify that the SMM relays are operating based on the wireless button presses. LEDs near the relays on the SMM circuit board will illuminate if an SMM relay is energized.

Expansion Module is not Working

The expansion modules are used in cases where either a LIN, CAN or additional high current relays are required. The expansion modules attach to the SMM through a 4-pin patch cable. If the SMM tries to activate an expansion module that is not attached, the device will beep. To verify that the expansion module is attached properly:

1. Activate a function controlled by the expansion module. If you hear a beep from the SMM the expansion module is not receiving the proper data and the harness needs to be inspected.

2. Verify that the expansion module is address properly. The addressing is changed through the dip switches located on the expansion module. The addressing should line up properly with the documentation provided.

CAN/LIN Expansion Module is not calibrating properly.

If the CAN/LIN Expansion Module is not calibrating it is likely an issue with how the system is connected into the vehicle.

1. Verify that the unit is receiving power. LED on the LIN/CAN Expansion Module will turn blue, green or red, depending on the calibration switch position, if it is receiving power but not receiving data from the vehicle. If the LED on the LIN/CAN Expansion Module does not illuminate blue, green or red, check the power and ground connections.

2. Verify that the proper wires are installed into the vehicle. If the CAN/LIN Expansion Module came with a plug-and-play harness, verify that the connector is seated properly and latched in the vehicle.

3. Verify that the 8 pin LIN/CAN Expansion Module connector is seated properly and latched in the LIN/CAN Expansion Module.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A self programmable microcontroller for a vehicle, the vehicle having an original equipment manufacturer control module electrically coupled between an original equipment manufacturer user input device and an original equipment manufacturer output device, an original equipment manufacturer source code within the original equipment manufacturer control module for communicating between the original equipment manufacturer user input device and the original equipment manufacturer output device, the self programmable microcontroller, comprising:

an expansion data bus;

a switch module electrically coupled to said expansion data bus;

a second input device coupled to the vehicle;

a transmitting device coupling said second input device to said switch module;

an expansion module electrically coupled between the original equipment manufacturer control module and said expansion data bus;

a source code stored in said switch module for operating said switch module and said expansion module based on an electrical signal from said second input device;

a calibration source code stored in said expansion module for calibrating said expansion module relative to the original equipment manufacturer control module; and said switch module receiving an electrical signal from said second input device and communicating through said expansion module and through the original equipment manufacturer control module for activating the original equipment manufacturer output device.

2. The self programmable microcontroller for a vehicle as set forth in claim 1, wherein said second input device includes a push button, toggle switch, rocker switch or joystick.

3. The self programmable microcontroller for a vehicle as set forth in claim 1, wherein said transmitting device includes an electrical conduit.

4. The self programmable microcontroller for a vehicle as set forth in claim 1, wherein said transmitting device includes a wireless communication device.

5. The self programmable microcontroller for a vehicle as set forth in claim 1, further including a programmer module electrically coupled to said expansion data bus; and a source code stored in said programmer module for programming said switch module for operating said second input device based on the original equipment manufacturer source code.

6. The self programmable microcontroller for a vehicle as set forth in claim 1, wherein said expansion module includes a Controller Area Network (CAN) expansion module; and said switch module receiving an electrical signal from said second input device and communicating through said CAN expansion module and through the original equipment manufacturer control module for activating the original equipment manufacturer output device.

7. The self programmable microcontroller for a vehicle as set forth in claim 1, wherein said expansion module includes a Local Interconnect Network (LIN) expansion module; and said switch module receiving an electrical signal from said second input device and communicating through said Local Interconnect Network (LIN) expansion module and through the original equipment manufacturer control module for activating the original equipment manufacturer output device.

8. The self programmable microcontroller for a vehicle as set forth in claim 1, wherein said expansion module includes a Controller Area Network (CAN) expansion module and a Local Interconnect Network (LIN) expansion module;

said switch module receiving an electrical signal from said second input device and communicating through said Controller Area Network CAN expansion module and through the original equipment manufacturer control module for activating the original equipment manufacturer output device; and said switch module receiving an electrical signal from said second input device and communicating through said Local Interconnect Network (LIN) expansion module and through the original equipment manufacturer control module for activating the original equipment manufacturer output device.

9. The self programmable microcontroller for a vehicle as set forth in claim 1, further including an relay expansion module electrically coupled to said expansion data bus; and said relay expansion module including a high current relay.

10. The self programmable microcontroller for a vehicle as set forth in claim 1, further including an auxiliary expansion module electrically coupled to said expansion data bus; a third input device electrically coupled to said switch module;

a second calibration source code stored in said auxiliary expansion module for calibrating said auxiliary expansion module relative to the original equipment manufacturer control module; and said switch module receiving an electrical signal from said third input device and communicating through said auxiliary expansion module and through the original equipment manufacturer control module for activating the original equipment manufacturer output device.

11. The self programmable microcontroller for a vehicle as set forth in claim 1, wherein said calibration source code includes a baud rate calibration source code.

12. The self programmable microcontroller for a vehicle as set forth in claim 1, wherein said calibration source code includes a message identifier (ID) calibration source code.

13. The self programmable microcontroller for a vehicle as set forth in claim 1, wherein said calibration source code includes an idle state calibration source code.

14. The self programmable microcontroller for a vehicle as set forth in claim 1, wherein said calibration source code includes activating the original equipment manufacturer user input device for defining a function calibration.

15. The self programmable microcontroller for a vehicle as set forth in claim 14, wherein said function calibration includes a cyclical function and said calibration source code includes a frame look up table.

16. The self programmable microcontroller for a vehicle as set forth in claim 14, wherein said function calibration includes a non-cyclical function and said calibration source code includes a mask.

17. A self programmable microcontroller for a vehicle, the vehicle having an original equipment manufacturer control module electrically coupled between an original equipment manufacturer user input device and an original equipment manufacturer output device, an original equipment manufacturer source code within the original equipment manufacturer control module for communicating between the original equipment manufacturer user input device and the original equipment manufacturer output device, the self programmable microcontroller, comprising:

an expansion data bus;

an external switch module electrically coupled to said expansion data bus;

a second input device electrically coupled to said external switch module;

an external expansion module electrically coupled between the original equipment manufacturer control module and said expansion data bus;

a source code stored in said switch module for operating said switch module and said expansion module based on an electrical signal from said second input device;

a calibration source code stored in said external expansion module for calibrating said external expansion module relative to the original equipment manufacturer control module; and said external switch module receiving an electrical signal from said second input device and communicating through said external expansion module and through the original equipment manufacturer control module for activating the original equipment manufacturer output device.

18. A method for programming a microcontroller for operating a vehicle, the vehicle having an original equipment manufacturer control module electrically coupled between an original equipment manufacturer user input device and an original equipment manufacturer output device, an original equipment manufacturer source code within the original equipment manufacturer control module for communicating between the original equipment manufacturer user input device and the original equipment manufacturer output device, the steps comprising:

installing an expansion data bus into the vehicle;

installing a switch module into the vehicle and electrically coupled to the expansion data bus;

installing a second input device into the vehicle and communicating with the switch module;

installing an expansion module into the vehicle and electrically coupled between the original equipment manufacturer control module and the expansion data bus;

executing a source code stored in the switch module for operating the switch module and the expansion module based on an electrical signal from the second input device;

executing a calibration source code for calibrating the expansion module relative to the original equipment manufacturer control module; and activating the second input device for transmitting an electrical sign to the switch module and through the expansion module and through the original equipment manufacturer control module for activating the original equipment manufacturer output device.

19. The method for programming a microcontroller as set forth in claim 18, wherein the step of executing a calibration source code includes the step of executing a baud rate calibration.

20. The method of programming a microcontroller as set forth in claim 19, wherein the step of executing a calibration source code further includes the step of executing a message identifier (ID) calibration.

21. The method of programming a microcontroller set forth in claim 20, wherein the step of executing a calibration source code further includes the step of executing an idle state calibration.

22. The method of programming a microcontroller as set forth in claim 21, wherein the step of executing a calibration source code further includes the step of activating the original equipment manufacturer user input device for defining a function calibration.

23. The method of programming a microcontroller as set forth in claim 22, wherein the step of executing a calibration source code further includes the step of determining if the function calibration includes a cyclical function; and producing a frame look up table from the calibration source code if the function calibration includes the cyclical function.

24. The method of programming a microcontroller as set forth in claim 23, wherein the step of executing a calibration source code further includes the step of determining if the function calibration includes a non-cyclical function; and producing a mask from the calibration source code if the function calibration includes the non-cyclical function.

25. A method for programming a microcontroller for operating a vehicle, the vehicle having an original equipment manufacturer control module electrically coupled between an original equipment manufacturer user input device and an original equipment manufacturer output device, an original equipment manufacturer source code within the original equipment manufacturer control module for communicating between the original equipment manufacturer user input device and the original equipment manufacturer output device, the steps comprising:

installing an expansion data bus into the vehicle;

installing a switch module into the vehicle and electrically coupled to the expansion data bus;

installing a second input device into the vehicle and communicating with the switch module;

installing an expansion module into the vehicle and electrically coupled between the original equipment manufacturer control module and the expansion data bus;

executing a source code stored in the switch module for operating the switch module and the expansion module based on an electrical signal from the second input device;

executing a message identifier (ID) calibration source code for calibrating the expansion module relative to the original equipment manufacturer control module;

executing an idle state calibration source code for calibrating the expansion module relative to the original equipment manufacturer control module;

executing an idle state calibration source code for calibrating the expansion module relative to the original equipment manufacturer control module;

activating the original equipment manufacturer user input device for defining a function calibration relative to the original equipment manufacturer output device; and activating the second input device for transmitting an electrical sign to the switch module and through the expansion module and through the original equipment manufacturer control module for activating the original equipment manufacturer output device.

* * * * *